US012323785B2

(12) United States Patent
Treat et al.

(10) Patent No.: US 12,323,785 B2
(45) Date of Patent: Jun. 3, 2025

(54) VIRTUAL AUDITORY DISPLAY FILTERS AND ASSOCIATED SYSTEMS, METHODS, AND NON-TRANSITORY COMPUTER-READABLE MEDIA

(71) Applicant: Iyo Inc., Redwood City, CA (US)

(72) Inventors: Neil David Treat, Los Gatos, CA (US); Kyle Steven Hoefer, Santa Clara, CA (US); William Stanley Woods, Palo Alto, CA (US); Jason Steven Rugolo, Gilbert, AZ (US)

(73) Assignee: Iyo Inc., Redwood City, CA (US)

( * ) Notice: Subject to any disclaimer, the term of this patent is extended or adjusted under 35 U.S.C. 154(b) by 0 days.

(21) Appl. No.: 18/621,974

(22) Filed: Mar. 29, 2024

(65) Prior Publication Data

US 2024/0334149 A1 Oct. 3, 2024

Related U.S. Application Data

(60) Provisional application No. 63/493,669, filed on Mar. 31, 2023.

(51) Int. Cl.

*H04S 7/00* (2006.01)
*H04R 5/033* (2006.01)
*H04S 1/00* (2006.01)

(52) U.S. Cl.

CPC ............. *H04S 7/304* (2013.01); *H04R 5/033* (2013.01); *H04S 1/005* (2013.01); *H04S 2400/15* (2013.01); *H04S 2420/01* (2013.01)

(58) Field of Classification Search

CPC ...... H04S 7/304; H04S 1/005; H04S 2400/15; H04S 2420/01; H04R 5/033

USPC ... 381/310, 309, 99, 103, 98, 303, 122, 111; 700/94; 382/162–167, 274, 173; 333/166

See application file for complete search history.

(56) References Cited

U.S. PATENT DOCUMENTS 10,433,094 B2 * 10/2019 Lyren ...................... H04S 7/303
2010/0328419 A1 * 12/2010 Etter ...................... H04S 7/303 381/306
2013/0041648 A1 * 2/2013 Osman .................... H04S 7/302 381/300

(Continued)

OTHER PUBLICATIONS

International Application No. PCT/US2024/022341, International Search Report and the Written Opinion, dated Jul. 23, 2024, 9 pages.

*Primary Examiner* — Vivian C Chin
*Assistant Examiner* — Con P Tran
(74) *Attorney, Agent, or Firm* — Ahmann Kloke LLP

(57) ABSTRACT

An example method includes receiving audio signals associated with virtual auditory space locations. Digital filters are selected based on the virtual auditory space locations. The digital filters include one or more notch filters including one or more center frequencies that are based on generally sigmoidal distributions of center frequencies as a function of virtual auditory space location. The notch filters are configured to produce one or more notches in frequency spectrums of audio signals when applied to the audio signals. The digital filters are applied to the audio signals to obtain processed audio signals. Output audio signals are generated based on the processed audio signals. The output audio signals are provided to devices for producing virtual auditory display sound.

30 Claims, 32 Drawing Sheets

(56) References Cited

U.S. PATENT DOCUMENTS

| | | | | |
|---|---|---|---|---|
| 2017/0245082 | A1 | 8/2017 | Boland | |
| 2018/0217806 | A1* | 8/2018 | Jang | G06F 3/167 |
| 2019/0020963 | A1 | 1/2019 | Mor et al. | |
| 2019/0116444 | A1 | 4/2019 | Benattar | |
| 2021/0174252 | A1* | 6/2021 | Jeong | G10L 25/51 |

* cited by examiner

400

VIRTUAL AUDITORY DISPLAY FILTERS AND ASSOCIATED SYSTEMS, METHODS, AND NON-TRANSITORY COMPUTER-READABLE MEDIA

CROSS-REFERENCE TO RELATED APPLICATIONS

This application claims priority to U.S. Provisional Patent Application No. 63/493,669, filed on Mar. 31, 2023, and entitled "SYSTEMS AND METHODS FOR VIRTUAL SOUND REPRESENTATION WITH DIGITAL FILTER PARAMETERS THAT VARY WITH AUDIO OBJECT COORDINATES," and is related to U.S. patent application Ser. No. 18/622,540, filed on the same day herewith, and entitled "VIRTUAL AUDITORY DISPLAY DEVICES AND ASSOCIATED SYSTEMS, METHODS, AND DEVICES." Each of the foregoing applications is incorporated by reference herein in its entirety.

TECHNICAL FIELD

The present technology generally relates to virtual auditory display filters, and more particularly to generating virtual auditory display filters, applying virtual auditory display filters to audio signals to generate virtual auditory display sound in virtual auditory space, and applications related to virtual auditory display filters.

BACKGROUND

Three-dimensional (3D) sound systems may be implemented by arranging multiple speakers in a space, thereby allowing sound to arrive from different directions. Headphones, headsets, and earbuds (collectively headphones) are often used to listen to music or other audio. A headphone may simulate 3D sound using a head-related transfer function (HRTF). An HRTF may be a compressed representation of how sound waves interact with the human head and ears. More generally, an HRTF may be used to simulate the effect of sound waves traveling through a 3D space.

SUMMARY

In some aspects, the techniques described herein relate to one or more non-transitory computer-readable media including executable instructions that when executed by one or more processors of a system cause the system to perform a method, the method including: generating, for each of multiple virtual auditory space locations, one or more first digital filters, the one or more first digital filters including one or more first notch filters, the one or more first notch filters including one or more first center frequencies, the one or more first center frequencies based on a first generally sigmoidal distribution of center frequencies as a function of virtual auditory space location, the one or more first notch filters configured to produce one or more first notches in a first frequency spectrum of a first audio signal based on the one or more first center frequencies when applied to the first audio signal; generating, for each of the multiple virtual auditory space locations, one or more second digital filters, the one or more second digital filters including one or more second notch filters, the one or more second notch filters including one or more second center frequencies, the one or more second center frequencies based on a second generally sigmoidal distribution of center frequencies as a function of virtual auditory space location, the one or more second notch filters configured to produce one or more second notches in a second frequency spectrum of a second audio signal based on the one or more second center frequencies when applied to the second audio signal; receiving an audio signal, the audio signal having one or more audio sub-signals, an audio sub-signal associated with a virtual auditory space location; for each audio sub-signal of the one or more audio sub-signals: selecting, based on the virtual auditory space location associated with the audio sub-signal, particular one or more first digital filters and particular one or more second digital filters; applying the particular one or more first digital filters to the audio sub-signal to obtain a first processed audio sub-signal; and applying the particular one or more second digital filters to the audio sub-signal to obtain a second processed audio sub-signal; generating, based on multiple first processed audio sub-signals, a first output audio signal for a first device; generating, based on multiple second processed audio sub-signals, a second output audio signal for a second device; and providing the first output audio signal to the first device and the second output audio signal to the second device.

In some aspects, the techniques described herein relate to one or more non-transitory computer-readable media wherein the virtual auditory space location is a first virtual auditory space location, and the method further includes: receiving a head orientation of a user; and for each audio sub-signal of the one or more audio sub-signals, determining, based on the first virtual auditory space location associated with the audio sub-signal and the head orientation, a second virtual auditory space location, wherein selecting, based on the virtual auditory space location associated with the audio sub-signal, the particular one or more first digital filters and the particular one or more second digital filters includes selecting, based on the second virtual auditory space location, the particular one or more first digital filters and the particular one or more second digital filters.

In some aspects, the techniques described herein relate to one or more non-transitory computer-readable media wherein the particular one or more first digital filters are first particular one or more first digital filters, the particular one or more second digital filters are first particular one or more second digital filters, the head orientation of the user is a first head orientation of the user, and the method further includes: receiving a personalization audio signal associated with a third virtual auditory space location; selecting, based on the third virtual auditory space location, second particular one or more first digital filters and second particular one or more second digital filters; applying the second particular one or more first digital filters to the personalization audio signal to obtain a first processed personalization audio signal; applying the second particular one or more second digital filters to the personalization audio signal to obtain a second processed personalization audio signal; generating, based on the first processed personalization audio signal, a third output audio signal for the first device; generating, based on the second processed personalization audio signal, a fourth output audio signal for the second device; providing the third output audio signal to the first device and the fourth output audio signal to the second device; receiving a second head orientation of the user; determining, based on the second head orientation, a fourth virtual auditory space location; determining a delta between the third virtual auditory space location and the fourth virtual auditory space location; and modifying, based on the delta, the one or more first digital filters and the one or more second digital filters.

In some aspects, the techniques described herein relate to one or more non-transitory computer-readable media wherein modifying, based on the delta, the one or more first digital filters and the one or more second digital filters includes modifying the one or more first center frequencies on which the one or more first notch filters are based and the one or more second center frequencies on which the one or more second notch filters are based.

In some aspects, the techniques described herein relate to one or more non-transitory computer-readable media, the method further including generating, using one or more image processing algorithms, a first notch mask and a second notch mask, the first notch mask specifying a first gain modifier as a function of virtual auditory space location, the second notch mask specifying a second gain modifier as a function of virtual auditory space location, wherein: the one or more first notch filters include the one or more first center frequencies and a first gain as modified by the first gain modifier, and the one or more first notch filters are configured to produce one or more first notches in the first frequency spectrum of the first audio signal based on the one or more first center frequencies and the first gain when applied to the first audio signal, and the one or more second notch filters include the one or more second center frequencies and a second gain as modified by the second gain modifier, and the one or more second notch filters are configured to produce one or more second notches in the second frequency spectrum of the second audio signal based on the one or more second center frequencies and the second gain when applied to the second audio signal.

In some aspects, the techniques described herein relate to one or more non-transitory computer-readable media wherein the one or more image processing algorithms include one or more of a gaussian function, a sharpening function, a contrast adjustment function, a color correction function, a thresholding function, an edge detection function, and a segmentation function.

In some aspects, the techniques described herein relate to one or more non-transitory computer-readable media, the method further including: receiving a selection of an acoustic environment; and determining, based on the acoustic environment, a first acoustic environment digital filter and a second acoustic environment digital filter, wherein for each audio sub-signal of the one or more audio sub-signals, applying the particular one or more first digital filters to the audio sub-signal to obtain the first processed audio sub-signal includes applying the particular one or more first digital filters and the first acoustic environment digital filter to the audio sub-signal to obtain the first processed audio sub-signal, and applying the particular one or more second digital filters to the audio sub-signal to obtain the second processed audio sub-signal includes applying the particular one or more second digital filters and the second acoustic environment digital filter to the audio sub-signal to obtain the second processed audio sub-signal.

In some aspects, the techniques described herein relate to one or more non-transitory computer-readable media wherein the acoustic environment is represented by one or more ambisonic arrays and determining, based on the acoustic environment, the first acoustic environment digital filter and the second acoustic environment digital filter includes, determining, based on the one or more ambisonic arrays, the first acoustic environment digital filter and the second acoustic environment digital filter.

In some aspects, the techniques described herein relate to one or more non-transitory computer-readable media wherein the one or more first digital filters and the one or more second digital filters are infinite impulse response filters.

In some aspects, the techniques described herein relate to one or more non-transitory computer-readable media wherein the first device includes a first ear-worn device, and the second device includes a second ear-worn device.

In some aspects, the techniques described herein relate to a system including at least one processor and at least one memory including executable instructions that when executed by the at least one processor cause the system to: generate, for each of multiple virtual auditory space locations, one or more first digital filters, the one or more first digital filters including one or more first notch filters, the one or more first notch filters including one or more first center frequencies, the one or more first center frequencies based on a first generally sigmoidal distribution of center frequencies as a function of virtual auditory space location, the one or more first notch filters configured to produce one or more first notches in a first frequency spectrum of a first audio signal based on the one or more first center frequencies when applied to the first audio signal; generate, for each of the multiple virtual auditory space locations, one or more second digital filters, the one or more second digital filters including one or more second notch filters, the one or more second notch filters including one or more second center frequencies, the one or more second center frequencies based on a second generally sigmoidal distribution of center frequencies as a function of virtual auditory space location, the one or more second notch filters configured to produce one or more second notches in a second frequency spectrum of a second audio signal based on the one or more second center frequencies when applied to the second audio signal; receive an audio signal, the audio signal having one or more audio sub-signals, an audio sub-signal associated with a virtual auditory space location; for each audio sub-signal of the one or more audio sub-signals: select, based on the virtual auditory space location associated with the audio sub-signal, particular one or more first digital filters and particular one or more second digital filters; apply the particular one or more first digital filters to the audio sub-signal to obtain a first processed audio sub-signal; and apply the particular one or more second digital filters to the audio sub-signal to obtain a second processed audio sub-signal; generate, based on multiple first processed audio sub-signals, a first output audio signal for a first device; generate, based on multiple second processed audio sub-signals, a second output audio signal for a second device; and provide the first output audio signal to the first device and the second output audio signal to the second device.

In some aspects, the techniques described herein relate to a system wherein the virtual auditory space location is a first virtual auditory space location, and the executable instructions that when executed by the at least one processor further cause the system to: receive a head orientation of a user; and for each audio sub-signal of the one or more audio sub-signals, determine, based on the first virtual auditory space location associated with the audio sub-signal and the head orientation, a second virtual auditory space location, wherein to select, based on the virtual auditory space location associated with the audio sub-signal, the particular one or more first digital filters includes to select, based on the second virtual auditory space location, the particular one or more first digital filters, and to select, based on the virtual auditory space location associated with the audio sub-signal, the particular one or more second digital filters includes to select, based on the second virtual auditory space location, the particular one or more second digital filters.

In some aspects, the techniques described herein relate to a system wherein the one or more first digital filters are first one or more first digital filters, the one or more second digital filters are first one or more second digital filters, the particular one or more first digital filters are first particular one or more first digital filters, the particular one or more second digital filters are first particular one or more second digital filters, the head orientation is a first head orientation, the audio signal having one or more audio sub-signals is a first audio signal having first one or more audio sub-signals, and the executable instructions that when executed by the at least one processor further cause the system to: receive a personalization audio signal that has a third virtual auditory space location; select, based on the third virtual auditory space location, second particular one or more first digital filters and second particular one or more second digital filters; apply the second particular one or more first digital filters to the personalization audio signal to obtain a first processed personalization audio signal; apply the second particular one or more second digital filters to the personalization audio signal to obtain a second processed personalization audio signal; generate, based on the first processed personalization audio signal, a third output audio signal for the first device; generate, based on the second processed personalization audio signal, a fourth output audio signal for the second device; provide the third output audio signal to the first device and the fourth output audio signal to the second device; receive a second head orientation of the user; determine, based on the second head orientation, a fourth virtual auditory space location; determine a delta between the third virtual auditory space location and the fourth virtual auditory space location; and selecting, based on the delta, second one or more first digital filters and second one or more second digital filters, the second one or more first digital filters and the second one or more second digital filters for use while receiving a second input audio signal having second one or more audio sub-signals.

In some aspects, the techniques described herein relate to a system wherein the executable instructions that when executed by the at least one processor further cause the system to generate, using one or more image processing algorithms, a first notch mask and a second notch mask, the first notch mask specifying a first gain modifier based on the virtual auditory space location, the second notch mask specifying a second gain modifier based on the virtual auditory space location, wherein: the one or more first notch filters are generated using the one or more first center frequencies based on the first generally sigmoidal distribution of center frequencies as a function of virtual auditory space location and a first gain as modified by the first gain modifier and the one or more first notch filters are configured to produce one or more first notches in the first frequency spectrum of the first audio signal based on the one or more first center frequencies and the first gain when applied to the first audio signal, and the one or more second notch filters are generated using the one or more second center frequencies based on the second generally sigmoidal distribution of center frequencies as a function of virtual auditory space location and a second gain as modified by the second gain modifier and the one or more second notch filters are configured to produce one or more second notches in the second frequency spectrum of the second audio signal based on the one or more second center frequencies and the second gain when applied to the second audio signal.

In some aspects, the techniques described herein relate to a system wherein the executable instructions that when executed by the at least one processor further cause the system to: receive a selection of an acoustic environment; and determine based on the acoustic environment, a first acoustic environment digital filter and a second acoustic environment digital filter, wherein for each audio sub-signal of the one or more audio sub-signals, to apply the particular one or more first digital filters to the audio sub-signal to obtain the first processed audio sub-signal includes to apply the particular one or more first digital filters and the first acoustic environment digital filter to the audio sub-signal to obtain the first processed audio sub-signal, and to apply the particular one or more second digital filters to the audio sub-signal to obtain the second processed audio sub-signal includes to apply the particular one or more second digital filters and the second acoustic environment digital filter to the audio sub-signal to obtain the second processed audio sub-signal.

In some aspects, the techniques described herein relate to a system wherein the one or more first digital filters and the one or more second digital filters are infinite impulse response filters.

In some aspects, the techniques described herein relate to a system wherein the first device includes a first ear-worn device, and the second device includes a second ear-worn device.

In some aspects, the techniques described herein relate to a method including: generating a first virtual auditory display filter, the first virtual auditory display filter including a first set of first functions, one or more first functions, when applied to a first audio signal having a first location in virtual auditory space, generating a first processed audio signal having a first frequency response with one or more first notches at one or more first center frequencies that are based on the first location, the one or more first notches having one or more first peak-to-trough depths of at most −10 dB; generating a second virtual auditory display filter, the second virtual auditory display filter including a second set of second functions, one or more second functions, when applied to the first audio signal, generating a second processed audio signal having a second frequency response with one or more second notches at one or more second center frequencies that are based on the first location, the one or more second notches having one or more second peak-to-trough depths of at most −10 dB; receiving a second audio signal having a second location in the virtual auditory space; applying the first virtual auditory display filter, including a first subset of first functions selected based on the second location, to the second audio signal to generate a third processed audio signal having a third frequency response; applying the second virtual auditory display filter, including a second subset of second functions selected based on the second location, to the second audio signal to generate a fourth processed audio signal having a fourth frequency response; providing the third processed audio signal to a first sound output device; and providing the fourth processed audio signal to a second sound output device.

In some aspects, the techniques described herein relate to a method where the one or more first center frequencies are based on a first generally sigmoidal distribution of center frequencies as a function of location in the virtual auditory space and the one or more second center frequencies are based on a second generally sigmoidal distribution of center frequencies as a function of location in the virtual auditory space.

In some aspects, the techniques described herein relate to a method, further including receiving a head orientation of a user, wherein: applying the first virtual auditory display filter, including the first subset of first functions selected based on the second location, to the second audio signal to generate a third processed audio signal having a third frequency response includes applying the first virtual auditory display filter, including a third subset of first functions selected based on the second location and the head orientation, to the second audio signal to generate the third processed audio signal having the third frequency response, and applying the second virtual auditory display filter, including the second subset of second functions selected based on the second location, to the second audio signal to generate a fourth processed audio signal having a fourth frequency response includes applying the second virtual auditory display filter, including a fourth subset of second functions selected based on the second location and the head orientation, to the second audio signal to generate the fourth processed audio signal having the fourth frequency response.

In some aspects, the techniques described herein relate to a method, further including: generating, using one or more image processing algorithms, a first notch mask and a second notch mask, the first notch mask specifying a first depth modifier as a function of a location in the virtual auditory space, the second notch mask specifying a second depth modifier as a function of the location in the virtual auditory space; modifying the one or more first peak-to-trough depths based on the first depth modifier; and modifying the one or more second peak-to-trough depths based on the second depth modifier.

In some aspects, the techniques described herein relate to a method wherein the one or more image processing algorithms include one or more of a gaussian function, a sharpening function, a contrast adjustment function, a color correction function, a thresholding function, an edge detection function, and a segmentation function.

In some aspects, the techniques described herein relate to a method wherein the first set of first functions include first infinite impulse response digital filters and the second set of second functions include second infinite impulse response digital filters.

In some aspects, the techniques described herein relate to a method including: receiving a set of multiple first digital filters, one or more first digital filters generated for each of multiple virtual auditory space locations, the one or more first digital filters including one or more first notch filters, the one or more first notch filters including one or more first center frequencies, the one or more first center frequencies based on a first generally sigmoidal distribution of center frequencies as a function of virtual auditory space location, the one or more first notch filters configured to produce one or more first notches in a first frequency spectrum of a first audio signal based on the one or more first center frequencies when applied to the first audio signal; receiving a set of multiple second digital filters, one or more second digital filters generated for each of multiple virtual auditory space locations, the one or more second digital filters including one or more second notch filters, the one or more second notch filters including one or more second center frequencies, the one or more second center frequencies based on a second generally sigmoidal distribution of center frequencies as a function of virtual auditory space location, the one or more second notch filters configured to produce one or more second notches in a second frequency spectrum of a second audio signal based on the one or more second center frequencies when applied to the second audio signal; receiving a personalization audio signal that has a virtual auditory space location; selecting, based on the virtual auditory space location, particular one or more first digital filters and particular one or more second digital filters; applying the particular one or more first digital filters to the personalization audio signal to obtain a first processed personalization audio signal; applying the particular one or more second digital filters to the personalization audio signal to obtain a second processed personalization audio signal; providing a first output audio signal based on the first processed personalization audio signal to a first device and a second output audio signal based on the second processed personalization audio signal to a second device; receiving a user perception of first sound output by the first device and second sound output by the second device; and modifying, based on the user perception, the set of multiple first digital filters and the set of multiple second digital filters.

In some aspects, the techniques described herein relate to a method wherein the virtual auditory space location is a first virtual auditory space location and wherein modifying, based on the user perception, the set of multiple first digital filters and the set of multiple second digital filters includes: determining, based on the user perception, a second virtual auditory space location; determining a delta between the first virtual auditory space location and the second virtual auditory space location; and modifying, based on the delta, the set of multiple first digital filters and the set of multiple second digital filters.

In some aspects, the techniques described herein relate to a method wherein receiving the user perception includes receiving a head orientation of a user and wherein determining, based on the user perception, the second virtual auditory space location, includes determining, based on the head orientation of the user, the second virtual auditory space location.

In some aspects, the techniques described herein relate to a method wherein receiving the user perception includes receiving one or more gestures of a user and wherein determining, based on the user perception, the second virtual auditory space location, includes determining, based on the one or more gestures of the user, the second virtual auditory space location.

In some aspects, the techniques described herein relate to a method wherein the set of multiple first digital filters is a first set of multiple first digital filters, the set of multiple second digital filters is a first set of multiple second digital filters, wherein modifying, based on the user perception, the set of multiple first digital filters includes selecting, based on the user perception, a second set of multiple first digital filters, and wherein modifying, based on the user perception, the set of multiple second digital filters includes selecting, based on the user perception, a second set of multiple second digital filters.

In some aspects, the techniques described herein relate to a method wherein modifying, based on the user perception, the set of multiple first digital filters includes modifying the one or more first center frequencies and wherein modifying, based on the user perception, the set of multiple second digital filters includes modifying the one or more second center frequencies.

In some aspects, the techniques described herein relate to a method, further including: determining, based on the user perception, a spatialization precision estimate; and providing the spatialization precision estimate.

BRIEF DESCRIPTION OF THE DRAWINGS

Throughout the drawings, like reference numerals will be understood to refer to like parts, components, and structures.

DETAILED DESCRIPTION

Figure 1:
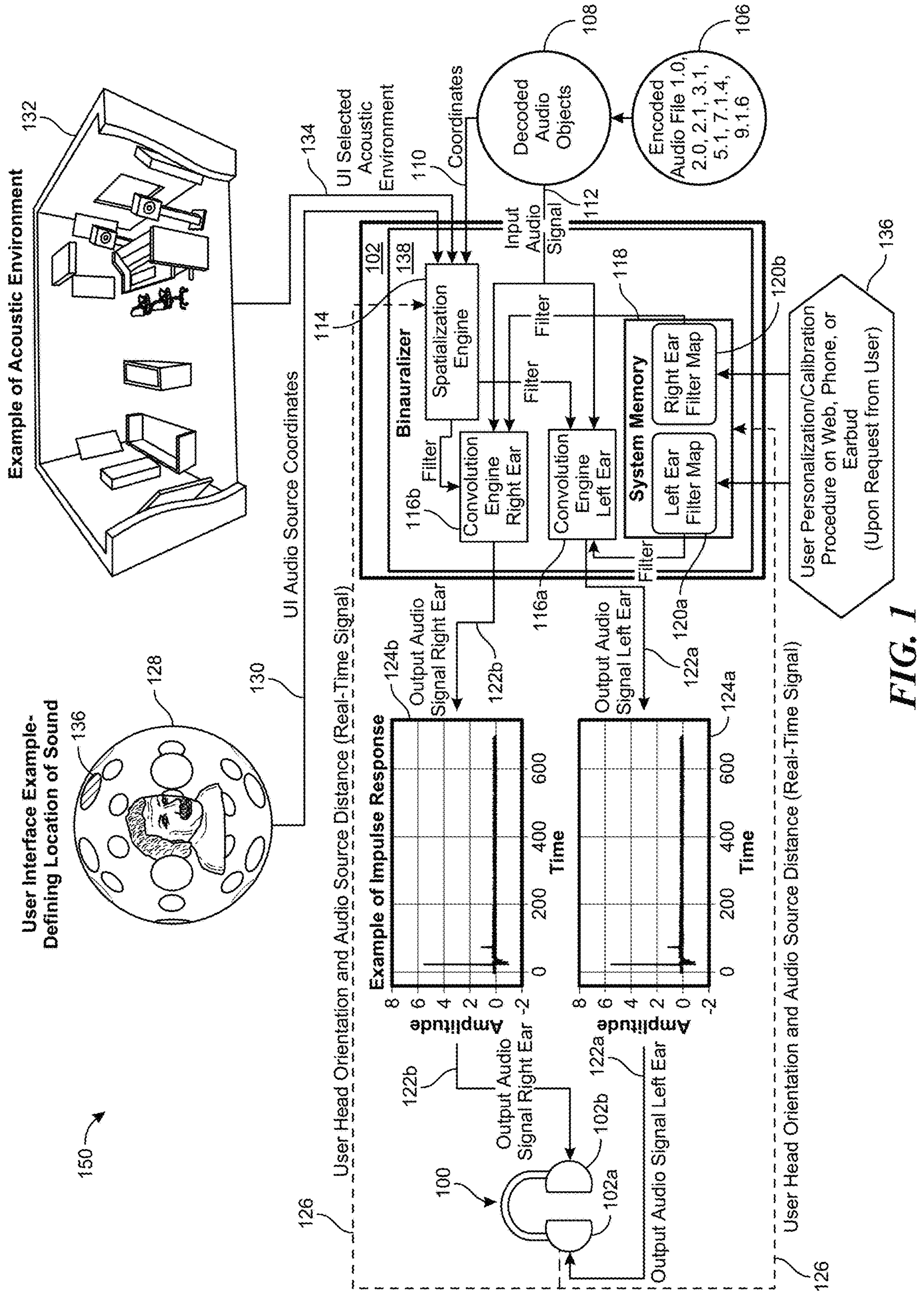
FIG. 1 is a diagram of an environment in which a virtual auditory display system and virtual auditory display devices may operate in some embodiments.

An HRTF may be for one person. Generating an individual HRTF typically requires a highly specialized environment and acoustic testing equipment. A person must remain still for approximately 30 minutes in an anechoic chamber while audio signals are emitted from different known locations. A microphone is placed in each ear of the person to capture the audio signals. However, this method presents challenges as there may be spurious responses due to factors such as the chamber, the audio signal source(s) and the microphone, that need to be eliminated in order to obtain an accurate Head Related Impulse Response (HRIR) which can then be converted to an HRTF. Furthermore, any movement by the person may affect the measurements, which may result in an inaccurate HRTF for the person. Another practical limitation of measuring an HRIR is that the time to collect directly scales with the number of discrete coordinates and practically limits the resolution of the resulting HRTF.

So-called universal HRTFs have been utilized to overcome disadvantages of individual HRTFs. Such universal HRTFs may be produced by averaging or otherwise combining measurements from multiple persons. However, such combining typically results in losing the individual characteristics of each person that are necessary to produce accurate virtual 3D sound for the person. As a result, such universal HRTFs may not accurately locate sound in virtual 3D space for all users, especially sound that is located directly in front of a user at approximately zero degrees azimuth and zero degrees elevation. FIG. 8E depicts an example HRTF 810.

Another prior approach has attempted to simulate a personalized HRTF using photogrammetry of the head, torso, and pinna, or using other methods with highly precise head, torso, and pinna scanning via time of flight or structured light. A physical acoustics model is then generated based on the resulting scanned form. However, this approach may not yield convincing rendering of virtual 3D space, because after the physical scan is measured, the physics-based simulation of sound interacting with the modeled surface may introduce complexity and inaccuracy in the resulting psychoacoustic cues.

The technology described herein provides technical solutions to the technical problems of the prior approaches described above. The technology may utilize virtual auditory display filters that may result in accurately rendered sounds in their locations in virtual auditory space. The virtual auditory display filters may utilize spectral shaping techniques, using equalizers, filters, and/or dynamic range compression, to manipulate the frequency spectrum of audio signals. Virtual auditory display filters may be generated without resort to direct physical measurements (for example, measurements in an anechoic chamber, photogrammetry, etc.).

Virtual auditory display filters may be or include functions that manipulate a frequency spectrum of an audio signal. Virtual auditory display filters may be or include digital filters, such as parametric equalization (EQ) filters that allow for adjustment of parameters such as the center frequency, gain, quality (Q or q), cutoff frequency, slope, bandwidth and/or filter type. The parameters may be set as a function of a location of a sound in virtual auditory space. The functions or the digital filters may affect the frequency spectrum of an audio signal by creating notches and peaks in the audio signal. The notches, peaks, and other spectral shaping of the audio signal accurately places the resulting sound in virtual auditory space. Furthermore, the notches, peaks, and other spectral shaping of the audio signal produces a processed audio signal that may be used to output high-quality clear sound that, in the example of music recordings, may accurately represent the original recorded performance and allow listeners to hear subtleties and nuances of the original recorded performance. As described herein, a digital filter may refer to a digital filter, a function, and/or some combination of one or more functions or one or more digital filters.

Virtual auditory space may be described as a virtual 3D sound environment of a person in which the person may perceive a sound as emanating from any location in the virtual 3D sound environment. In the described technology, each location in virtual auditory space may have an associated function or digital filter that is applied to audio signals that have that location. The application of the function or digital filter to an audio signal with a location results in sound, which may be referred to as virtual auditory display sound, that is perceived by the person as coming from that location. Accordingly, the person, who may be wearing headphones, earbuds, or other ear-worn devices, may experience virtual auditory display sound. Other advantages of the described technology will be apparent.

FIG. 1 is a diagram of an environment 150 in which a virtual auditory display system and virtual auditory display devices that interface with the virtual auditory display system may operate in some embodiments. As depicted, the environment 150 includes a virtual auditory display system 102 and a virtual auditory display device 100. The virtual auditory display system 102 and the virtual auditory display device 100 may together comprise a system. The virtual auditory display system 102 and the virtual auditory display device 100 may together render sounds in virtual auditory space for a wearer of the virtual auditory display device 100.

The virtual auditory display system 102 may include a binauralizer 138. The binauralizer may include a system memory 118, which may include a left ear digital filter map 120*a* and a right ear digital filter map 120*b*. The binauralizer 138 may also include a left ear convolution engine 116*a*, a right ear convolution engine 116*b*, and a spatialization engine 114. The virtual auditory display system 102 may also include other components, modules and/or engines, such as those described with reference to, for example, FIG. 2A.

In some embodiments, the virtual auditory display system 102 may be or include a software application that may execute on a digital device. A digital device is any device with at least one processor and memory. Digital devices are discussed further herein, for example, with reference to FIG. 16. For example, the virtual auditory display system 102 may be a software application that executes on a general-purpose computing device, such as a laptop or desktop computer. As another example, the virtual auditory display system 102 may be a software application that executes on a mobile device such as a phone or a tablet. In other embodiments, the virtual auditory display system 102 be or include a software application or a firmware application that executes on a special-purpose computing device, such as on the virtual auditory display device 100.

The virtual auditory display device 100 may include a first ear-worn device 102*a* and a second ear-worn device 102*b*. The first ear-worn device 102*a* and the second ear-worn device 102*b* may each be any ear-worn, ear-mounted or ear-proximate device such as an earphone of a pair of earphones, an earbud of a pair of earbuds, a headphone of a headset, a speaker of a virtual reality headset, and the like. In some embodiments, the virtual auditory display device 100 may be an embodiment of the virtual auditory display devices as described in the aforementioned co-pending U.S. patent application Ser. No. 18/622,540, filed on the same day herewith, and entitled "VIRTUAL AUDITORY DISPLAY DEVICES AND ASSOCIATED SYSTEMS, METHODS, AND DEVICES." The first ear-worn device 102*a* and/or the second ear-worn device 102*b* may include components, such as an inertial measurement unit (IMU), an accelerometer, a gyroscope, and/or a magnetometer, that detect a head orientation of a wearer wearing the first ear-worn device 102*a* and the second ear-worn device 102*b*.

In some embodiments, a digital device (for example, a laptop or desktop computer) may receive an encoded audio file 106 that has one or more channels of audio. Examples of an encoded audio file 106 include 2.0 (two channels of audio), 2.1 (three channels of audio), 5.1 (six channels of audio), 7.1.4 (12 channels of audio), and 9.1.6 (16 channels of audio). The digital device may decode the encoded audio file 106 to obtain decoded audio objects 108 and an input audio signal 112 that includes one or more audio sub-signals (alternately, audio channels). Each of the decoded audio objects 108 and/or the audio sub-signals may have associated coordinates which identify the location of the audio object in virtual auditory space. The coordinates may be cartesian coordinates, spherical coordinates, and/or polar coordinates. Although specific examples of encoded audio files are described herein, the technology is not limited to such examples, and may be used with audio files that have any number of channels.

The digital device may send the coordinates 110 to the spatialization engine 114 and the input audio signal 112 to the left ear convolution engine 116*a* and the right ear convolution engine 116*b*. In some embodiments, the virtual auditory display system 102 receives the encoded audio file 106 and decodes the encoded audio file 106 to obtain the decoded audio objects 108 and the input audio signal 112.

As described with reference to, for example, FIGS. 11A and 11B, a user interface component of the virtual auditory display system 102 may provide a user interface that allows the user to select an acoustic environment. The spatialization engine 114 may receive a selection 134 of the acoustic environment 132 via the user interface component from the wearer and utilize the selection 134 to process audio signals that are sent to the first ear-worn device 102*a* and the second ear-worn device 102*b* of the virtual auditory display device 100.

As described with reference to, for example, FIGS. 15A through 15J, the user interface component of the virtual auditory display system 102 may provide a user interface 128 that allows the user to perform a calibration and/or personalization procedure 136 to calibrate and/or personalize the virtual auditory display system 102. The wearer may use the user interface 128 to personalize the virtual auditory display system 102 so that the user's perception of the location of a sound matches the location of the sound in virtual auditory space. The user-perceived location of the sound may be sent in a signal 130 to the spatialization engine 114.

The spatialization engine 114 may determine, based on the acoustic environment 132, a first acoustic environment digital filter and a second acoustic environment digital filter. An acoustic environment digital filter may be or include a digital filter that is applied to an audio signal to manipulate the audio signal so as to produce the effect of the audio being played, generated or produced in a particular acoustic environment. The spatialization engine 114 may provide the first acoustic environment digital filter to the left ear convolution engine 116*a* and the second acoustic environment digital filter to the right ear convolution engine 116*b*.

While the virtual auditory display system 102 is receiving the input audio signal 112, one or both of the first ear-worn device 102*a* and the second ear-worn device 102*b* may detect a head orientation of a wearer of the virtual auditory display device 100 and provide the head orientation and an audio source distance 126 (which may be specified by the wearer) to the virtual auditory display system 102.

The binauralizer 138 may, for each audio sub-signal of the one or more audio sub-signals, obtain multiple first processed audio sub-signals and multiple second processed audio sub-signals. The binauralizer 138 may do so by determining, based on the virtual auditory space location associated with the audio sub-signal and the head orientation, a particular first location in the virtual auditory space for the audio sub-signal. The left ear digital filter map 120*a* maps locations in virtual auditory space to digital filters and/or functions for the first ear-worn device 102*a* and the right ear digital filter map 120*b* maps locations in virtual auditory space to digital filters and/or functions for the second ear-worn device 102*b*.

Virtual auditory display filters may be or include functions and/or digital filters that the virtual auditory display system 102 applies to audio signals to create virtual auditory display sound. A generation system, discussed in more detail with reference to, for example, FIGS. 3A and 3B, may generate the virtual auditory display filters that the virtual auditory display system 102 applies to audio signals.

The binauralizer 138 may select a particular first digital filter and/or function from the left ear digital filter map 120*a* and a particular second digital filter and/or function from the right ear digital filter map 120*b* in the system memory 118. The binauralizer 138 may provide the particular first digital filter and/or function to the left ear convolution engine 116*a* and the particular second digital filter and/or function to the right ear convolution engine 116*b*.

The left ear convolution engine 116*a* may apply the particular first digital filter and/or function and the first acoustic environment digital filter to the audio sub-signal to obtain a first processed audio sub-signal. The left ear convolution engine 116*a* may then generate, based on the multiple first processed audio sub-signals, an output audio signal 122*a* for the first ear-worn device 102*a*. The right ear convolution engine 116*b* may apply the particular second digital filter and/or function and the second acoustic environment digital filter to the audio sub-signal to obtain a second processed audio sub-signal. The right ear convolution engine 116*b* may then generate, based on the multiple second processed audio sub-signals, an output audio signal 122*b* for the second ear-worn device 102*b*. The graph 124*a* depicts an example impulse response for the output audio signal 122*a* and the graph 124*b* depicts an example impulse response for the output audio signal 122*b*.

Figure 2A:
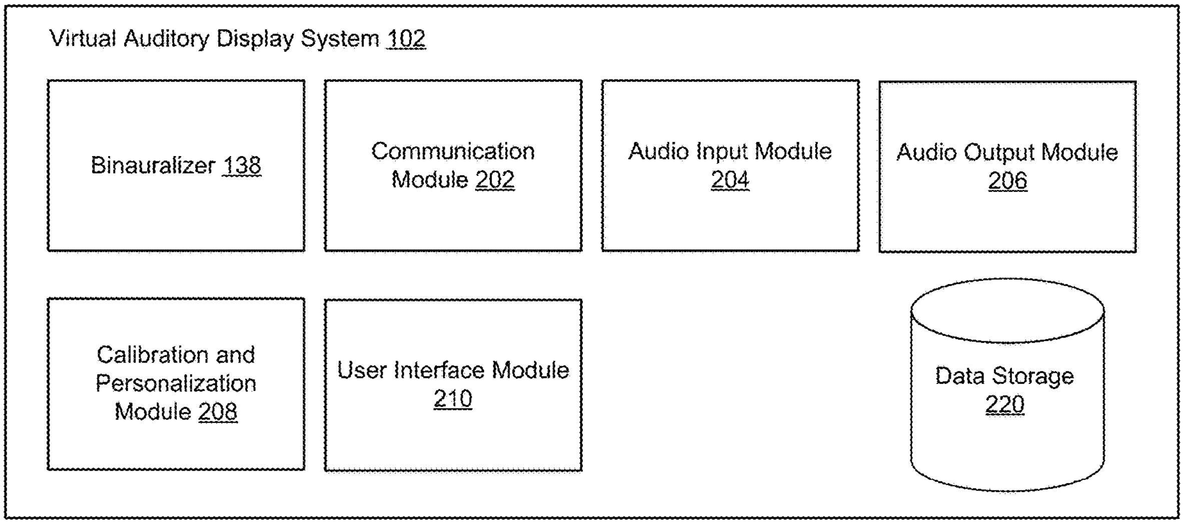
FIG. 2A is a block diagram depicting components of the virtual auditory display system in some embodiments.

FIG. 2A is a block diagram depicting components of the virtual auditory display system 102 in some embodiments. The virtual auditory display system 102 may include the binauralizer 138, a communication module 202, an audio input module 204, an audio output module 206, a calibration and personalization module 208, a user interface module 210, and a data storage 220.

The communication module 202 may send requests and/or data between components of the virtual auditory display system 102 and any other components or devices, such as the virtual auditory display device 100 and a generation system 380 (described with reference to, for example, FIGS. 3A and 3B). The communication module 202 may also receive requests and/or data between components of the virtual auditory display system 102 and any other components or devices.

The audio input module 204 may receive the input audio signal 112 from, for example, the general purpose computing device on which the virtual auditory display system 102 executes. The audio output module 206 may provide the output audio signal 122*a* to the first ear-worn device 102*a* and the output audio signal 122*b* to the second ear-worn device 102*b*.

The calibration and personalization module 208 may calibrate IMUs and/or other sensors of the first ear-worn device 102*a* and the second ear-worn device 102*b*. The calibration and personalization module 208 may also generate personalization audio signals and receive personalization information for personalizing filters. The user interface module 210 may provide user interfaces that allow users to, among other things, select an acoustic environment, select an audio visualization, control audio volume, and request calibration and/or personalization procedures be performed by the virtual auditory display system 102.

The data storage 220 may include data stored, accessed, and/or modified by any of the engines, components, modules or the like of the virtual auditory display system 102. The data storage 220 may include any number of data storage structures such as tables, databases, lists, and/or the like. The data storage 220 may include data that is stored in memory (for example, random access memory (RAM)), on disk, or some combination of in-memory and on-disk.

Figure 2B:
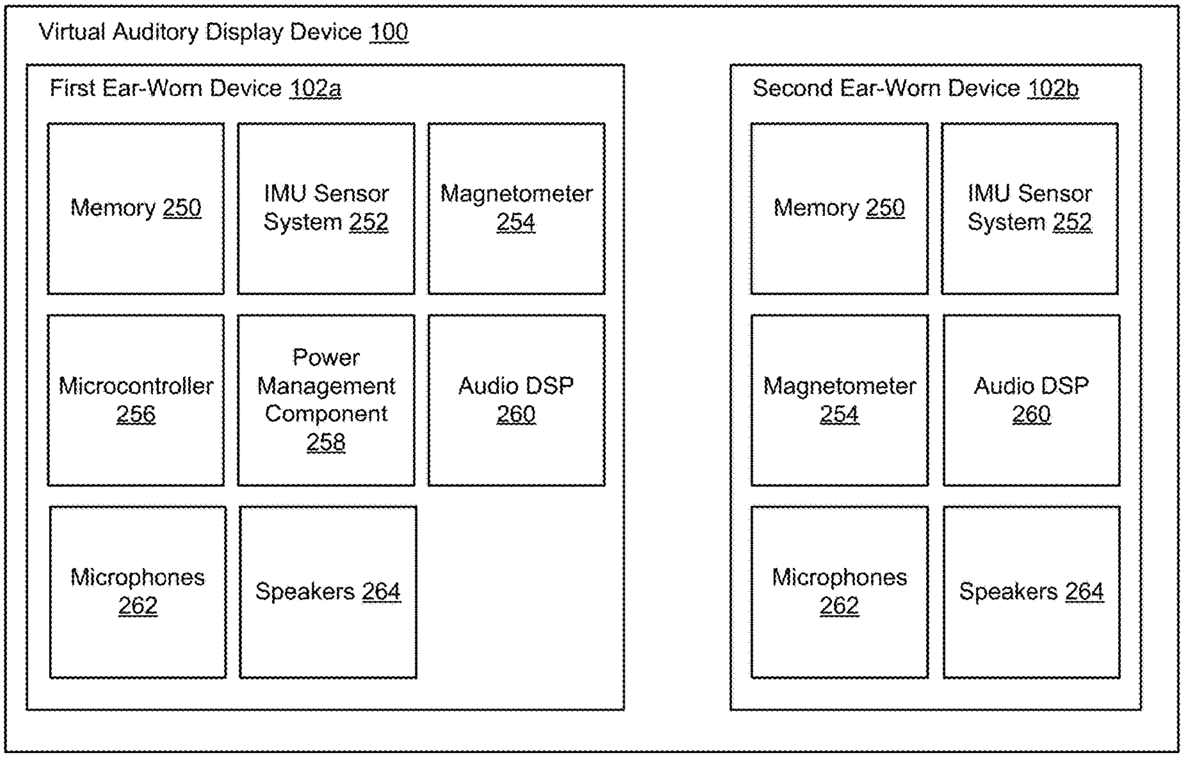
FIG. 2B is a block diagram depicting components of an ear-worn device in some embodiments.

FIG. 2B is a block diagram depicting components of the first ear-worn device 102*a* and the second ear-worn device 102*b* in some embodiments. The first ear-worn device 102*a* may include a memory 250, an IMU sensor system 252 (inertial measurement unit sensor system), a magnetometer 254, a microcontroller 256, a power management component 258, an audio DSP 260 (audio digital signal processor), microphones 262, and speakers 264. The second ear-worn device 102*b* may include a memory 250, an IMU sensor system 252 (inertial measurement unit sensor system), a magnetometer 254, an audio DSP 260, microphones 262, and speakers 264.

The memory 250 may store software and/or firmware. The IMU sensor system 252 and/or the magnetometer 254 may detect a head orientation of a wearer of the virtual auditory display device 100 and/or user interactions with the virtual auditory display device 100. The microcontroller 256 may execute software and/or firmware stored in the memory 250 or in the storage of the microcontroller 256.

The power management component 258 may provide power management. The audio DSP 260 may process audio signals to perform functions such as noise cancellation. The microphones 262 may capture audio, such as environmental audio and/or audio from a wearer of the first ear-worn device 102*a*. The speakers 264 may output sound based on the output audio signal 122*a* and the output audio signal 122*b*.

The first ear-worn device 102*a* and/or the second ear-worn device 102*b* may include components other than those depicted in FIG. 2B, such as switches, interconnects, and oscillators. The first ear-worn device 102*a* may be the primary device and the second ear-worn device 102*b* may be the secondary device. As such, the second ear-worn device 102*b* may not include a microcontroller 256. In some embodiments, the second ear-worn device 102*b* includes a microcontroller 256.

An engine, component, module, or the like of the virtual auditory display system 102, the first ear-worn device 102*a*, the second ear-worn device 102*b*, or a generation system 380 (described with reference to, for example FIG. 3B) may be hardware, software, firmware, or any combination. For example, each engine, component, module or the like may include functions performed by dedicated hardware (for example, an Application-Specific Integrated Circuit (ASIC), a Field Programmable Gate Array (FPGA), or the like), software, instructions maintained in memory, and/or any combination. Software and/or firmware may be executed by one or more processors.

Figure 3A:
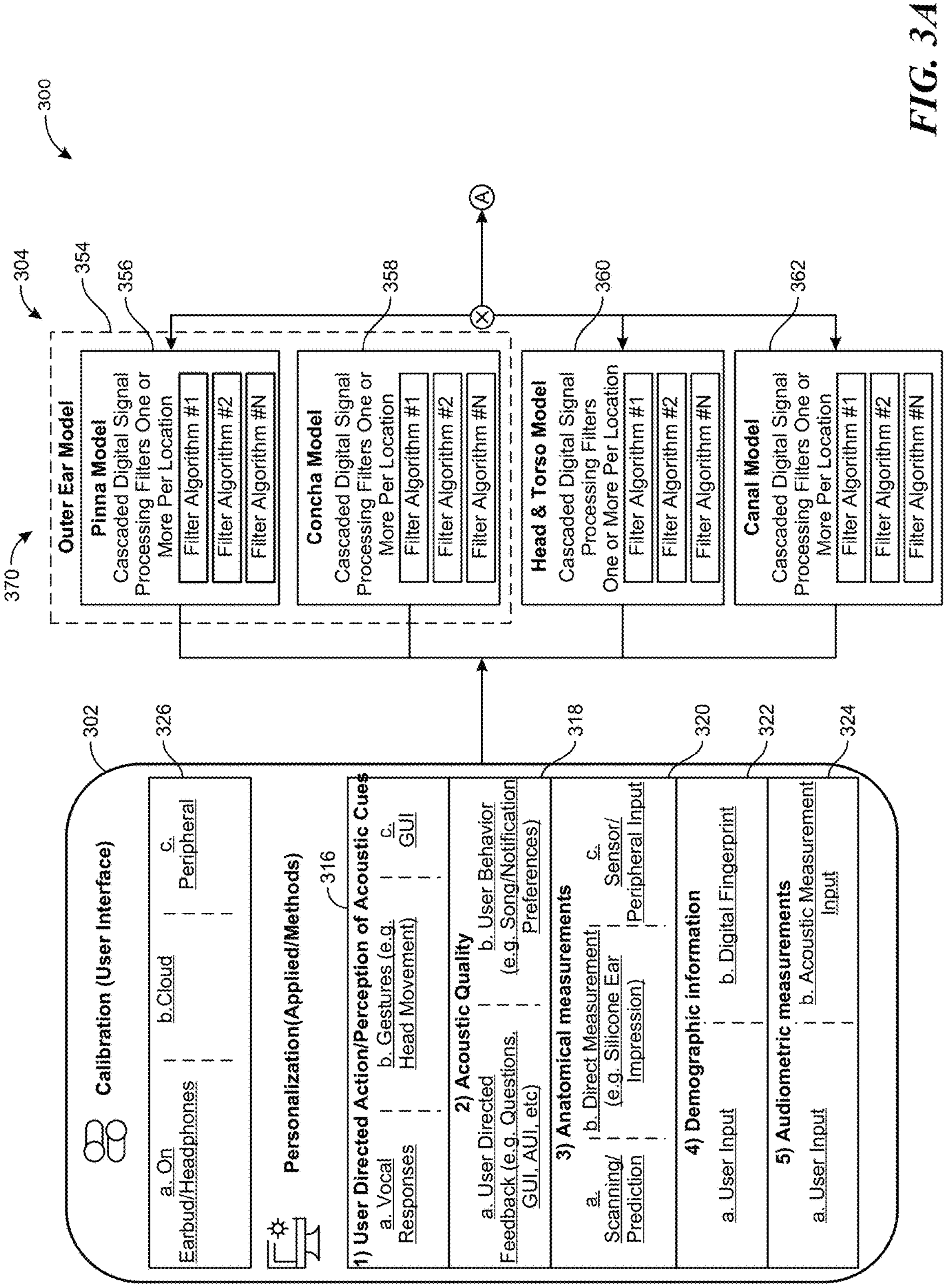
FIG. 3A is a block diagram of a method of generating and applying digital filters in some embodiments.
Figure 3A:
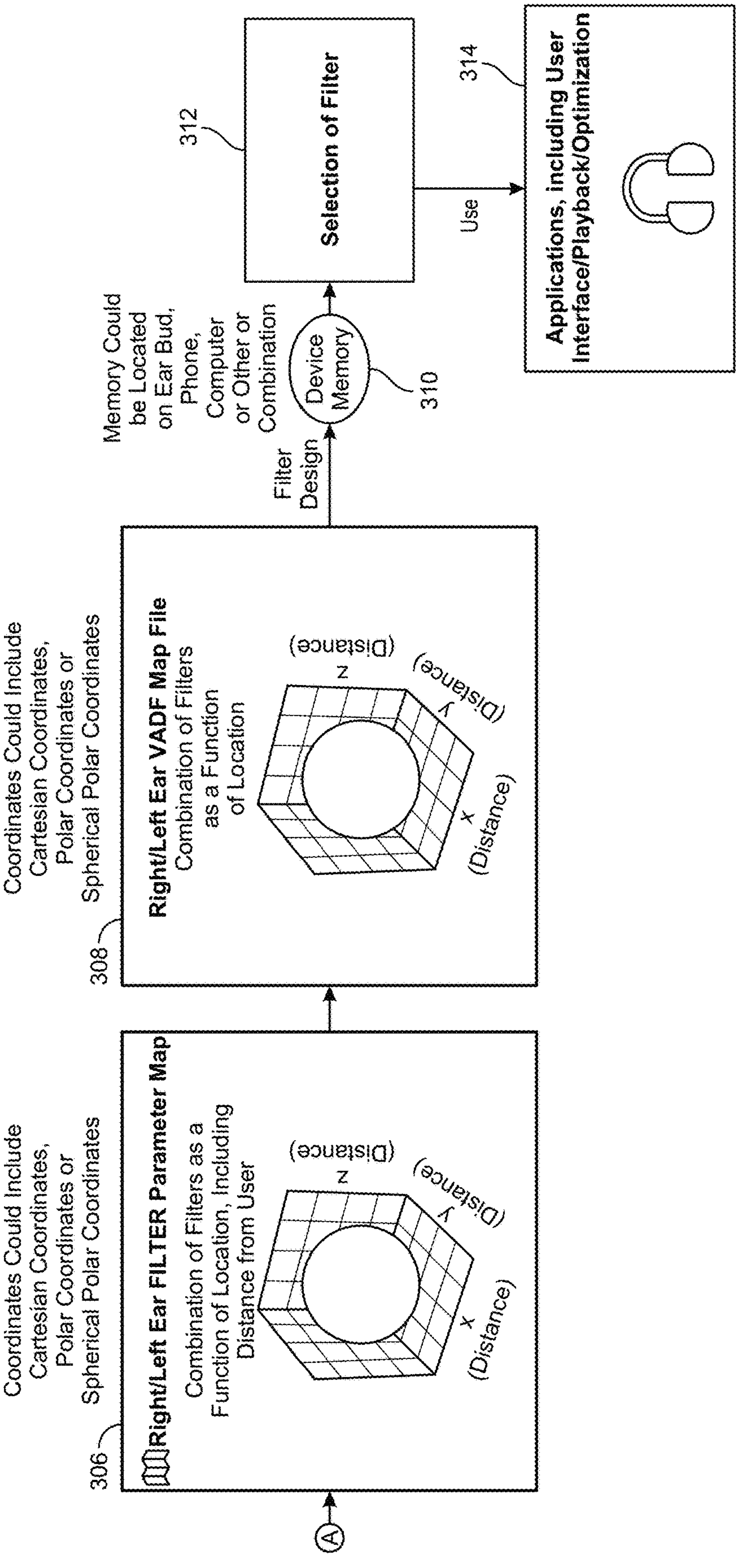
Figure 3B:
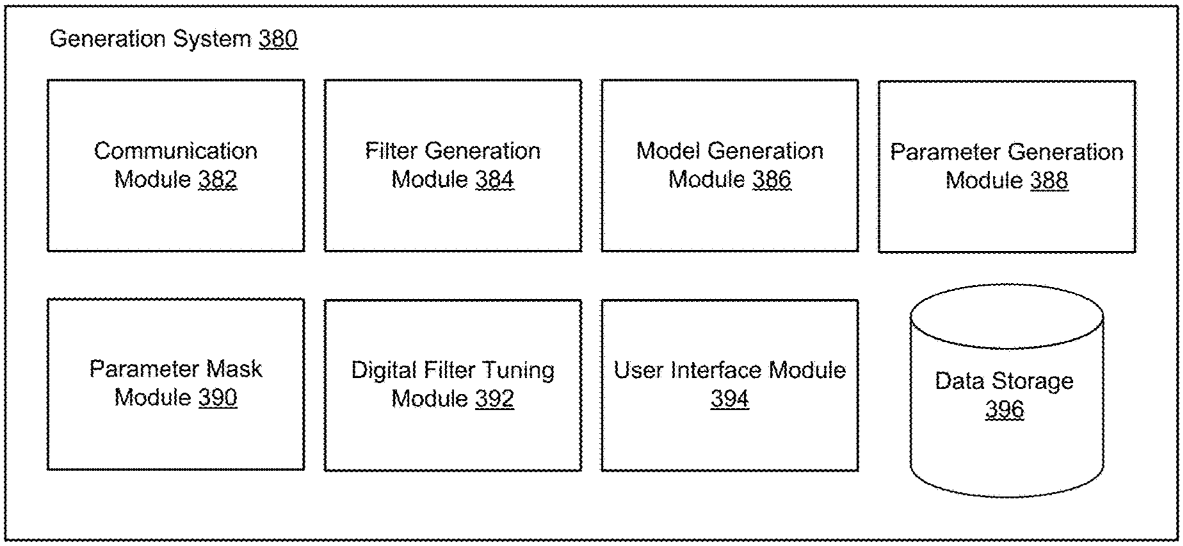
FIG. 3B is a block depicting components of a filter generation system in some embodiments

Although a limited number of engines, components, and modules are depicted in FIGS. 2A and 2B and FIG. 3B, there may be any number of engines, components, and modules or the like. Further, individual engines, components, and modules may perform any number of functions, including functions of multiple modules as described herein. Moreover, although the virtual auditory display system 102, the first ear-worn device 102*a*, the second ear-worn device 102*b*, and the generation system 380 may be depicted as having a single one of several engines, components, or modules, the virtual auditory display system 102, the first ear-worn device 102*a*, the second ear-worn device 102*b*, and the generation system 380 may have multiple engines, components, modules, or the like that perform a particular function. For example, the first ear-worn device 102*a* is depicted as having a single one of the audio DSP 260, but the first ear-worn device 102*a* may include multiple of the audio DSP 260.

FIG. 3A is a block diagram of a method 300 of personalizing, generating and applying digital filters in some embodiments. A generation system 380 (see FIG. 3B) may perform the generation of digital filters (step 304 through step 310), and the virtual auditory display system 102 may perform the personalization of digital filters (step 302) and the application of digital filters (step 312 through step 314).

A digital filter may be or include one or more parametric equalization (EQ) filters that allow for adjustment of parameters such as the center frequency, gain, quality (Q or q), cutoff frequency, slope, bandwidth and/or filter type. The parametric EQ filters may be or include biquad filters. The biquad filters may be or include peaking, low shelf, and high shelf filters. In some embodiments, the digital filters may be or include one or more finite impulse response (FIR) filters. The FIR filters may be generated from or based on one or more infinite impulse response (IIR) filters. In some embodiments, the digital filters may be or include one or more IIR filters, or any other suitable type of digital filter.

The digital filters that the generation system 380 generates may be organized into multiple groups. The groups of digital filters may include a group of notch filters, a group of head shadow filters, a group of shelf filters, a group of peak filters, a group of beam filters, a group of stereo filters, a group of rear filters, a group of top filters, a group of top transition filters, a group of bottom filters, a group of bottom transition filters, and a group of broadside filters. Other groups are possible. Certain digital filters or groups of digital filters may be utilized for purposes of setting the locations of sounds in virtual auditory space (for example groups of notch filters). Certain digital filters or groups of digital filters may be utilized for purposes of ensuring that sounds meet required thresholds of tonal quality, clarity, brightness, and the like.

A digital filter may be or include an algorithm and one or more parameters for the algorithm. For example, the algorithm may be or include a high shelf, a low shelf, and a peaking algorithm. The one or more parameters may be or include a center frequency, a quality (Q or q), a gain, and a sampling frequency. For example, a notch digital filter may specify a peaking algorithm, an initial center frequency of 6600 Hz, a Q of 15, and an initial gain of −85 decibels (dB). The one or more parameters may be modified. For example, an initial center frequency may be shifted to obtain a shifted center frequency and an initial gain may be modified by a parameter modifier (see, for example, the discussion with reference to FIGS. 7A through 7X) and a factor that has any value, such as a value between 0 and 1, inclusive. The digital filter may be or include the one or more parameters as modified.

Digital filters may be generated and utilized based on how the digital filters represent individuals' geometries interact with sound waves. For example, a digital filter having a high shelf algorithm may produce a high shelf that may be a virtual representation of how the geometry of individual's concha bowl interacts with sound waves.

The method 300 may include a step 302 of calibration and/or personalization. The virtual auditory display system 102 (for example, the calibration and personalization module 208) may perform calibration of the IMUs and/or other sensors of the virtual auditory display device 100 using various devices and/or services 326, such as one or both of the first ear-worn device 102*a* and the second ear-worn device 102*b*, a cloud-based computing service, and/or a peripheral to a computing device, such as a camera.

The virtual auditory display system 102 (for example, the calibration and personalization module 208) may perform personalization of the virtual auditory display system using various methodologies and/or techniques, such as: 1) a user-directed action and/or perception of acoustic cues 316; 2) acoustic quality user feedback 318; 3) anatomical measurements 320; 4) demographic information 322; and 5) audiometric measurements 324.

User-directed action and/or perception of acoustic cues 316 may include capturing responses of a user to locations of acoustic cues. Responses may be vocal responses of a user captured using a microphone of a computing device, gestures (for example, head and/or arm movements) of a user captured using a camera of a computing device and/or one or both of the first ear-worn device 102*a* and the second ear-worn device 102*b*, and user input captured via a graphical user interface (GUI) of a computing device.

Acoustic quality user feedback 318 may include user-directed feedback on acoustic quality (for example, responses to questions on quality metrics such as brightness, warmth, clarity, etc., responses to questions provided by a GUI or an Audio User Interface (AUI)), and observations of user behavior such as user song and/or notification preferences via, for example, a GUI or AUI.

Anatomical measurements 320 may include measurements of user anatomical features, such as the head, the pinna, and/or the concha, via scanning or prediction. Anatomical measurements 320 of one or more users may also include direct measurements (for example, via silicone ear impressions) and indirect measurements obtained via sensors and/or computer peripherals.

Demographic information 322 may include information provided by users such as user age or other demographics and a digital fingerprint of a user generated from one or more user features such as age, gender, and/or other user characteristics.

Audiometric measurements 324 may include those provided by user input and or obtained via acoustic measurements, such as in an anechoic chamber while audio signals are emitted from different known locations.

The method 300 may include a step 304 of the generation system 380 (for example, a model generation module 386 of the generation system 380, see FIG. 3B) generating, modifying, and/or receiving multiple models 370. The multiple models 370 may include one or more outer ear models 354, which may include one or more pinna models 356 and one or more concha models 358. The multiple models 370 may also include one or more head and torso models 360 and one or more canal models 362. The generation system 380 may generate the multiple models 370 based on the calibration and/or personalization information obtained in step 302.

For each model of the multiple models 370, for each location in virtual auditory space, the generation system 380 may generate one or more first digital filters (for the left ear) and one or more second digital filters (for the right ear) based on the model. Accordingly, for the multiple models 370, for each location in virtual auditory space, the generation system 380 may generate multiple first digital filters and multiple second digital filters.

For example, for the one or more head and torso models 360, the generation system 380 may generate one or more first digital filters and one or more second digital filters that take into account shoulder width and/or breadth, head diameter, neck height, and other factors. For the one or more concha models 358 the generation system 380 may generate one or more first digital filters and one or more second digital filters that represent the acoustic effects of the physical features of the concha. These features include (but are not limited to), concha depth, width, and angle.

As another example, for the one or more pinna models 356, the generation system 380 may generate one or more first digital filters and one or more second digital filters that represent the acoustic effects of the physical features of the pinna. These features include (but are not limited to), pinna height, width, depth, location on the head, and flare angle relative to head. For the one or more canal models 362, the generation system 380 may generate one or more first digital filters and one or more second digital filters that take into account the physical proportions of the pinna, concha, and other ear components.

Also at the step 304, for each location in virtual auditory space, the generation system 380 may sum, aggregate, or otherwise combine the multiple first digital filters into combined first digital filters, and may sum, aggregate, or otherwise combine the multiple second digital filters into combined second digital filters. The combined first digital filters may be or include one or more finite impulse response (FIR) filters. The combined second digital filters may also be or include one or more FIR filters. Accordingly, at the conclusion of the step 304, for all the locations in virtual auditory space, there may be a set of combined first digital filters and a set of combined second digital filters.

At a step 306, the generation system 380 may generate a mapping or association of the combined first digital filters to their corresponding locations in virtual auditory space for the left ear. The generation system 380 may also generate a mapping or association of the combined second digital filters to their corresponding locations in virtual auditory space for the right ear. The generation system 380 may utilize cartesian, polar, and/or spherical polar coordinates for the mapping or association.

At a step 308, the generation system 380 may generate a file, a database, or other data structure that includes the mapping or association of the combined first digital filters to their corresponding locations in virtual auditory space and the mapping or association of the combined second digital filters to their corresponding locations in virtual auditory space.

At a step 310, the generation system 380 may provide or store the file, the database, or other data structure on one or more non-transitory computer-readable media of a device. The device may be the first ear-worn device 102*a* and/or the second ear-worn device 102*b*, a mobile device such as a phone or a tablet, a laptop or desktop computer, another device, or any combination of the foregoing.

At a step 312, the virtual auditory display system 102 may select the combined first digital filters and the combined second digital filters for use. After selection, at a step 314, the virtual auditory display system 102 may utilize the combined first digital filters and the combined second digital filters in various applications, such as to render music. Various applications of the disclosed technology are discussed with reference to, for example, FIG. 12.

In some embodiments, at step 304, for each model of the multiple models 370, the generation system 380 may generate one or more first digital filters and one or more second digital filters for each azimuth and elevation combination at locations in virtual auditory space of one degree increments of azimuth and elevation at a distance of one meter (1 m) from a center point representing a virtual listener in virtual auditory space. The one degree increments of azimuth are from approximately negative 180 degrees, inclusive, to approximately positive 180 degrees, inclusive. The one degree increments of elevation are from approximately negative 90 degrees, inclusive, to approximately 90 degrees, inclusive. Accordingly, there are 65,160 combinations of azimuth and elevation, and therefore 65,160 locations in virtual auditory space, each location being at a distance of 1 m from the center point. Therefore, the generation system 380 may generate 65,160 sets of one or more first digital filters and 65,160 sets of one or more second digital filters.

In some embodiments, the method 300 may include a step of the generation system 380 reducing the number of locations in virtual auditory space for which digital filters are generated or stored. For example, after step 304, the generation system 380 may a select a proper subset from the set of combined first digital filters and a proper subset from the set of combined second digital filters.

In embodiments where there are 65,160 locations in virtual auditory space, the generation system 380 may select a proper subset from the set of combined first digital filters that includes approximately 7,000, such as 7,220, combined first digital filters. Similarly, the generation system 380 may select a proper subset from the set of combined second digital filters that includes approximately 7,000, such as 7,220, combined second digital filters.

The generation system 380 may select a proper subset that adequately represent locations in virtual auditory space, while reducing the amount of storage required for the sets of digital filters and reducing the amount of time to select and process digital filters. The generation system 380 may achieve these objectives in other ways, such as by generating mapping or associations for a reduced number of locations in virtual auditory space or storing the mapping or associations for a reduced number of locations in virtual auditory space.

In some embodiments, at step 304 the generation system 380 does not sum, aggregate, or otherwise combine the multiple first digital filters into combined first digital filters and the multiple second digital filters into combined second digital filters. Accordingly, at the conclusion of the step 304, for all the locations in virtual auditory space, there may be a set of multiple first digital filters and a set of multiple second digital filters. A proper subset of the set of multiple first digital filters and a proper subset of the set of multiple second digital filters may be utilized as described herein.

In such embodiments, at step 306 the generation system 380 may instead generate a mapping or association of the multiple first digital filters to their corresponding locations in virtual auditory space for the left ear and generate a mapping or association of the multiple second digital filters to their corresponding locations in virtual auditory space for the right ear.

Further in such embodiments, at step 308 the generation system 380 may instead generate a file, a database, or other data structure that includes the mapping or association of the multiple first digital filters to their corresponding locations in virtual auditory space and the mapping or association of the multiple combined second digital filters to their corresponding locations in virtual auditory space.

In some embodiments, the generation system 380 generates multiple sets of digital filters for the locations in virtual auditory space. The generation system 380 may generate a first set of digital filters for the left ear and a first set of digital filters for the right ear as described herein. The generation system 380 may then generate one or more second sets of digital filters for the left ear and one or more second sets of digital filters for the right ear based on the first set of digital filters for the left ear and the first set of digital filters for the right ear. Each pair of sets may be for a different archetype representing a different user population or grouping of users.

The generation system 380 may generate the one or more second sets of digital filters for the left ear and the one or more second sets of digital filters for the right ear by modifying one or more parameters of the digital filters for the left ear and the digital filters for the right ear. For example, the generation system 380 may modify the center frequency of notch filters that are included in the first set of digital filters for the left ear and the first set of digital filters for the right ear. The generation system 380 may modify the center frequency of notch filters to personalize digital filters to a user, as described with reference to, for example, FIGS. 15A through 15F. The generation system 380 may do so to adjust for a delta between an actual location of a sound in virtual auditory space and the location of the sound the wearer perceives.

In some embodiments, the generation system 380 may generate a first set of digital filters for the left ear and a first set of digital filters for the right ear for a distance of 1 m from a center point representing a virtual listener in virtual auditory space, as described herein. The generation system 380 may generate one or more second sets of digital filters for the left ear and the one or more second sets of digital filters for the right ear for other distances from the center point. The generation system 380 may generate one or more second sets of digital filters for the left ear based on the first set of digital filters for the left ear and one or more second sets of digital filters for the right ear based on the first set of digital filters for the right ear. For example, the generation system 380 may increase the gain of digital filters for distances closer than 1 m from the center point and may decrease the gain of digital filters for distances further than 1 m from the center point. Other methods will be apparent.

FIG. 3B is a block depicting components of the generation system 380 in some embodiments. The generation system 380 may include a communication module 382, a filter generation module 384, a model generation module 386, a parameter generation module 388, a parameter mask module 390, a digital filter tuning module 392, a user interface module 394, and a data storage 396.

The communication module 382 may send requests and/or data between components of the generation system 380 and any other systems, components or devices, such as the virtual auditory display system 102. The communication module 382 may also receive requests and/or data between components of the generation system 380 and any other systems, components or devices.

The filter generation module 384 may generate digital filters and the acoustic environment digital filters. A filter may be or include one or more algorithms and, optionally, one or more parameters for the one or more algorithms.

The model generation module 386 may generate, modify, or access multiple models. The parameter generation module 388 may generate parameters for digital filters.

The parameter mask module 390 may generate parameter modifier masks. The parameter mask module 390 may use image processing techniques to generate parameter modifier masks. The parameter mask module 390 may determine one or more parameter modifiers to one or more parameter of filters using the parameter modifier masks. The parameter mask module 390 may modify the one or more parameter using the one or more parameter modifiers.

The digital filter tuning module 392 may receive parameters for digital filters from users and modify digital filters based on the received parameters. The user interface module 394 may provide user interfaces that allow users to, among other things, listen to sound output from audio signals generated by application of digital filters and modify parameters of digital filters.

The data storage 396 may include data stored, accessed, and/or modified by any of the engines, components, modules or the like of the generation system 380. The data storage 396 may include any number of data storage structures such as tables, databases, lists, and/or the like. The data storage 396 may include data that is stored in memory (for example, random access memory (RAM)), on disk, or some combination of in-memory and on-disk.

Figure 4A:
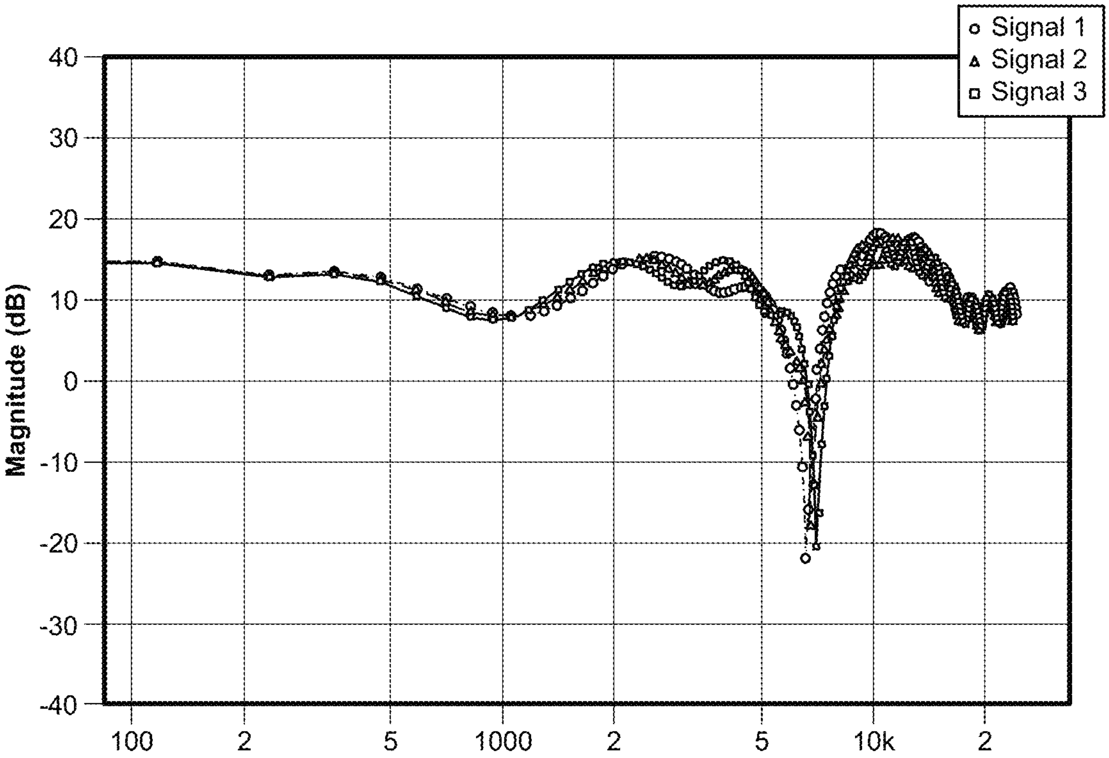
FIGS. 4A-4C are graphs of frequency responses of digital audio signals in some embodiments.
Figure 4B:
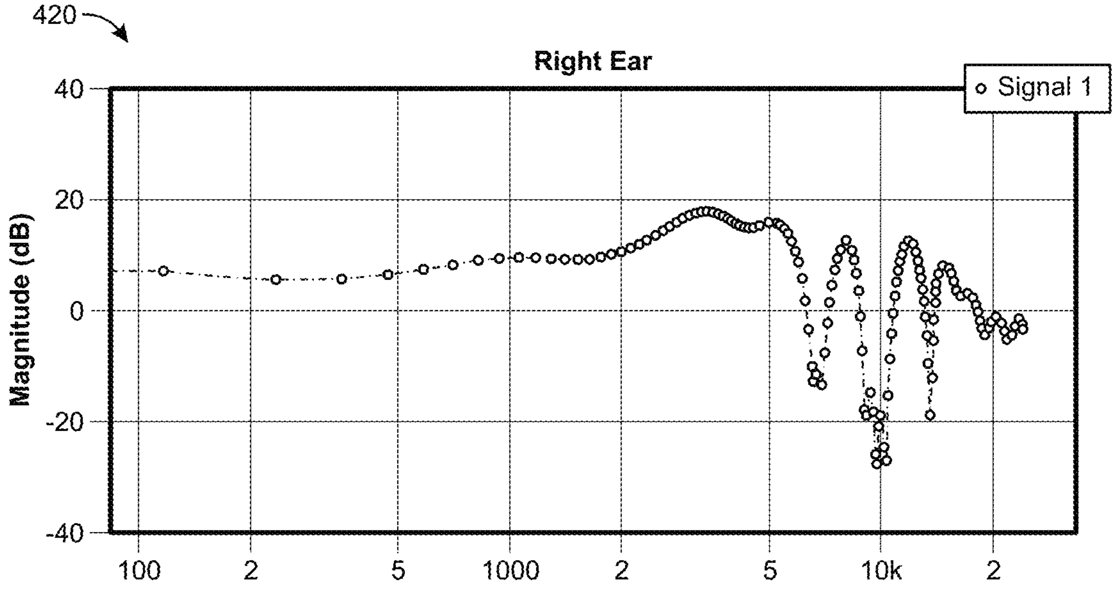
Figure 4C:
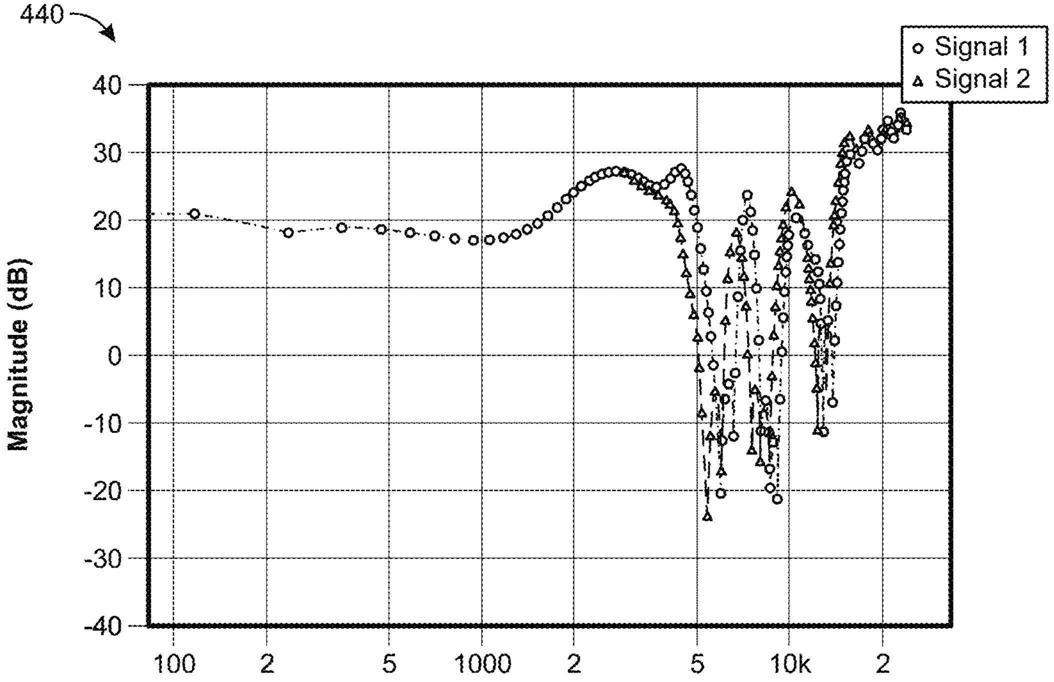

FIGS. 4A-4C are graphs of frequency responses of digital audio signals in some embodiments. FIG. 4A is a graph 400 the frequency response for three audio signals. Each audio signal has a notch at a different center frequency. The center frequency of the notch is a factor in specifying the location in virtual auditory space of the sound corresponding to the audio signal, meaning where a user (for example, a wearer of the first ear-worn device 102*a* and the second ear-worn device 102*b*) perceives the location of the sound to be.

The first audio signal is for a first sound that has a first location in virtual auditory space at a distance of one (1) meter (m), zero degrees (0°) azimuth and zero degrees (0°) elevation. The second audio signal is for a second sound that has a second location in virtual auditory space at a distance of one (1) m, five degrees (5°) azimuth and zero degrees (0°) elevation The third audio signal is for a third sound that has a third location in virtual auditory space at a distance of one (1) m, ten degrees (10°) azimuth and zero degrees (0°)

elevation. FIG. 4A shows the variation of the center frequency notch in the three signals due to the differences in locations in virtual auditory space. The virtual auditory display system 102 has applied a notch filter to the three audio signals produce each notch in each of the three frequency responses in order to produce the three sounds at the specified locations in virtual auditory space. The notch filter may be or include parametric EQ filters with the parameters being the center frequency, the gain, and the bandwidth.

FIG. 4B is a graph 420 of a frequency response of an audio signal to which digital filters have been applied according to some embodiments. The frequency response has three notches at three different center frequencies. The audio signal is for a sound that has a location in virtual auditory space at a distance of one (1) meter (m), zero degrees (0°) azimuth and zero degrees (0°) elevation. The virtual auditory display system 102 has applied three notch filters to produce the three notches in the frequency response of the audio signal. The notch filters may be or include parametric EQ filters with the parameters being the center frequency, the gain, and the bandwidth.

FIG. 4C is a graph 440 of frequency responses of two audio signals to which digital filters have been applied according to some embodiments. Each frequency response has a notch at a different center frequency. The virtual auditory display system 102 has applied three notch filters to produce the three notches in each frequency response. The notch filters may be or include parametric EQ filters with the parameters being the center frequency, the gain, and the bandwidth.

In the examples depicted in FIGS. 4A-4C, the peak-to-trough decibel values of notches of the azimuthal values between negative ten degrees (−10°) to ninety-five degrees (95°) and the elevation values of between negative thirty degrees (−30°) to forty-five degrees (45°) reach<negative thirty (−30) decibels (dB). When a virtual sound-source exists within the proposed azimuth-elevation bounds, the peak-to-trough decibel value of −30 dB or more may be beneficial for producing accurate sound-source localization for the hearer.

Figure 5A:
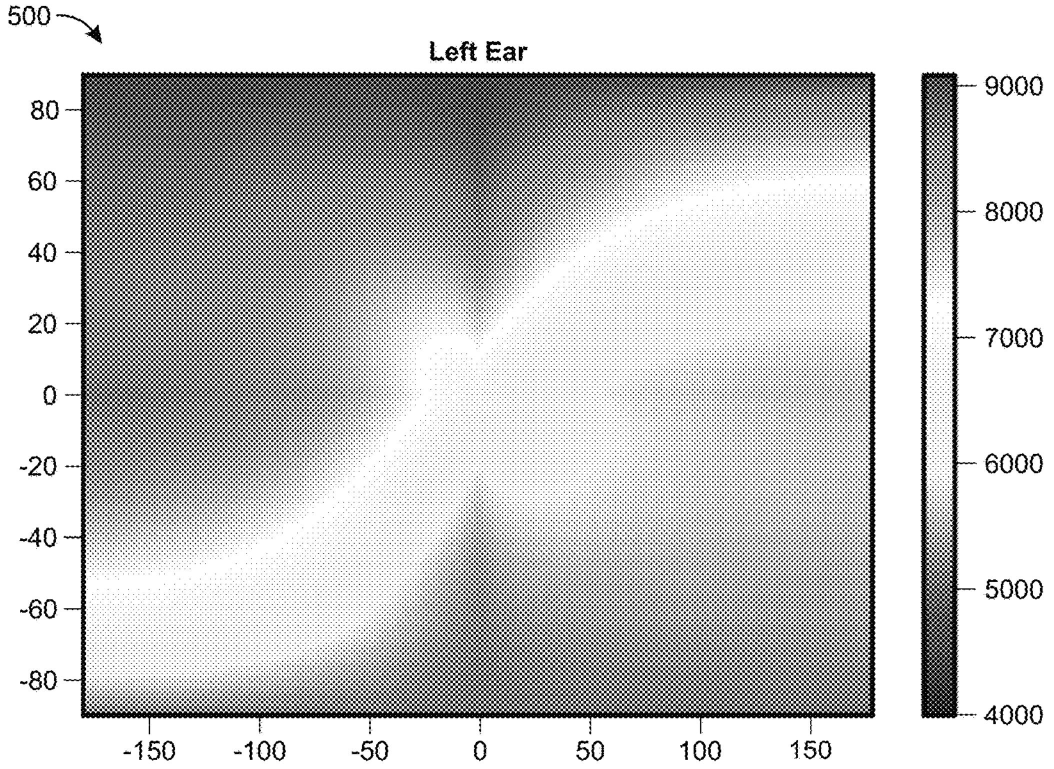
FIG. 5A depicts a distribution of center frequencies as a function of azimuth (x-axis) and elevation (y-axis) for the left ear.
Figure 5B:
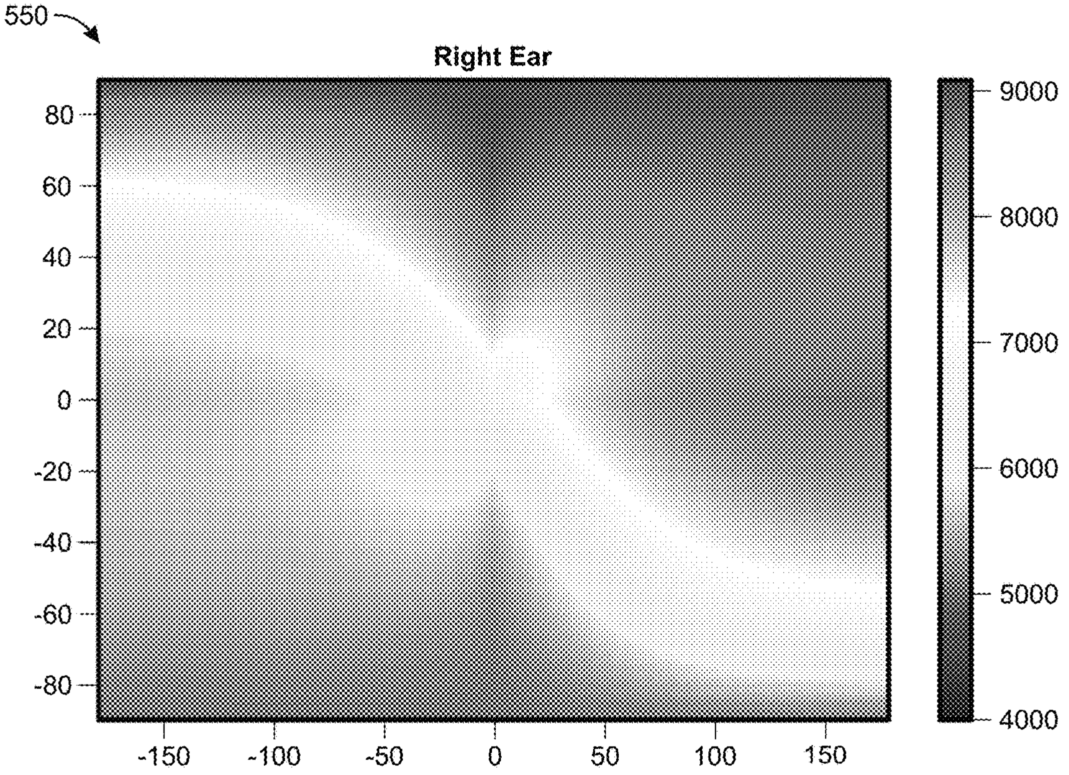
FIG. 5B depicts a distribution of center frequencies as a function of azimuth (x-axis) and elevation (y-axis) for the right ear.

FIG. 5A depicts a distribution 500 of center frequencies as a function of azimuth (x-axis) and elevation (y-axis) for the left ear. FIG. 5B depicts a distribution 550 of center frequencies as a function of azimuth (x-axis) and elevation (y-axis) for the right ear. The distribution 500 and the distribution 550 indicate that, for any particular azimuth, the center frequencies follow a generally sigmoidal curve or have a generally sigmoidal shape or distribution. Similarly, for any particular elevation, the center frequencies follow a generally sigmoidal curve or have a generally sigmoidal shape or distribution.

Figure 6A:
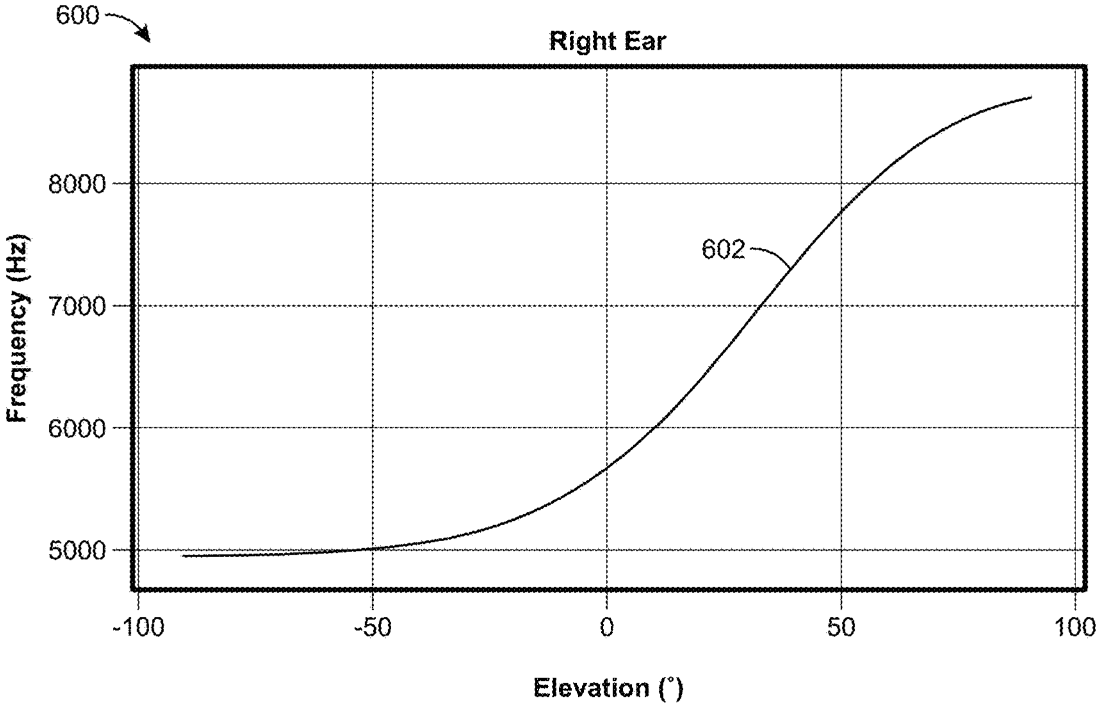
FIG. 6A is a graph of the center frequency of a digital filter as a function of elevation angle relative to a head orientation according to some embodiments.

For example, FIG. 6A is a graph 600 of a center frequency curve 602 as a function of elevation (x-axis) for the right ear where the azimuth is zero degrees (0°). The center frequency values range from about approximately 4900 Hz to about approximately 8700 Hz from negative 90 degrees elevation to 90 degrees elevation. The center frequency curve 602 has a generally sigmoidal shape or distribution.

Returning to FIGS. 5A and 5B, the virtual auditory display system 102 may utilize the distribution 500 and/or the distribution 550 to determine the center frequencies for one or more notches in the frequency spectrums of audio signals. The virtual auditory display system 102 may determine the center frequencies for the one or more notches based on the location of the sounds in virtual auditory space that the audio signal will cause the first ear-worn device 102a and the second ear-worn device 102b to produce.

That is, based on the location (as specified by, for example, azimuth and elevation) of the sounds in virtual auditory space, the virtual auditory display system 102 may determine the center frequencies for one or more notches in a frequency spectrum of the audio signals that cause the first ear-worn device 102a and the second ear-worn device 102b to produce the sounds. The virtual auditory display system 102 may determine the center frequencies of the first notches in the frequency spectrums of the audio signals by accessing the distribution 500 and the distribution 550. The virtual auditory display system 102 may determine the center frequencies of the second notches and subsequent notches in the frequency spectrums of the audio signals based on the distribution 500 and the distribution 550 and on one or more shifts from the center frequencies obtained from the distribution 500 and the distribution 550.

In some embodiments, in addition to or as an alternative to utilizing the distribution 500 and/or the distribution 550, the virtual auditory display system 102 may utilize one or more center frequency curves, each of which may be for a different azimuth value, like the center frequency curve 602 of FIG. 6A, or a different elevation value. The virtual auditory display system 102 determines the center frequencies for one or more notches in a frequency spectrum of an audio signal, based on the location of the resulting sounds in virtual auditory space.

Figure 6B:
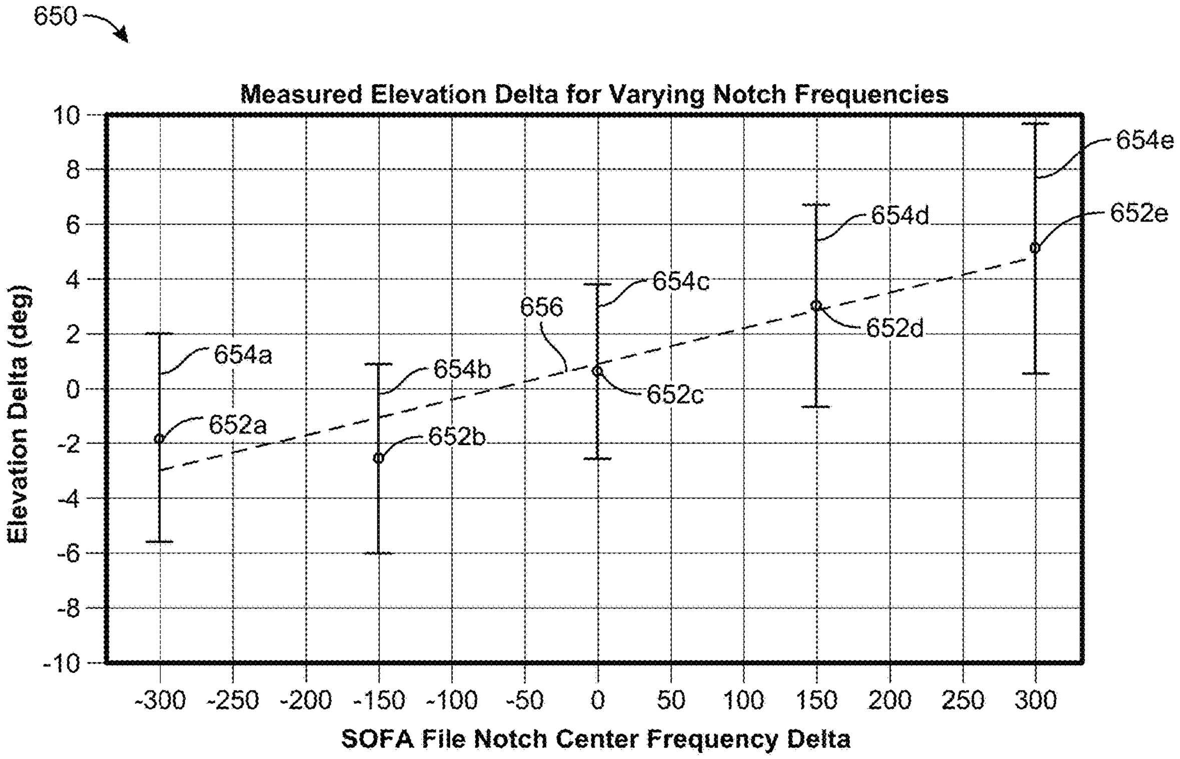
FIG. 6B is a graph of user experience data of multiple trials with five different digital filters, which vary as a function of notch center frequency, in some embodiments.

FIG. 6B is a graph 650 of user experience data of multiple trials with five different digital filters, which vary as a function of notch center frequency, in some embodiments. Each of the point 652a, the point 652b, the point 652c, the point 652d, and the point 652e is the mean of 15 user trials that collected real-time user feedback on perceived sound location in virtual auditory space, for a total of 75 user trials. The bar 654a, the bar 654b, the bar 654c, the bar 654d, and the bar 654e each represent plus or minus one (1) standard deviation. The point 652b, the point 652c, the point 652d and the point 652e demonstrate that there is an observed delta of approximately 2.5° for each 150 Hz added to the notch center frequencies. The line 656 can be fit to the points 652. The virtual auditory display system 102 may utilize the linear function that produced the line 656 to determine the center frequency to use for one or more notches based on the elevation of the sound to be produced. For example, for certain ranges of elevations (for example, between approximately zero degrees and approximately 50 degrees, or between approximately 10 degrees and approximately 40 degrees), the virtual auditory display system 102 may utilize the linear that produced the line 656 to determine one or more shifts from a center frequency in the ranges. The virtual auditory display system 102 may do so in addition to or as an alternative to utilizing the distribution 500 and/or the distribution 550 depicted in FIGS. 5A and 5B.

Figure 7A:
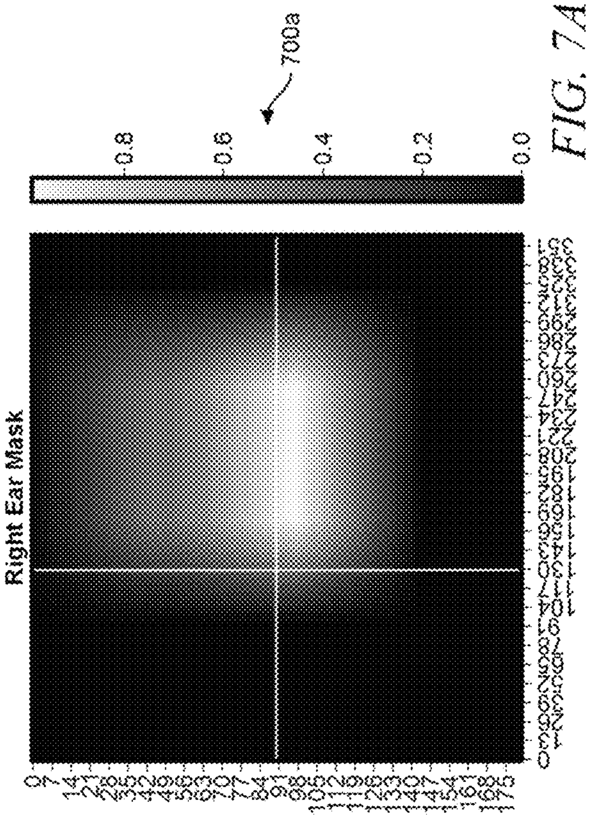
FIGS. 7A through 7X depict parameter modifier masks that may be applied to modify gains of digital filters in some embodiments.
Figure 7B:
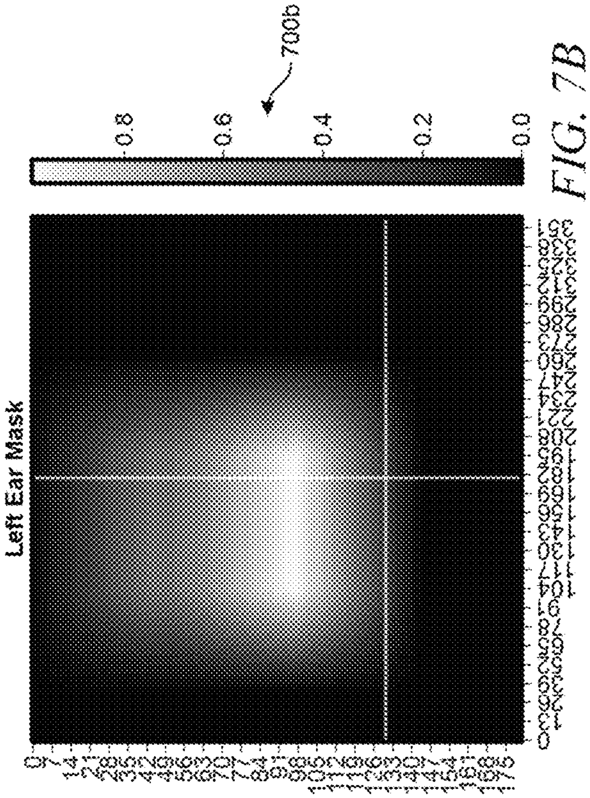
Figure 7C:
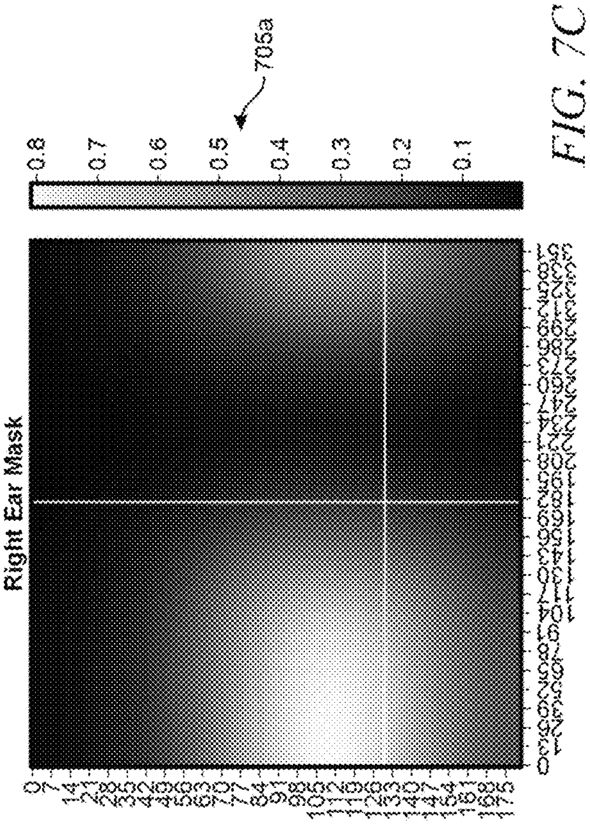
Figure 7D:
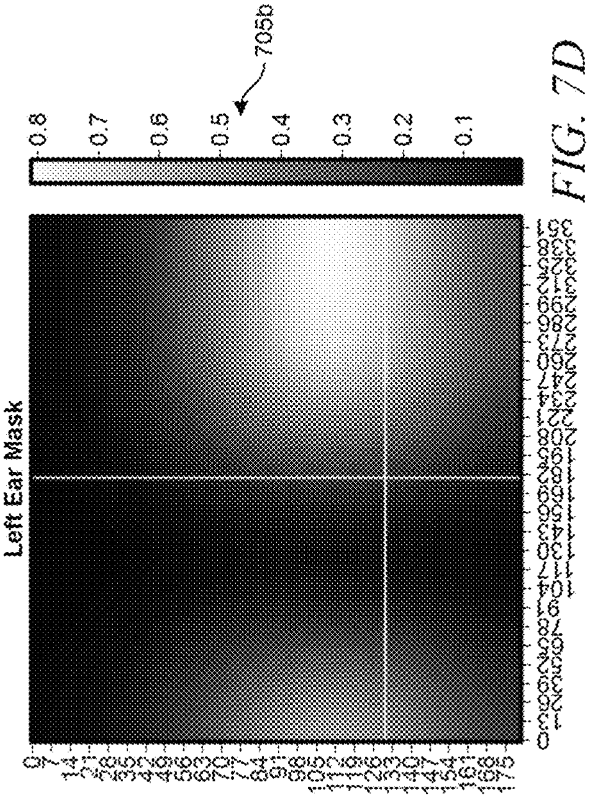
Figure 7E:
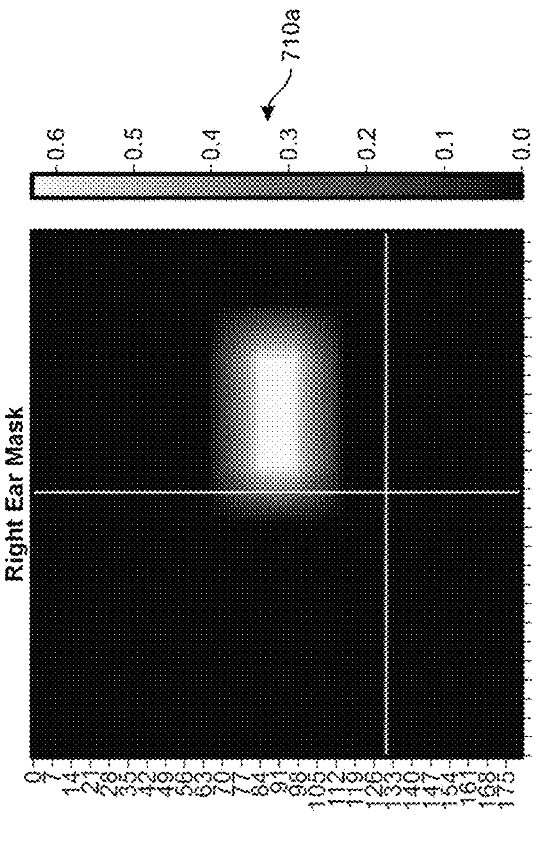
Figure 7F:
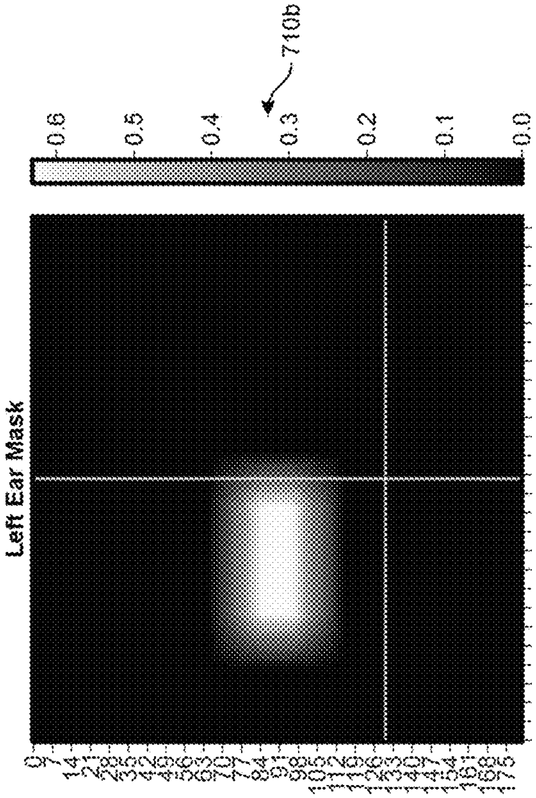
Figure 7G:
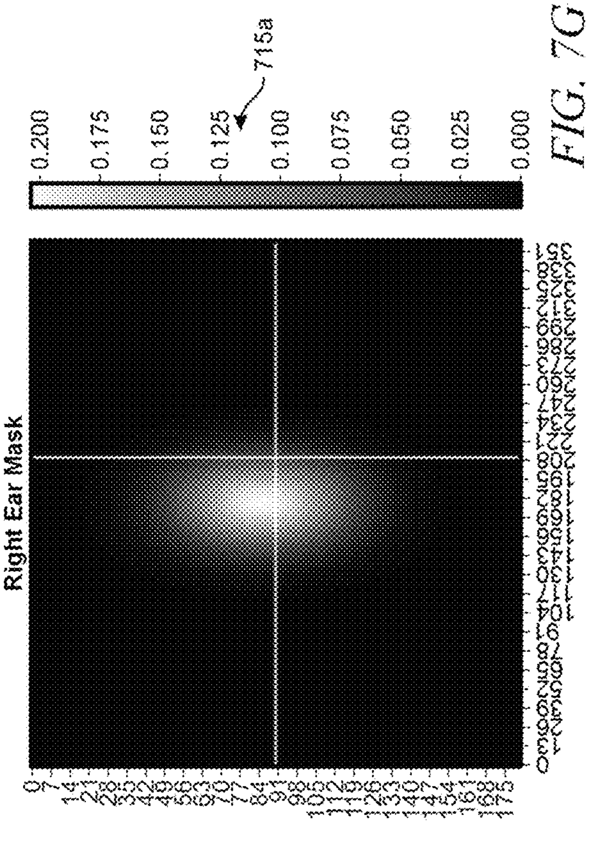
Figure 7H:
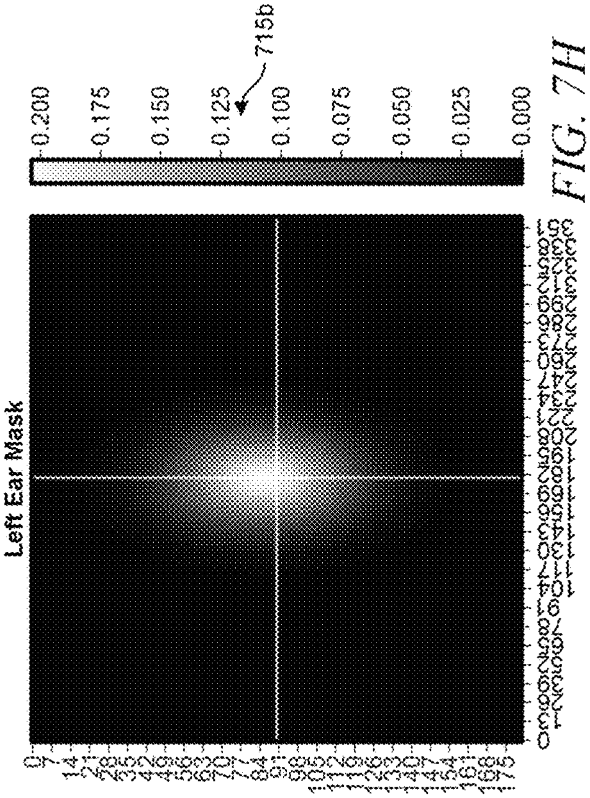
Figure 7I:
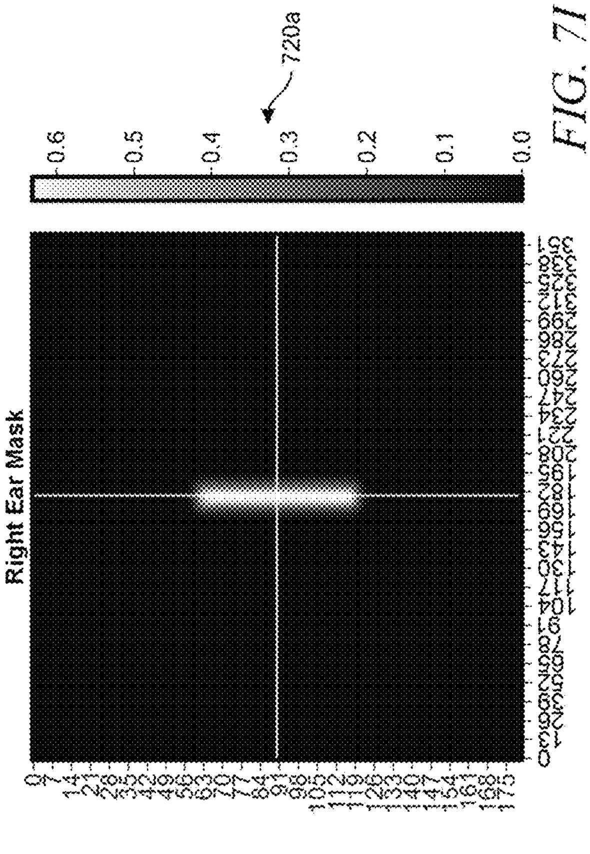
Figure 7J:
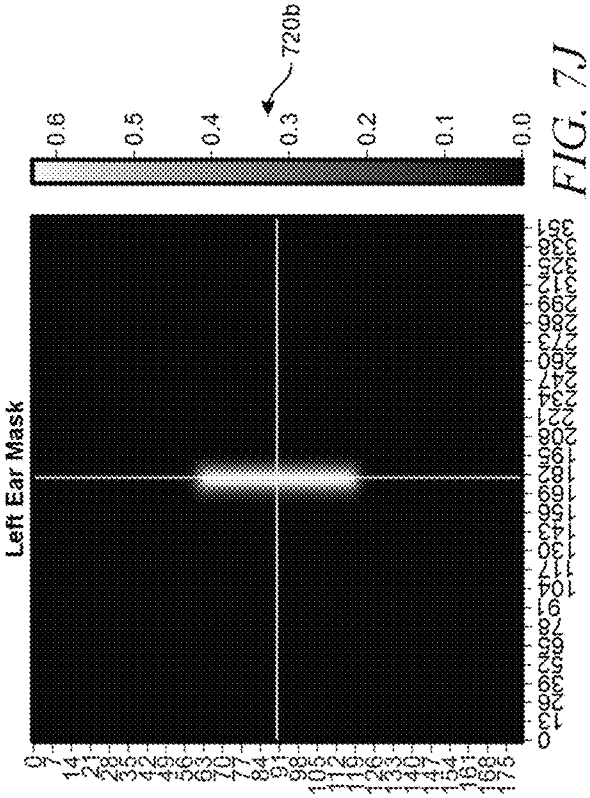
Figure 7K:
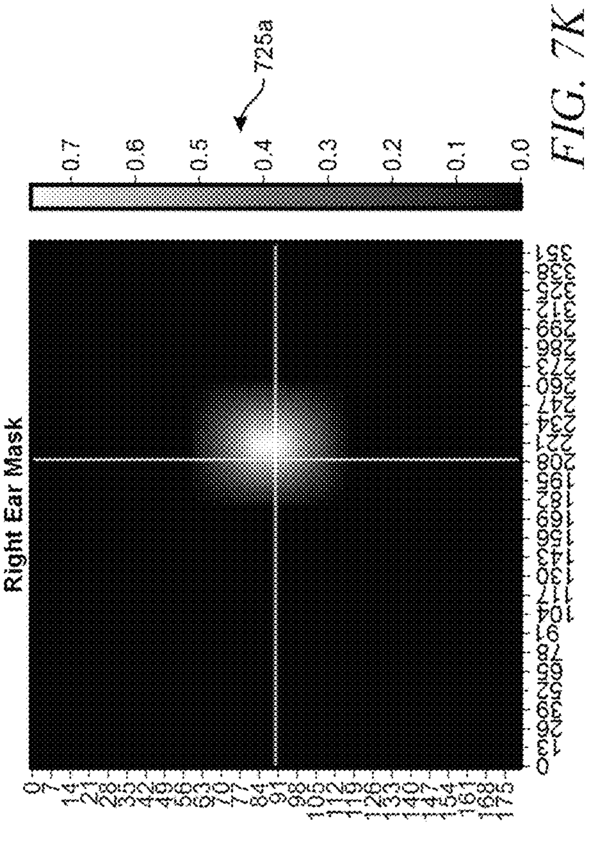
Figure 7L:
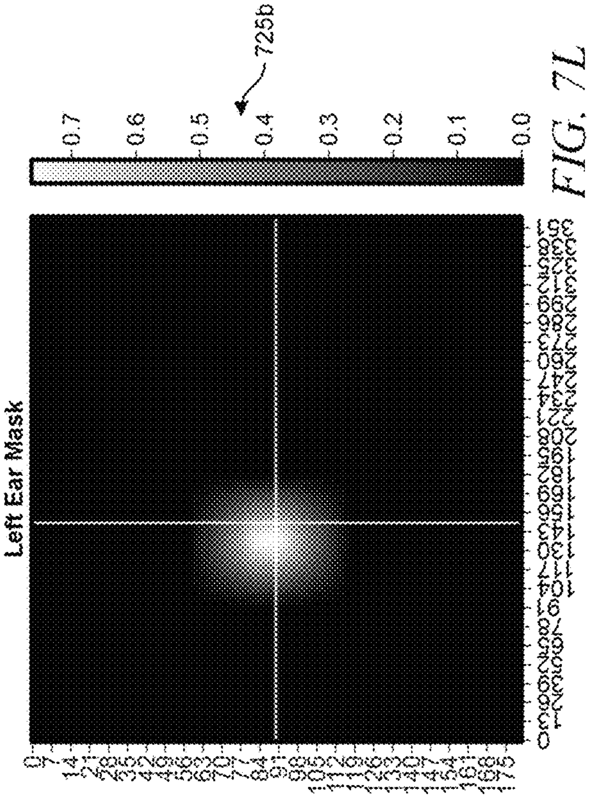
Figure 7M:
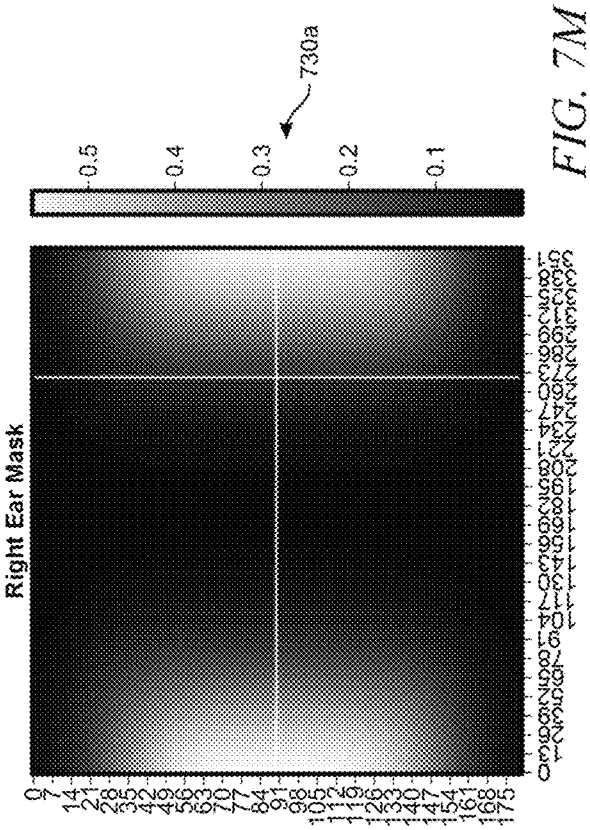
Figure 7N:
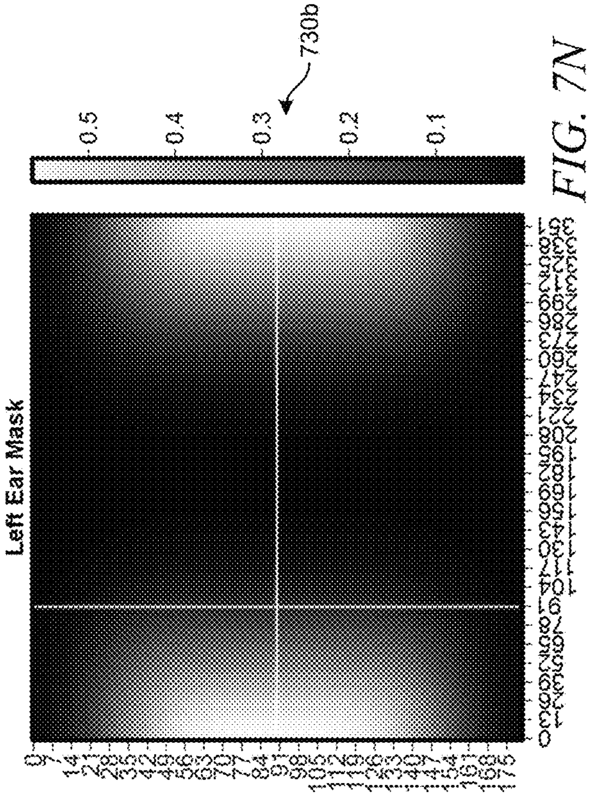
Figure 7O:
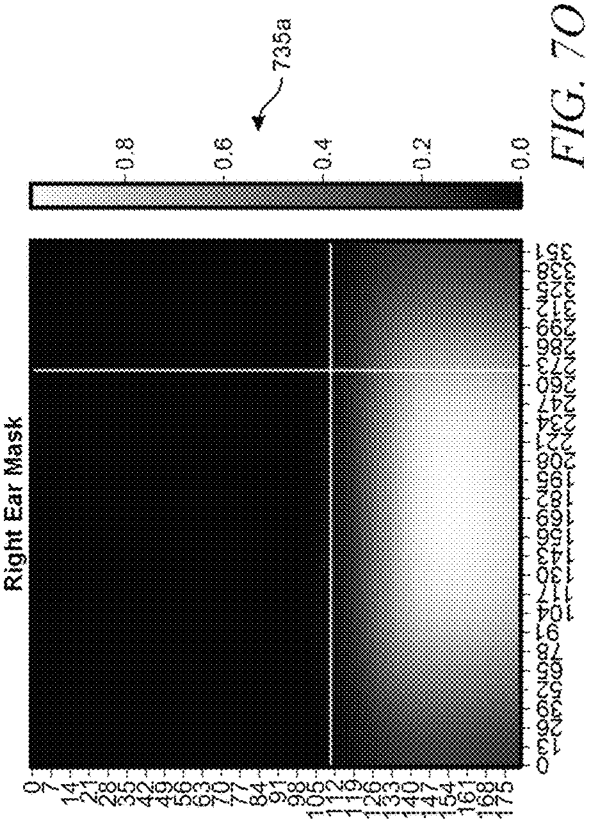
Figure 7P:
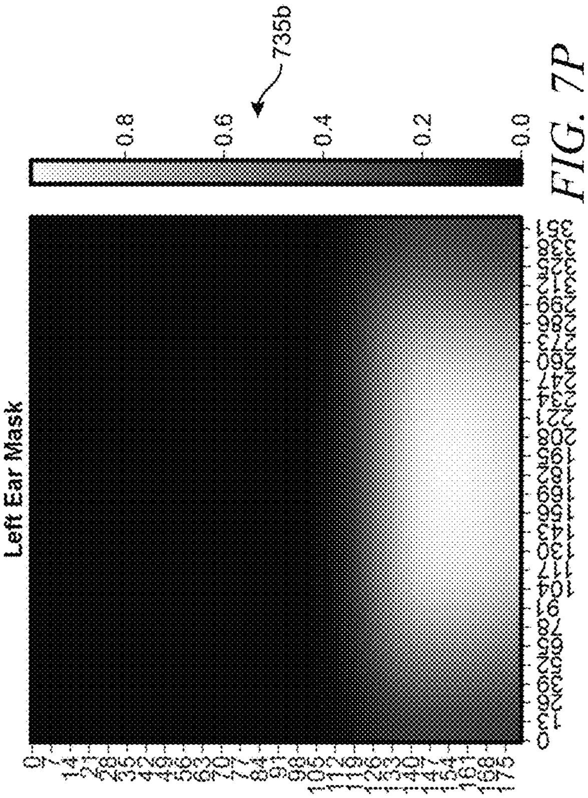
Figure 7Q:
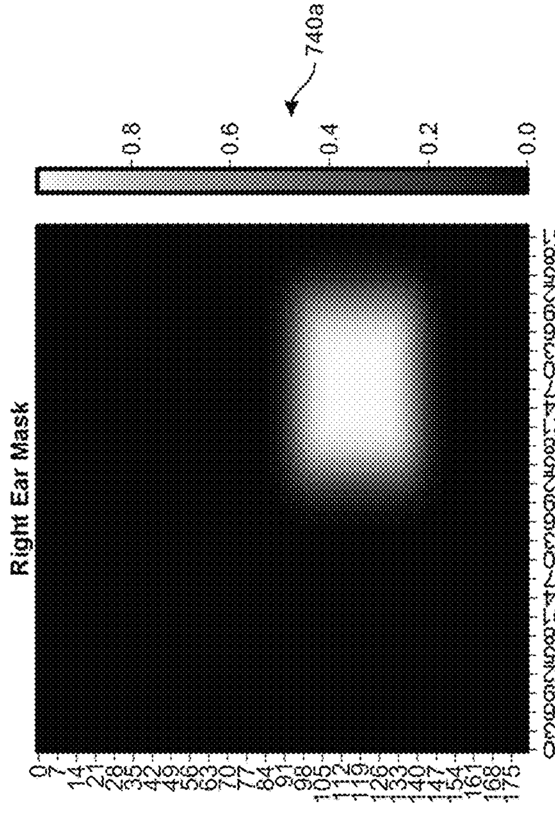
Figure 7R:
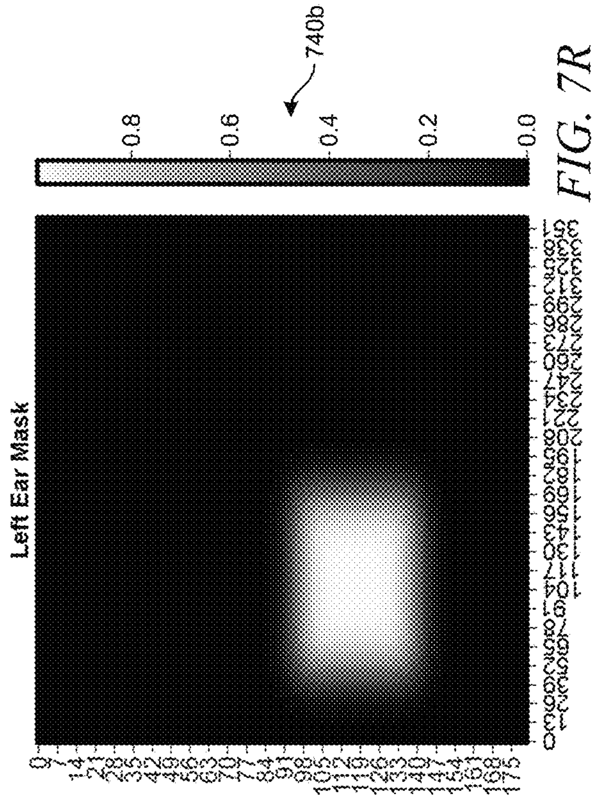
Figure 7S:
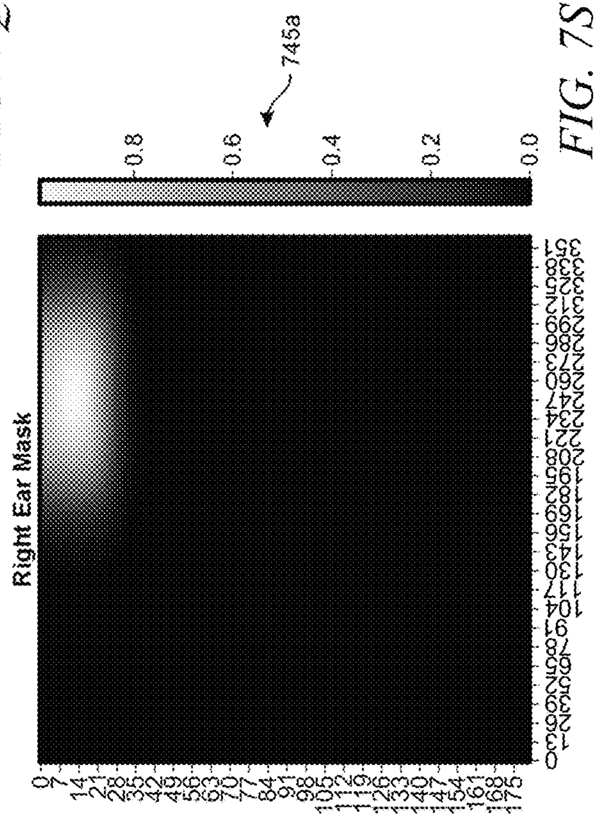
Figure 7T:
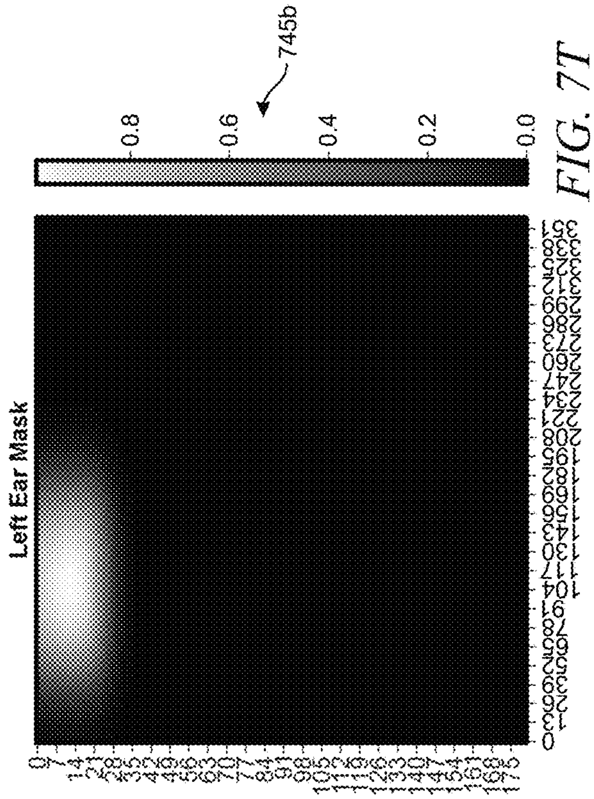
Figure 7U:
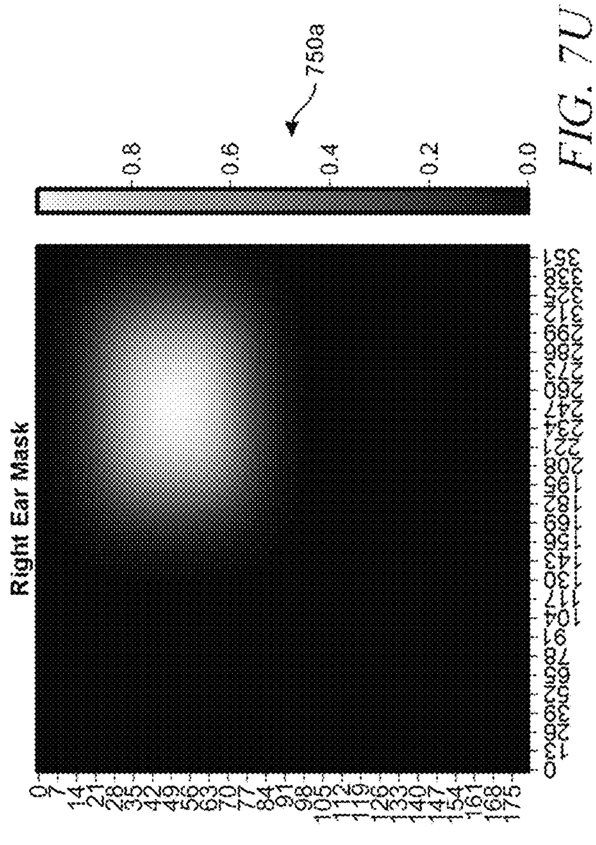
Figure 7V:
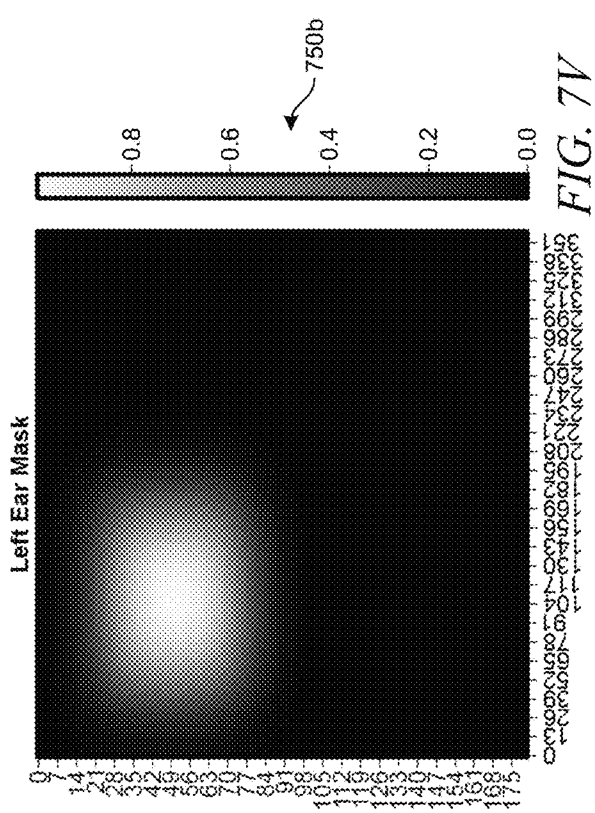
Figure 7W:
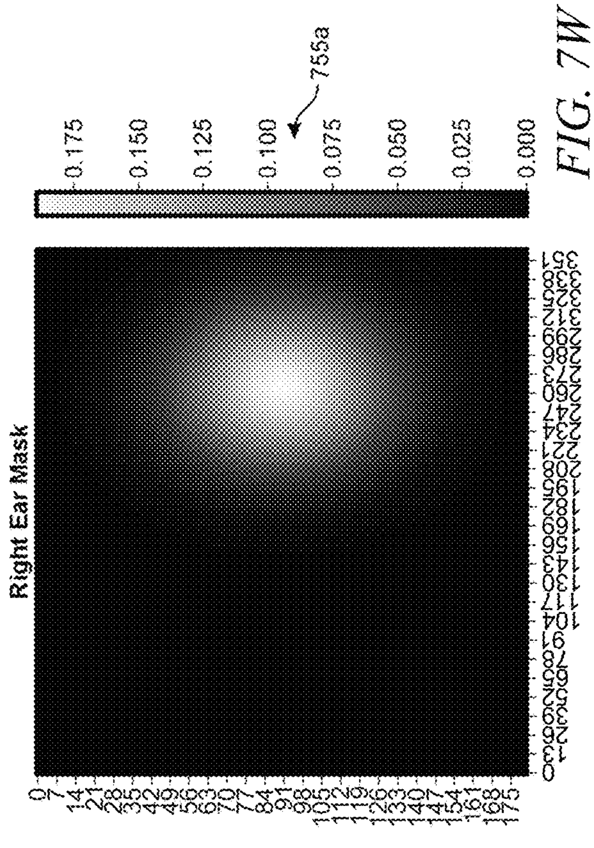
Figure 7X:
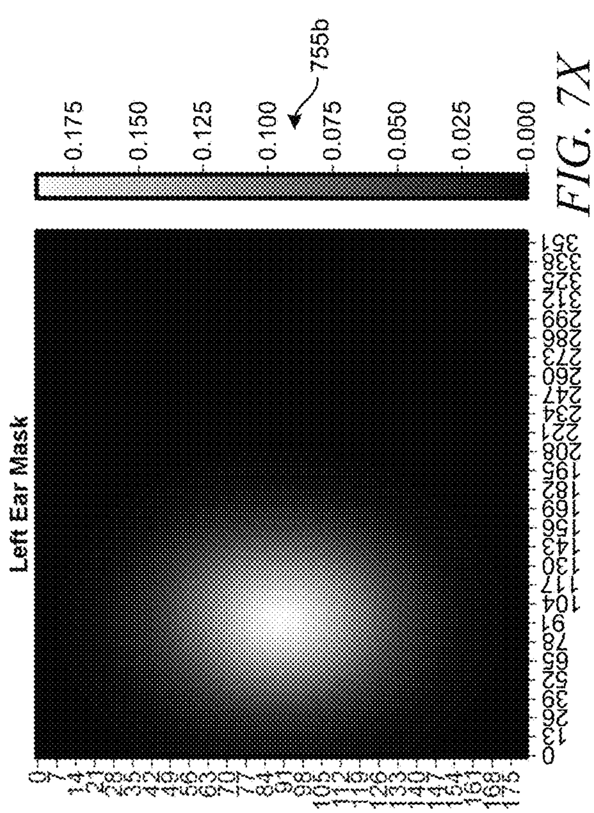

FIGS. 7A through 7X depict parameter modifier masks that may be applied to modify parameters used in generating digital filters in some embodiments. FIG. 7A depicts a right ear parameter modifier mask 700a and FIG. 7B depicts a left ear parameter modifier mask 700b for notch filters. FIG. 7C depicts a right ear parameter modifier mask 705a and FIG. 7D depicts a left ear parameter modifier mask 705b for head shadow filters. FIG. 7E depicts a right ear parameter modifier mask 710a and FIG. 7F depicts a left ear parameter modifier mask 710b for shelf filters. FIG. 7G depicts a right ear parameter modifier mask 715a and FIG. 7H depicts a left ear parameter modifier mask 715b for peak filters. FIG. 7I depicts a right ear parameter modifier mask 720a and FIG.

7J depicts a left ear parameter modifier mask 720*b* for beam filters. FIG. 7K depicts a right ear parameter modifier mask 725*a* and FIG. 7L depicts a left ear parameter modifier mask 725*b* for stereo filters.

FIG. 7M depicts a right ear parameter modifier mask 730*a* and FIG. 7N depicts a left ear parameter modifier mask 730*b* for rear filters. FIG. 7O depicts a right ear parameter modifier mask 735*a* and FIG. 7P depicts a left ear parameter modifier mask 735*b* for top filters. FIG. 7Q depicts a right ear parameter modifier mask 740*a* and FIG. 7R depicts a left ear parameter modifier mask 740*b* for top transition filters. FIG. 7S depicts a right ear parameter modifier mask 745*a* and FIG. 7T depicts a left ear parameter modifier mask 745*b* for bottom filters. FIG. 7U depicts a right ear parameter modifier mask 750*a* and FIG. 7V depicts a left ear parameter modifier mask 750*b* for bottom transition filters. FIG. 7W depicts a right ear parameter modifier mask 755*a* and FIG. 7X depicts a left ear parameter modifier mask 755*b* for broadside filters.

The parameter modifier masks depicted in FIGS. 7A-7X specify parameter modifier values as a function of a location in virtual auditory space as specified by, for example, azimuth and elevation. The parameter modifier values may range from between any two values. In some embodiments, the parameter modifier values range between zero (0), inclusive, and another value, such as one (1), 0.2, 0.4, 0.8, inclusive. The parameter mask module 390 may generate the parameter modifier masks by specifying a particular region in virtual auditory space in which the values are to be one (1), and by specifying that regions other than the particular region have values of zero (0). For example, for the right ear parameter modifier mask 700*a* of FIG. 7A, the particular region in virtual auditory space may be from approximately negative 50 (−50) degrees azimuth to approximately 110 degrees azimuth and from approximately negative 70 (−70) degrees elevation to approximately 30 degrees elevation. The parameter mask module 390 may use other particular regions for the parameter modifier mask 700*a* and the other parameter modifier masks in FIGS. 7A-7X.

The parameter mask module 390 may use image processing algorithms to create continuous transitions of values between the particular region and the other regions to generate the parameter modifier masks with the parameter modifier values. For example, the parameter mask module 390 may use image processing algorithms such as a gaussian function, a sharpening function, a contrast adjustment function, a color correction function, a thresholding function, an edge detection function, and/or a segmentation function. In some embodiments, the parameter mask module 390 uses a gaussian blur mask to generate the parameter modifier values. The parameter mask module 390 may generate the parameter modifier mask for a right ear and then reflect the parameter modifier mask for the right ear about a vertical axis at an azimuth value of zero (0) to obtain the parameter modifier mask for the right ear.

The filter generation module 384 may utilize the parameter modifier masks depicted in FIGS. 7A-7X to select, based on a location for a sound in virtual auditory space, one or more parameter modifiers that the filter generation module 384 may use to modify one or more parameters to obtain one or more modified parameters. For example, the filter generation module 384 may utilize one or more parameter modifiers to modify the gain of digital filters. In some embodiments, the filter generation module 384 multiplies the one or more parameters by the one or more parameter modifiers to obtain the one or more modified parameters. Other uses of parameter modifiers will be apparent.

Figure 8A:
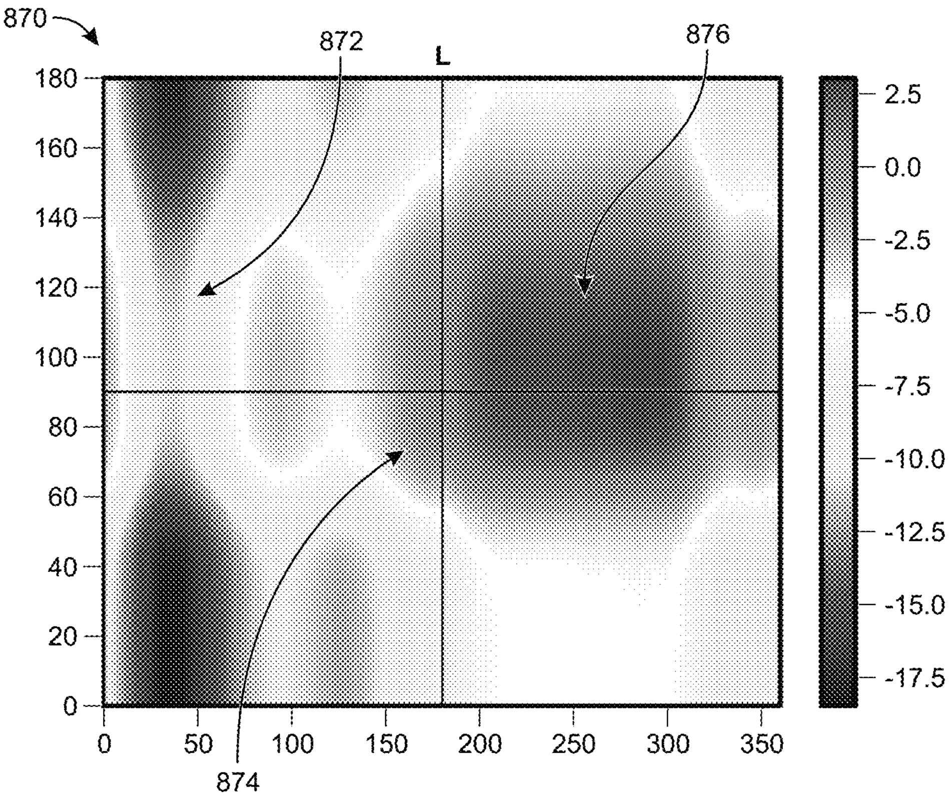
FIGS. 8A and 8B depict head shadow gains produced by digital filters in some embodiments.
Figure 8B:
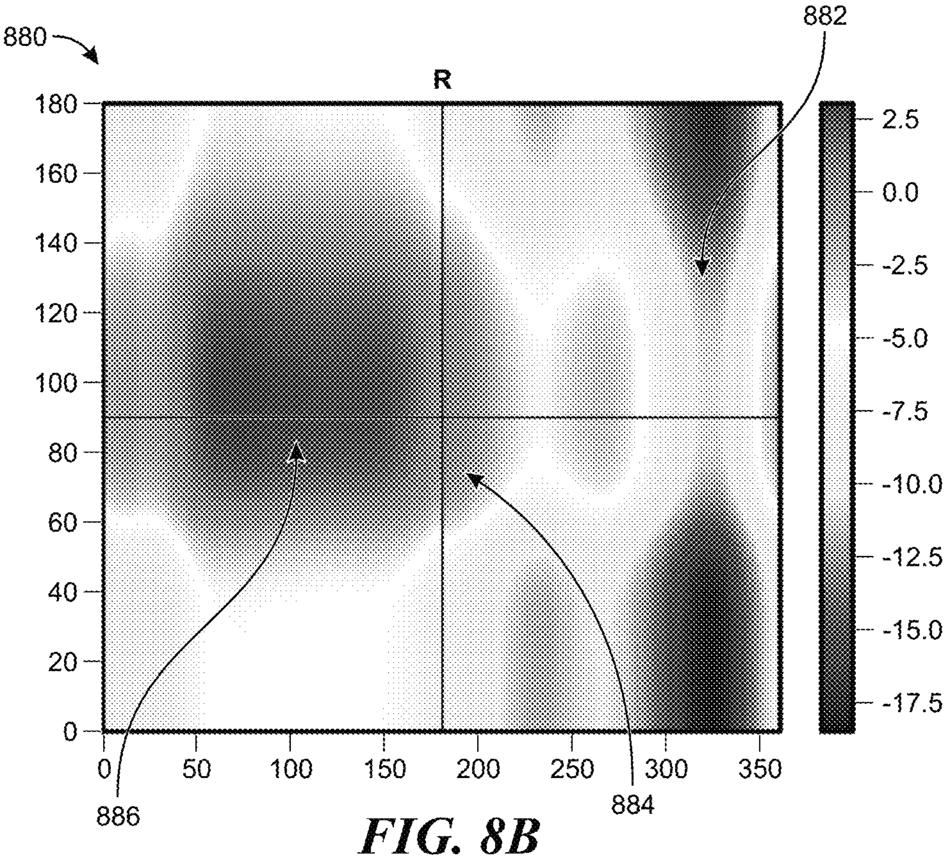

FIG. 8A depicts a gain distribution 870 for a head shadow for a left ear and FIG. 8B depicts a gain distribution 880 for a head shadow for a right ear according to some embodiments. The gain distribution 870 depicts how a gain changes as a sound source transitions from a location 872 generally by the right ear to a location 874 generally in front of the wearer to a location 876 generally by the left ear. The gain distribution 880 depicts how a gain changes as a sound source transitions from a location 882 generally by the left ear to a location 884 generally in front of the wearer to a location 886 generally by the left ear.

Figure 8C:
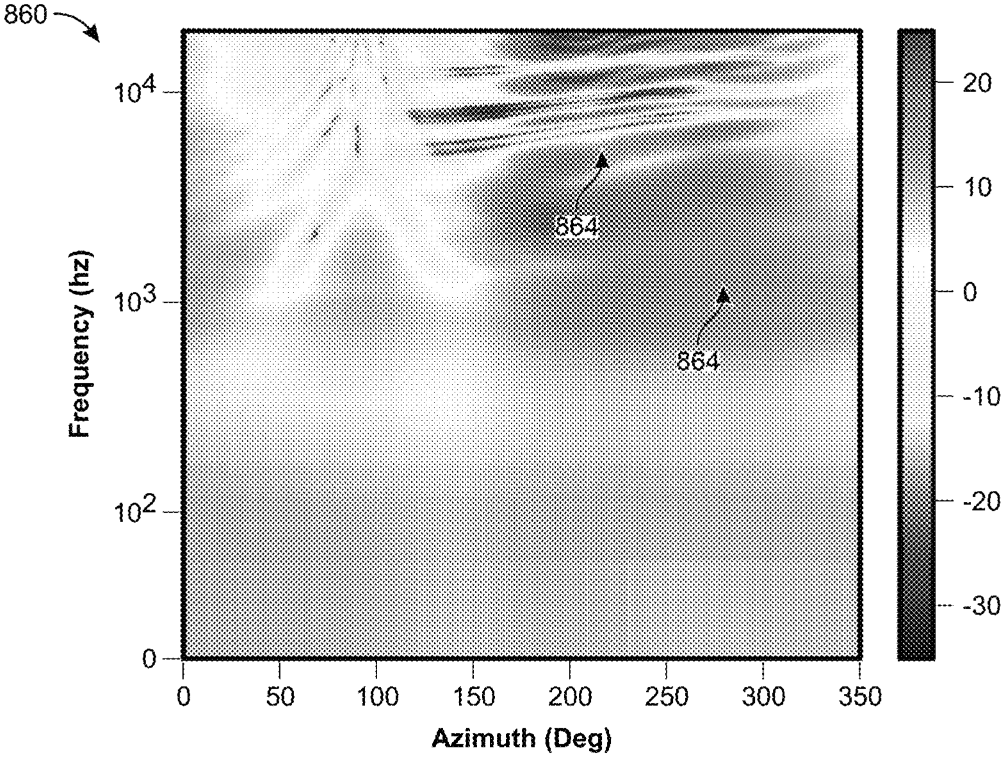
FIG. 8C depicts an output of the application of digital filters to a digital audio signal according to some embodiments.

FIG. 8C depicts a gain distribution 860 of the application of digital filters to an audio signal according to some embodiments. The gain distribution 890 shows several notches 864 across a head shadow 862. The several notches 864 are at center frequencies between 10^3 Hz and 10^4 Hz.

Figure 8D:
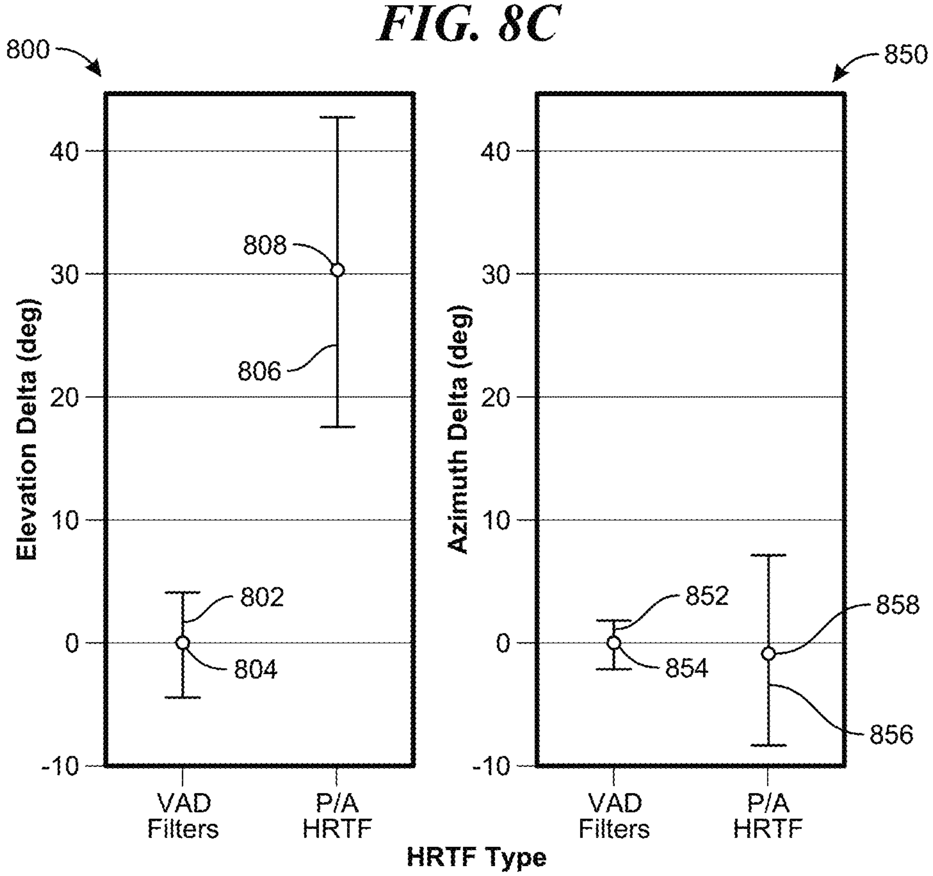
FIG. 8D depicts user experience data for a transfer function based on digital filters according to some embodiments and user experience data for a prior art transfer function.
Figure 8E:
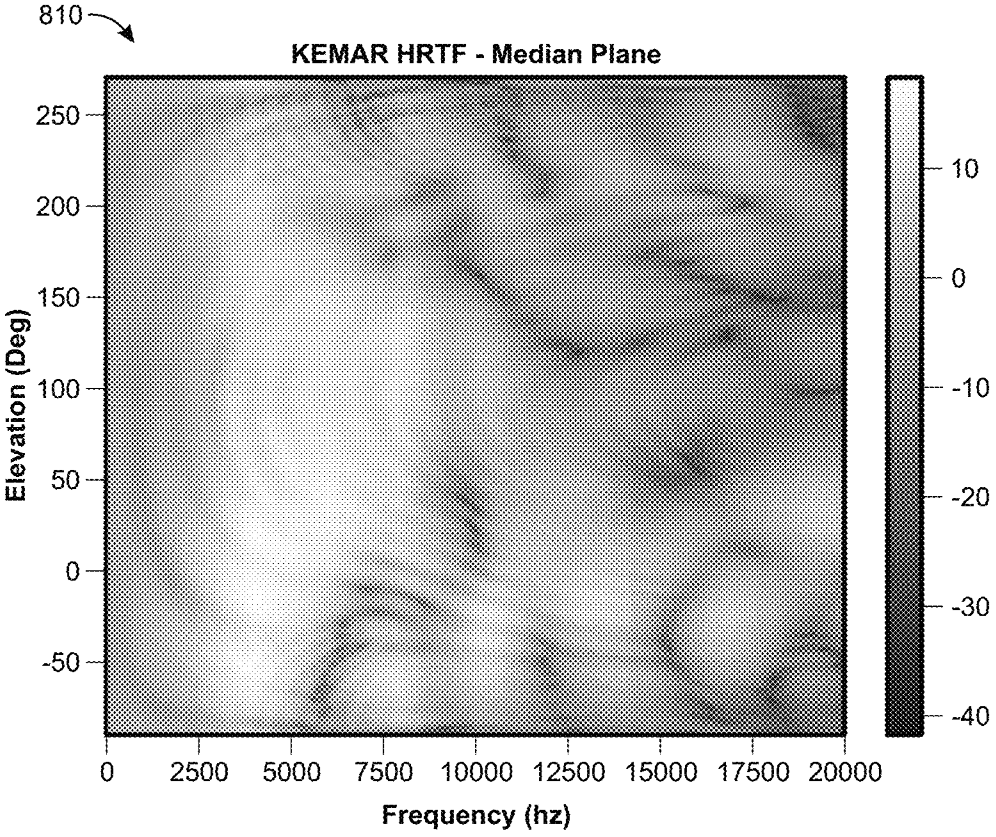
FIG. 8E depicts an example head-related transfer function (HRTF).

FIG. 8D depicts user experience data for digital filters according to some embodiments and user experience data for a prior art head-related transfer function (HRTF). The prior art HRTF is used as a standard model for many past and present HRTF applications. Panel 800 of FIG. 8D reports the difference between the user-perceived elevation of a virtual sound object and the actual elevation of the sound object for both the digital filters for 150 trials and the prior art HRTF for 150 trials. For the digital filters trials, point 804 is the mean user-perceived elevation and band 802 is the standard deviation of the user-perceived elevation. For the HRTF trials, point 808 is the mean user-perceived elevation and band 806 is the standard deviation of the user-perceived elevation.

Panel 850 of FIG. 8D reports the difference between the user-perceived azimuth of a virtual sound object and the actual azimuth of the sound object for both the digital filters for 150 trials and the prior art HRTF for 150 trials. For the digital filters trials, point 852 is the mean user-perceived azimuth and band 854 is the standard deviation of the user-perceived azimuth. For the HRTF trials, point 858 is the mean user-perceived azimuth and band 856 is the standard deviation of the user-perceived azimuth.

For the elevation trials, the closer the elevation delta is to 0°, the more accurate the representation of the virtual sound object. Similarly, for the azimuth trials, the closer the elevation delta is to 0°, the more accurate the representation of the virtual sound object. The user experience data shows that the digital filters improve the elevation delta from a mean of approximately 30.19° with a standard deviation of approximately 12.54° to a mean of approximately −0.03° with a standard deviation of approximately 4.12°. The user experience data also shows the digital filters improves the azimuth delta from a mean of approximately −0.64° with a standard deviation of approximately 7.76° to a mean of approximately −0.02° with a standard deviation of approximately 2.04°. The data shows that the digital filters according to some embodiments improve the accuracy and precision of virtual sound objects.

Figure 9A:
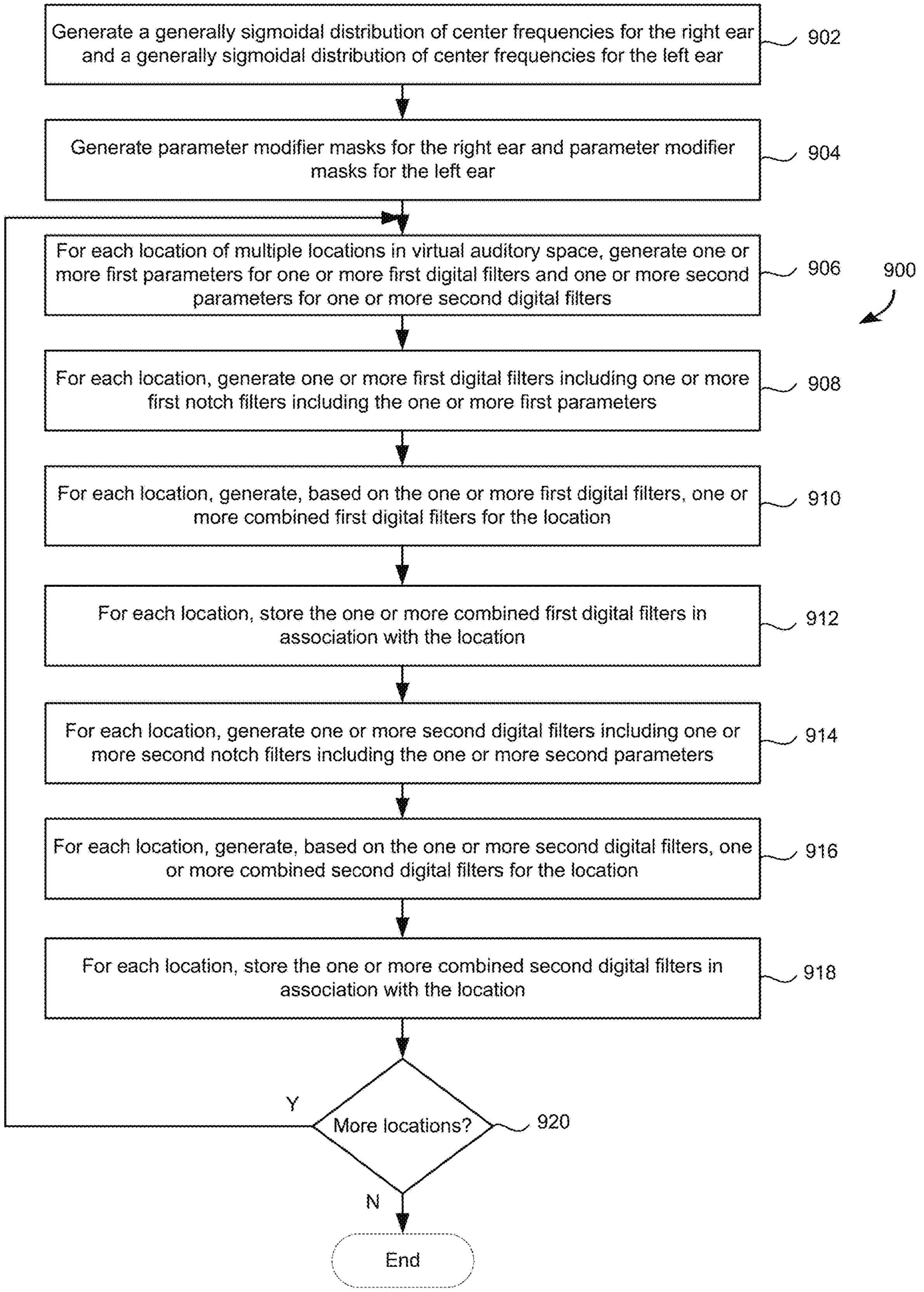
FIGS. 9A and 9B depict methods of generating digital filters according to some embodiments.

FIG. 9A depicts a method 900 of generating digital filters according to some embodiments. The generation system 380 may perform the method 900. The generation system 380 may perform the method 900 to generate a set of combined first digital filters and a set of combined second digital filters. The method 900 begins at a step 902, where the generation system 380 (for example, the filter generation module 384) may generate a generally sigmoidal distribution of center frequencies for the right ear (see, for example, FIG. 5A) and a generally sigmoidal distribution of center frequencies for the left ear (see, for example, FIG. 5B).

At a step 904 the generation system 380 (for example, the parameter mask module 390) generates parameter modifier masks for the right ear and parameter modifier masks for the left ear (see, for example, FIGS. 7A-7X). The generation system 380 may generate the parameter modifier masks using one or more image processing algorithms. The one or more image processing algorithms may include one or more of a gaussian function, a sharpening function, a contrast adjustment function, a color correction function, a thresholding function, an edge detection function, and a segmentation function.

At a step 906, for each location of multiple locations in virtual auditory space, the generation system 380 (for example, the parameter generation module 388) may generate one or more first parameters for one or more first digital filters and one or more second parameters for one or more second digital filters. The one or more first parameters may include one or more first q's, one or more first gains, and one or more first center frequencies. The one or more second parameters may include one or more second q's, one or more second gains, and one or more second center frequencies.

The generation system 380 may utilize the parameter modifier masks for the right ear and the parameter modifier masks for the left ear to select, based on the location in virtual auditory space, one or more parameter modifiers that the generation system 380 may use to modify one or more parameter to obtain one or more modified parameter. In some embodiments, the generation system 380 multiplies the one or more parameter by the one or more parameter modifiers to obtain the one or more modified parameter.

The generation system 380 may utilize the generally sigmoidal distribution of center frequencies for the right ear and/or the generally sigmoidal distribution of center frequencies for the left ear to determine one or more center frequencies for one or more notches in the frequency spectrums of the audio signal for the right ear and the audio signal for the left ear. The generation system 380 may determine the center frequencies for the one or more notches based on the location in virtual auditory space.

At a step 908, for each location, the generation system 380 (for example, the filter generation module 384) may generate one or more first digital filters including one or more first notch filters including the one or more first parameters. The generation system 380 may utilize the one or more first q's, the one or more first gains, and the one or more first center frequencies to generate the one or more first notch filters. The one or more first notch filters are configured to produce one or more first notches in a first frequency spectrum of a first audio signal according to the one or more first q's, the one or more first gains, and the one or more first center frequencies when the generation system 380 applies the one or more notch filters to an audio signal for the right ear.

At a step 910, for each location, the generation system 380 (for example, the filter generation module 384) may generate, based on the one or more first digital filters, one or more combined first digital filters for the location. In some embodiments, the one or more first digital filters are IIR filters, and the one or more combined first digital filters are FIR filters.

At a step 912, for each location, the generation system 380 may store the one or more combined first digital filters in association with the location (in, for example, the data storage 220).

At a step 914, for each location, the generation system 380 (for example, the filter generation module 384) may generate one or more second digital filters including one or more second notch filters including the one or more second parameters. The generation system 380 may utilize the one or more second q's, the one or more second gains, and the one or more second center frequencies to generate the one or more second notch filters. The one or more second notch filters are configured to produce one or more second notches in a second frequency spectrum of a second audio signal according to the one or more second q's, the one or more second gains, and the one or more second center frequencies when the generation system 380 applies the one or more notch filters to an audio signal for the left ear.

At a step 916, for each location, the generation system 380 (for example, the filter generation module 384) may generate, based on the one or more second digital filters, one or more combined second digital filters for the location. In some embodiments, the one or more second digital filters are IIR filters, and the one or more combined second digital filters are FIR filters.

At a step 918, for each location, the generation system 380 may store the one or more combined second digital filters in association with the location (in, for example, the data storage 220).

At a step 920 the generation system 380 tests to see if there are more locations for which the generation system 380 is to generate digital filters. If so, the method 900 returns to step 906. The generation system 380 may perform the method 900 multiple times to generate multiple sets of combined first digital filters and multiple sets of combined second digital filters. Each pair of sets of digital filters may be for a different archetype In some embodiments, the generation system 380 may perform the method 900 several times to generate multiple sets of combined first digital filters and combined second digital filters. Each pair of sets may be for a different archetype representing a different user population or grouping of users.

Figure 9B:
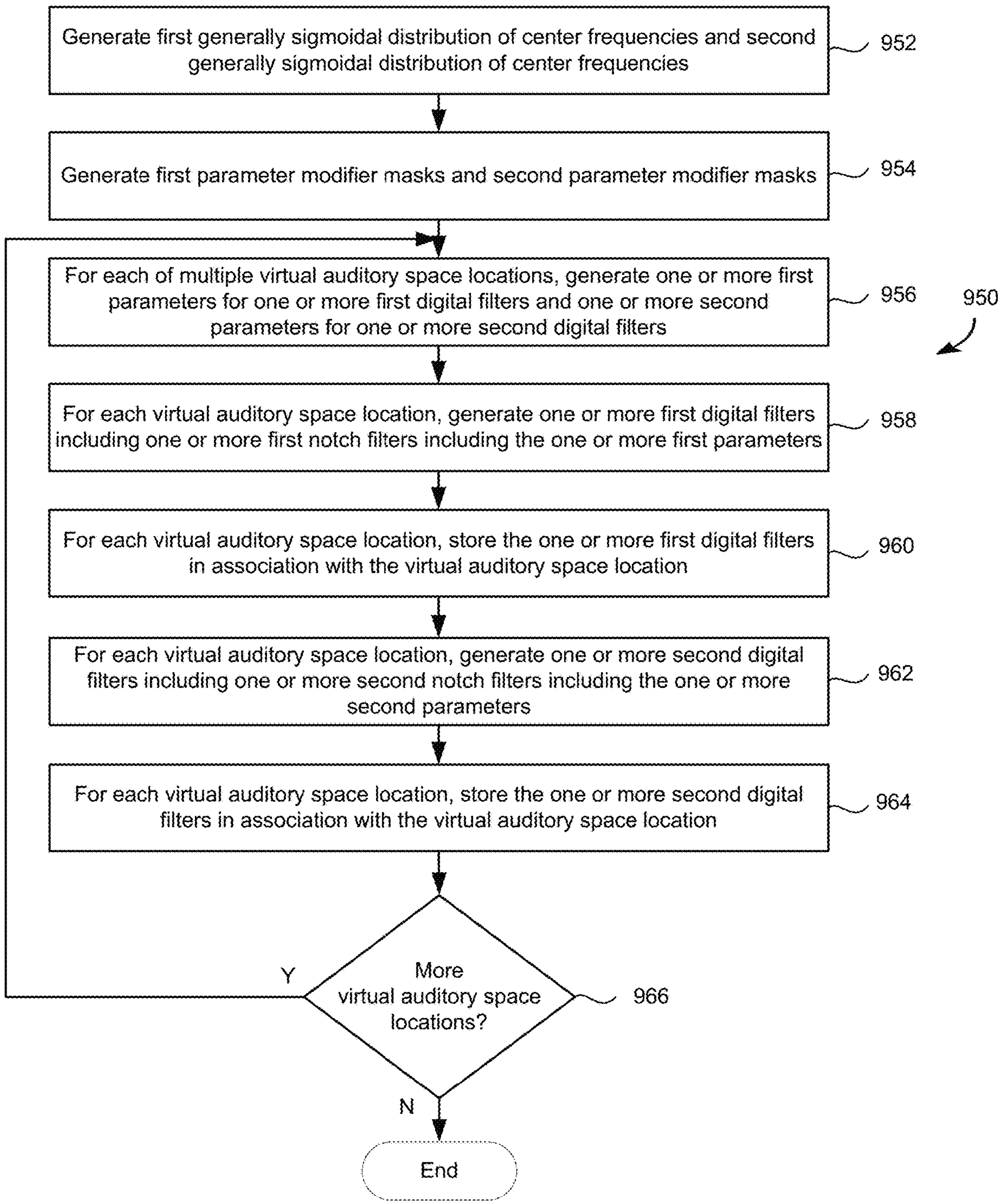

FIG. 9B depicts a method 950 of generating digital filters in some embodiments. The generation system 380 may perform the method 900. The method 950 includes certain steps that may be generally similar to certain steps of the method 900. The generation system 380 (for example, various components of the generation system 380) may perform the method 950. The generation system 380 may perform the method 950 to generate a set of first digital filters and a set of second digital filters.

The method 950 begins at a step 952, where the generation system 380 (for example, the parameter generation module 388) may generate a first generally sigmoidal distribution of center frequencies and a second generally sigmoidal distribution of center frequencies. At a step 954 the generation system 380 (for example, the parameter mask module 390) may generate first parameter modifier masks and second parameter modifier masks.

At a step 956, for each of multiple virtual auditory space locations, the generation system 380 (for example, the parameter generation module 388) may generate one or more first parameters for one or more first digital filters and one or more second parameters for one or more second digital filters. The one or more first parameters may include one or more first q's, one or more first gains, and one or more first center frequencies. The one or more second parameters may include one or more second q's, one or more second gains, and one or more second center frequencies.

At a step 958, for each virtual auditory space location, the generation system 380 may generate one or more first digital filters including one or more first notch filters including the one or more first parameters. Step 958 is generally similar to step 980 of the method 900.

At a step 960, for each virtual auditory space location, the generation system 380 may store the one or more first digital filters in association with the virtual auditory space location. Step 960 is generally similar to step 912 of the method 900.

At a step 962, for each virtual auditory space location, the generation system 380 may generate one or more second digital filters including one or more second notch filters including the one or more second parameters. Step 962 is generally similar to step 914 of the method 900.

At a step 964, for each virtual auditory space location, the generation system 380 may store the one or more second digital filters in association with the virtual auditory space location. Step 964 is generally similar to step 918 of the method 900.

At a step 966 the generation system 380 tests to see if there are more virtual auditory space locations for which the generation system 380 is to generate digital filters. If so, the method 900 returns to step 956. The generation system 380 may perform the method 950 multiple times to generate multiple sets of one or more first digital filters and multiple sets of one or more second digital filters.

The method 900 and the method 950 may include additional steps. For example, the generation system 380 may provide for testing digital filters. The generation system 380 (for example, the user interface module 394) may provide a user interface that allows for sound generated by audio signals to which digital filters have been applied to be played. A user may listen to the sounds and determine that one or more parameters of the digital filters should be modified. For example, the user may modify parameters of digital filters to ensure that sounds meet required thresholds of tonal quality, clarity, brightness, and the like. The generation system 380 may provide another user interface that allows the user to modify the one or more parameters of the digital filters. The generation system 380 (for example, the digital filter tuning module 392) may receive the one or more parameters of the digital filters from users and modify digital filters based on the received one or more parameters.

Figure 10A:
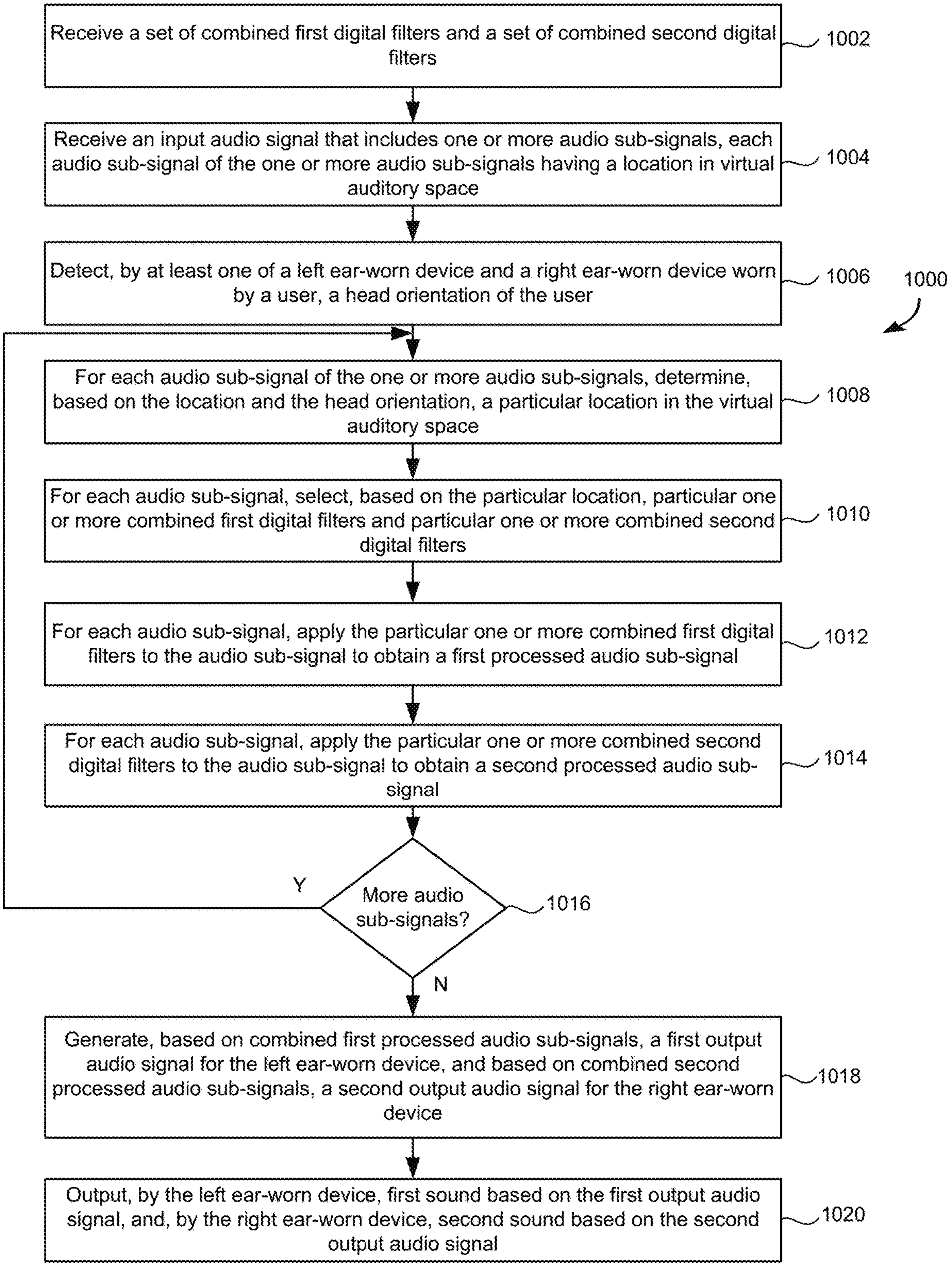
FIGS. 10A and 10B depict methods of applying digital filters according to some embodiments.

FIG. 10A depicts a method 1000 of applying digital filters according to some embodiments. The virtual auditory display system 102 and the virtual auditory display device 100 may perform the method 1000. The method 1000 begins at a step 1002, where the virtual auditory display system 102 (for example, the binauralizer 138) receives a set of combined first digital filters and a set of combined second digital filters. At a step 1004 the virtual auditory display system 102 (for example, the binauralizer 138) receives an input audio signal that includes one or more audio sub-signals. Each audio sub-signal of the one or more audio sub-signals has a location in virtual auditory space.

While receiving the input audio signal, the virtual auditory display system 102 performs step 1006 through step 1020 of the method 1000. At step 1006 one or both of the first ear-worn device 102*a* and the second ear-worn device 102*b* detects a head orientation of the user wearing the first ear-worn device 102*a* and the second ear-worn device 102*b*. The first ear-worn device 102*a* and/or the second ear-worn device 102*b* provide the head orientation to the virtual auditory display system 102.

At a step 1008, for each audio sub-signal of the one or more audio sub-signals, the virtual auditory display system 102 determines, based on the location of the audio sub-signal and the head orientation, a particular location in the virtual auditory space. At a step 1010, for each audio sub-signal, the virtual auditory display system 102 selects, based on the particular location, particular one or more combined first digital filters and particular one or more combined second digital filters.

At a step 1012, for each audio sub-signal, the virtual auditory display system 102 applies the particular one or more combined first digital filters to the audio sub-signal to obtain a first processed audio sub-signal. At a step 1014, for each audio sub-signal, the virtual auditory display system 102 applies the particular one or more combined second digital filters to the audio sub-signal to obtain a second processed audio sub-signal.

At a step 1016 the virtual auditory display system 102 tests to see if there are more audio sub-signals to process. If so, the method 1000 returns to step 1008. If not the method 1000 continues to step 1018. After processing all the audio sub-signals the virtual auditory display system 102 obtains multiple first processed audio sub-signals and multiple second processed audio sub-signals.

At a step 1018 the virtual auditory display system 102 generates, based on the multiple first processed audio sub-signals, a first output audio signal for the left ear-worn device, and based on the multiple second processed audio sub-signals, a second output audio signal for the right ear-worn device. The virtual auditory display system 102 provides the first output audio signal to the first ear-worn device 102*a* and the second output audio signal to the second ear-worn device 102*b*.

At a step 1020 the first ear-worn device 102*a* outputs first sound based on the first output audio signal and the second ear-worn device 102*b* outputs second sound based on the second output audio signal. The virtual auditory display system 102 may thus utilize the method 1000 to provide virtual auditory display sound based on an audio signal that may have multiple audio sub-signals (or channels) that would typically require multiple speakers to produce a surround sound effect. The virtual auditory display system 102 may provide the virtual auditory display sound to the user using only the first ear-worn device 102*a* and the second ear-worn device 102*b*.

Figure 10B:
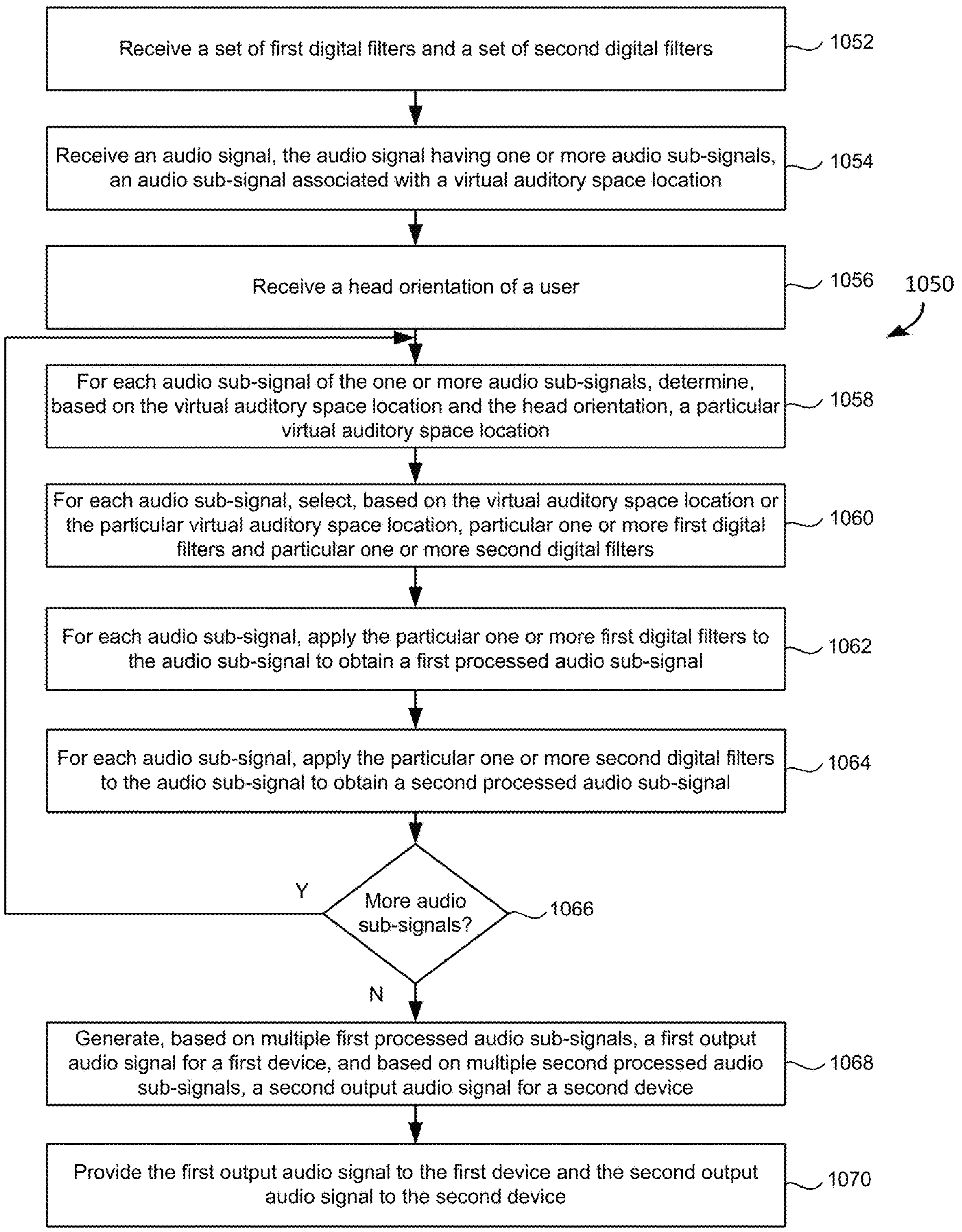

FIG. 10B depicts a method 1050 of applying digital filters according to some embodiments. The method 1050 includes certain steps that may be generally similar to certain steps of the method 1000. The virtual auditory display system 102 may perform the method 1050.

The method 1050 begins at a step 1052, where the virtual auditory display system 102 (for example, the binauralizer 138) receives a set of one or more first digital filters and a set of one or more second digital filters. At a step 1054 the virtual auditory display system 102 (for example, the binauralizer 138) receives an audio signal that has one or more audio sub-signals. Each audio sub-signal of the one or more audio sub-signals is associated with a virtual auditory space location.

At a step 1056 the virtual auditory display system 102 receives a head orientation of a user. At a step 1058, for each audio sub-signal of the one or more audio sub-signals, the virtual auditory display system 102 determines, based on the virtual auditory space location and the head orientation, a particular virtual auditory space location. At a step 1060, for each audio sub-signal, the virtual auditory display system 102 selects, based on the virtual auditory space location or the particular virtual auditory space location, particular one or more first digital filters and particular one or more second digital filters.

At a step 1062, for each audio sub-signal, the virtual auditory display system 102 applies the particular one or more first digital filters to the audio sub-signal to obtain a first processed audio sub-signal. At a step 1064, for each audio sub-signal, the virtual auditory display system 102 applies the particular one or more second digital filters to the audio sub-signal to obtain a second processed audio sub-signal.

At a step 1066 the virtual auditory display system 102 tests to see if there are more audio sub-signals to process. If so, the method 1050 returns to step 1058. If not the method 1000 continues to step 1068. After processing all the audio sub-signals the virtual auditory display system 102 obtains multiple first processed audio sub-signals and multiple second processed audio sub-signals.

At a step 1068 the virtual auditory display system 102 generates, based on multiple first processed audio sub-signals, a first output audio signal for a first device, and based on multiple second processed audio sub-signals, a second output audio signal for a second device. The first device may be or include, for example, the first ear-worn device 102*a*, and the second device may be or include, for example, the second ear-worn device 102*b*. At a step 1070 the virtual auditory display system 102 provides the first output audio signal to the first device and the second output audio signal to the second device.

Figure 10C:
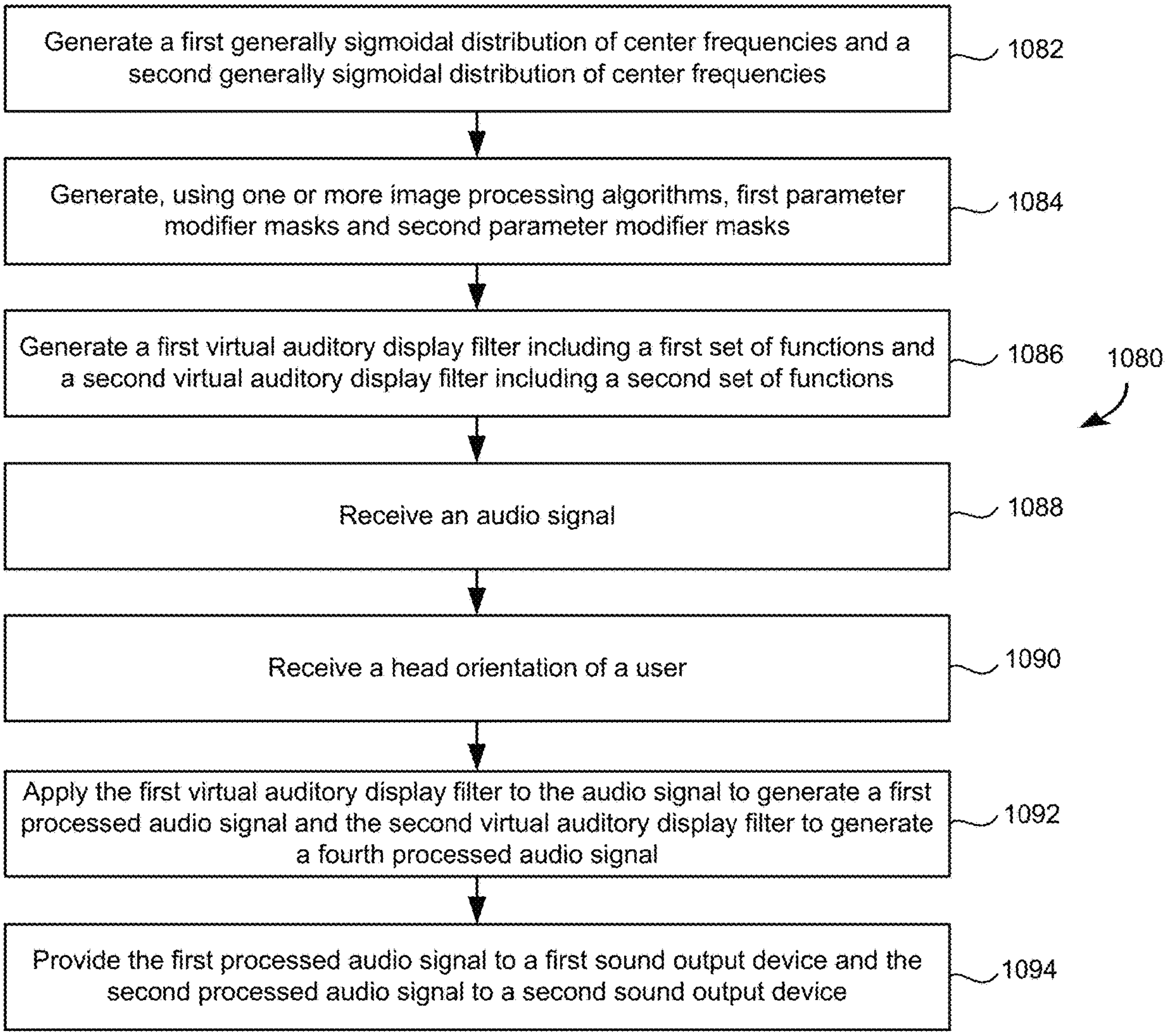
FIG. 10C depicts a method of generating and applying virtual auditory display filters in some embodiments.

FIG. 10C depicts a method 1080 of generating and applying virtual auditory display filters in some embodiments. The generation system 380 and the virtual auditory display system 102 may perform the method 1000. The method 1080 begins at a step 1082 where the generation system 380 (for example, the parameter generation module 388) may generate a first generally sigmoidal distribution of center frequencies and a second generally sigmoidal distribution of center frequencies. At a step 1084 the generation system 380 (for example, the parameter mask module 390) may generate first parameter modifier masks and second parameter modifier masks, including a first notch parameter modifier mask and a second notch parameter modifier mask.

At a step 1086 the generation system 380 (for example, the filter generation module 384) may generate a first virtual auditory display filter and a second virtual auditory display filter. The first virtual auditory display filter may include a first set of first functions. One or more first functions, when applied to a first audio signal having a first location in virtual auditory space, may generate a first processed audio signal having a first frequency response with one or more first notches at one or more first center frequencies that are based on the first location. The one or more first notches may have one or more first peak-to-trough depths of at most −10 dB (for example, approximately −30 dB).

The second virtual auditory display filter may include a second set of second functions. One or more second functions, when applied to the first audio signal, may generate a second processed audio signal having a second frequency response with one or more second notches at one or more second center frequencies that are based on the second location. The one or more second notches may have one or more second peak-to-trough depths of at most −10 dB (for example, approximately −30 dB).

At a step 1088 the virtual auditory display system 102 may receive an audio signal having a second location in the virtual auditory space. For example, the virtual auditory display system 102 may receive the audio signal from a digital device on which the virtual auditory display system 102 is executing. At a step 1090 the virtual auditory display system 102 may receive a head orientation of a user, for example, from the virtual auditory display device 100 that the user is utilizing.

At a step 1092 the virtual auditory display system 102 may apply the first virtual auditory display filter, including a first subset of first functions selected based on the second location, to the second audio signal to generate a third processed audio signal having a third frequency response. At a step 1094 the virtual auditory display system 102 may apply the second virtual auditory display filter, including a second subset of second functions selected based on the second location, to the second audio signal to generate a fourth processed audio signal having a fourth frequency response. At a step 1094 the virtual auditory display system 102 may provide the first processed audio signal to a first sound output device (for example, the first ear-worn device 102*a*) and the second processed audio signal to a second sound output device (for example, the second ear-worn device 102*b*).

The virtual auditory display system 102 may perform step 1088 through step 1094 of the method 1080 while the virtual auditory display system 102 is receiving an input audio signal that may correspond to, for example, a song file, an audio stream, a podcast, or any other audio.

The method 1000, the method 1050, and the method 1080 may include additional steps not illustrated in FIGS. 10A through 10C. For example, these methods may include a step of the virtual auditory display system 102 receiving a selection of an acoustic environment and a step of the virtual auditory display system 102 determining, based on the acoustic environment, a first acoustic environment digital filter and a second acoustic environment digital filter. The acoustic environment may be represented by one or more ambisonic arrays. The virtual auditory display system 102 may determine the acoustic environment digital filters based on the one or more ambisonics arrays. The virtual auditory display system 102 may apply the digital filters and the acoustic environment digital filters to obtain the processed audio sub-signals. Other modifications to these methods will be apparent.

Figure 2C:
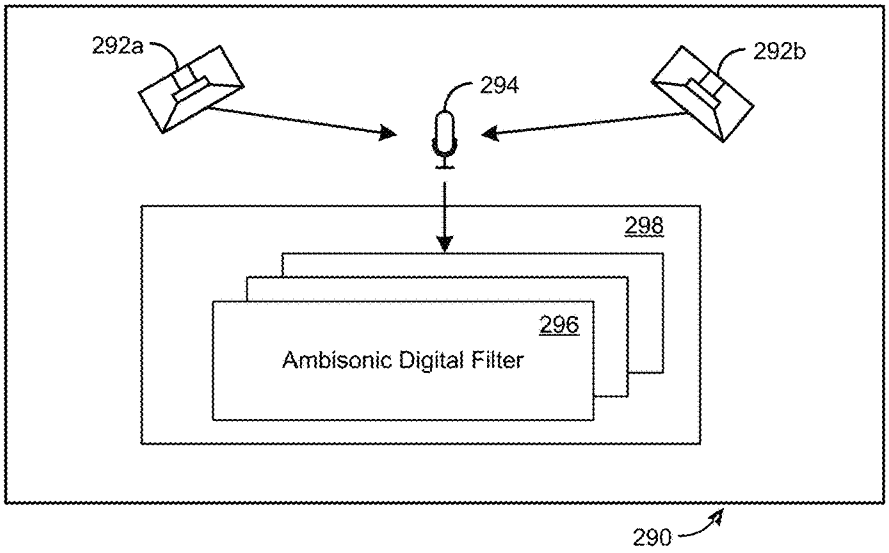
FIG. 2C is a block diagram depicting a process for generating acoustic environment digital filters in some embodiments.

FIG. 2C is a block diagram depicting a process 290 for generating acoustic environment digital filters in some embodiments. A first speaker 292*a* and a second speaker 292*b* may be in a particular acoustic environment, such as a concert hall, a vehicle, a night club, or the like. Sound output by the first speaker 292*a* and the second speaker 292*b* are captured by a microphone 294 and converted into signals. The virtual auditory display system 102 (for example, the filter generation module 384) generates one or more ambisonics digital filters 296 based on the signals. The one or more ambisonics digital filters 296 are a set of one or more acoustic environment digital filters 298.

Figure 2D:
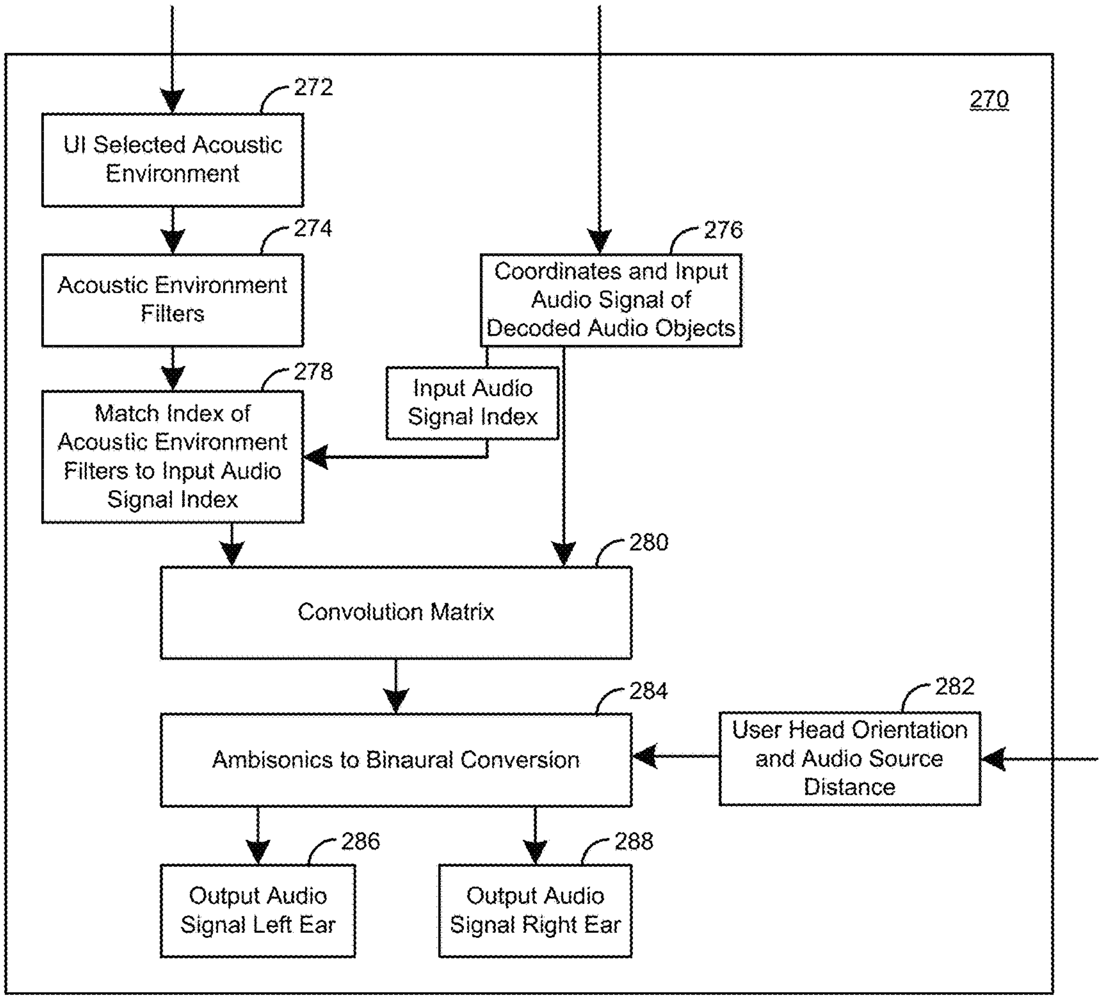
FIG. 2D is a block diagram depicting operations of a spatialization engine of the virtual auditory display system in some embodiments.

FIG. 2D is a block diagram depicting operations of a spatialization engine 270 of the virtual auditory display system 102 in some embodiments. The spatialization engine 270 may be part of the binauralizer 138 or a separate component. The spatialization engine 270 receives a user interface (UI) selected acoustic environment at a block 272 and determines acoustic environment digital filters based on the selected acoustic environment at a block 274. The spatialization engine 270 receives coordinates and the input audio signal of decoded audio objects at a block 276. At a block 278 the spatialization engine 270 matches an index of the acoustic environment digital filters to an input audio signal index. At a block 280 the spatialization engine 270 applies a convolution matrix to the output of the block 278 and the coordinates and the input audio signal.

At a block 282 the spatialization engine 270 receives the user head orientation and audio source distance signal. At a block 284 the spatialization engine performs an ambisonics to binaural conversion based on the output of the block 280 and the user head orientation and audio source distance signal, by applying digital filters to the audio signals received at a block 276 based on the locations of the audio signals in virtual auditory space. At a block 286 the spatialization engine 270 outputs the audio signal for the left ear and at a block 288 the spatialization engine 270 outputs the audio signal for the right ear.

Figure 11A:
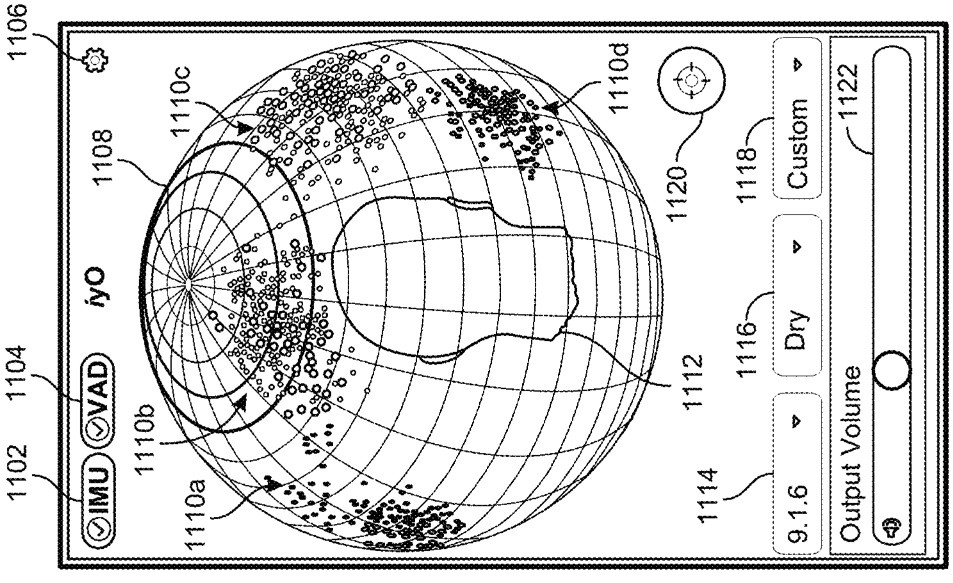
FIGS. 11A and 11B depict an example user interface for displaying a representation of a virtual audio display in some embodiments.
Figure 11B:
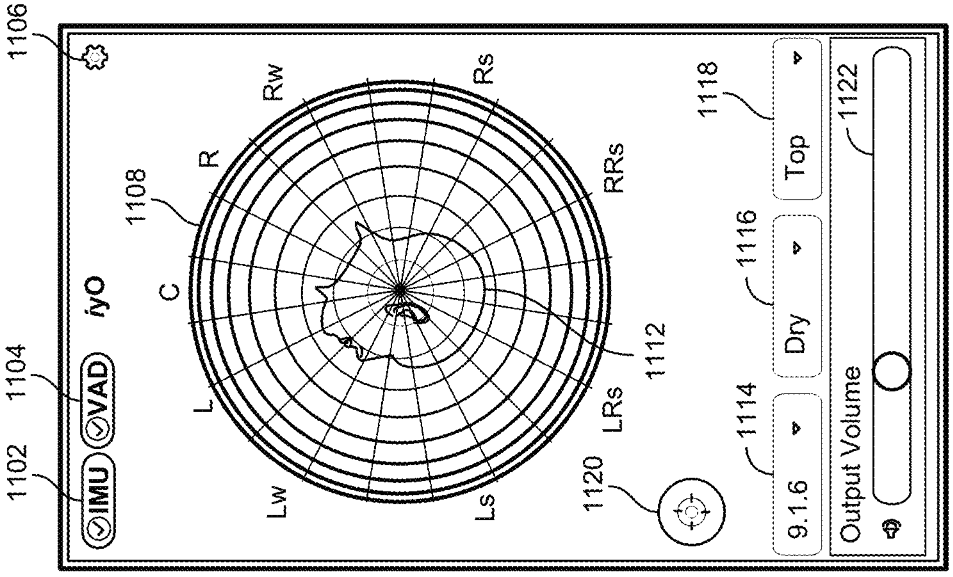

FIGS. 11A and 11B depict an example user interface 1100 for displaying a representation of a virtual audio display in some embodiments. The virtual auditory display system 102 (for example, the user interface module 210) may provide the user interface 1100. FIGS. 11A and 11B are described with reference to the virtual auditory display device 100, but the virtual auditory display system 102 may provide the user interface 1100 for other devices.

The user interface 1100 includes an icon 1104 labeled "VAD" indicating that the virtual auditory display device 100 is connected to the virtual auditory display system 102 and an icon 1102 labeled "IMU" indicating that the IMU-based sensor systems of the virtual auditory display device 100 are calibrated. The user interface 1100 also includes an encoding representation dropdown 1114 that allows the wearer to select how the virtual auditory display system 102 should represent audio received by the virtual auditory display system 102. Example encoding representations are mono (a single audio channel), stereo (two channels of audio), 5.1 5.1 (six channels of audio), 7.1 (eight channels of audio), 7.1.4 (12 channels of audio), and 9.1.6 (16 channels of audio).

The user interface 1100 also includes an acoustic environment dropdown 1116 that allows the wearer to select an acoustic environment in which the virtual auditory display system 102 should render the virtual auditory display. Example acoustic environments include a dry acoustic environment, a studio acoustic environment, a car acoustic environment, a phone acoustic environment, a club acoustic environment, and a headphone acoustic environment. The virtual auditory display system 102 may select an acoustic environment digital filter based on the selected acoustic environment and apply the acoustic environment digital filter along with the virtual auditory display filters. The virtual auditory display sounds will sound different for the wearer based on the selected acoustic environment. The user interface 1100 also includes an output volume slider 1122 allowing the wearer to adjust the volume of the sound output by the virtual auditory display device 100.

The user interface 1100 also includes a representation 1108 of a virtual audio display. In FIG. 11A, the virtual auditory display system 102 depicts the representation 1108 as a virtual sphere surrounding a head 1112 representing the head of the wearer from a top rear perspective. The user interface 1100 also displays sounds at their locations in virtual auditory space relative to the head of the wearer at corresponding locations relative to the head 1112 on the representation 1108. For example, sounds 1110*a* are depicted as to the left of, below, and to the rear of the head 1112. This is because the actual sounds corresponding to the sounds 1110*a* have those locations in virtual auditory space. Sounds 1110*b* are depicted as above, behind, and slightly to the left of the head 1112, sounds 1110*c* are depicted as in front of and to the right of the head 1112, and sounds 1110*d* are depicted as to the right of, below, and to the rear of the head 1112.

While outputting sounds, the virtual auditory display device 100 detects head orientations of the wearer and sends the head orientation to the virtual auditory display system 102. The virtual auditory display system 102 updates the representation 1108 based on the detected head orientations. The virtual auditory display system 102 may move the head 1112 and the sounds 1110 based on the detected head orientations.

The user interface 1100 also includes a virtual auditory display representation dropdown 1118 that allows the wearer to select how the virtual auditory display system 102 provides the virtual auditory display representation. Example virtual auditory display representations include a custom representation (depicted in FIG. 11A), which provides the wearer a top right rear perspective of the representation 1108, a top representation (depicted in FIG. 11B), which provides the wearer a top perspective of the representation 1108 (from the top of the sphere in FIG. 11A), and a back representation, which provides the wearer a rear perspective of the representation 1108 (from the rear of the sphere in FIG. 11A).

The user interface 1100 also includes a location button 1120 which, if selected by the wearer, may cause the virtual auditory display system 102 to change the representation 1108 such that the location specified by a certain coordinate (for example, zero degrees azimuth, zero degrees elevation) may be directly in front of the head 1112. The user interface 1100 also includes a settings icon 1106 which, if selected by the wearer, may cause the virtual auditory display system 102 to provide an example user interface for adjusting settings for a virtual audio display.

Figure 11C:
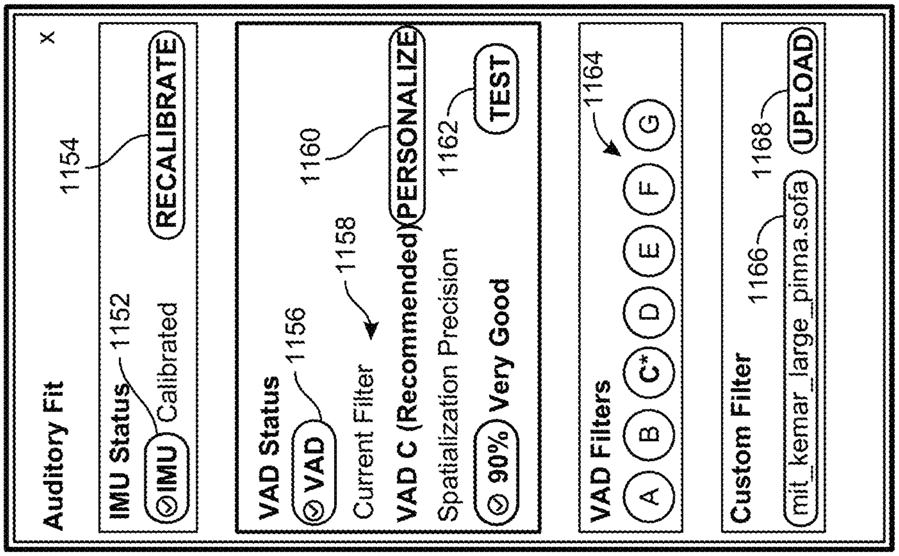
FIG. 11C depicts an example user interface for adjusting settings for a virtual audio display in some embodiments.

FIG. 11C depicts an example user interface 1150 for adjusting settings for a virtual audio display in some embodiments. The virtual auditory display system 102 (for example, the user interface module 210) may provide the user interface 1150. The user interface 1150 includes an icon 1152 labeled "IMU" indicating that the IMU-based sensor systems of the virtual auditory display device 100 are calibrated. The user interface 1150 also includes a button 1154 labeled "Recalibrate" that the wearer may select to have the virtual auditory display system 102 perform the calibration part of the calibration and/or personalization process.

The user interface 1150 also includes an icon 1156 labeled "VAD" indicating that the virtual auditory display device 100 is connected to the virtual auditory display system 102, a recommendation 1158 of a virtual auditory display filter, and a button 1160 labeled "Personalize" that the wearer may select to have the virtual auditory display system 102 perform the personalization part of the calibration and/or personalization process. The user interface 1150 also indicates the spatialization precision estimate of the virtual auditory display of the wearer and a button 1162 labeled "Test" that the wearer may select to have the virtual auditory display system 102 provide a test procedure for the wearer to allow the wearer to test to see if the wearer can accurately locate virtual auditory display sounds.

The user interface 1150 also includes a group 1164 of icons (labeled "A" through "G") that indicates the set of virtual auditory display filters that create the virtual auditory display for the wearer. As depicted, the current set of virtual auditory display filters is "VAD C." The wearer may select a different set of virtual auditory display filters by selecting a different icon in the group 1164. The wearer may then perform the calibration part of the calibration and/or personalization process by selecting the button 1154 and/or perform the personalization part of the calibration and/or personalization process by selecting the button 1160.

The user interface 1150 also allows the wearer to select a custom set of digital filters for the virtual auditory display system 102 to use to generate the virtual auditory display. The wearer may do so by selecting a button 1168 labeled "Upload," which allows the wearer to upload a file containing a custom set of digital filters to the virtual auditory display system 102. The user interface element 1166 may then display the name of the file. This functionality may be desirable for wearers who already have a custom HRTF and want the virtual auditory display system 102 to utilize the custom HRTF.

Figure 12:
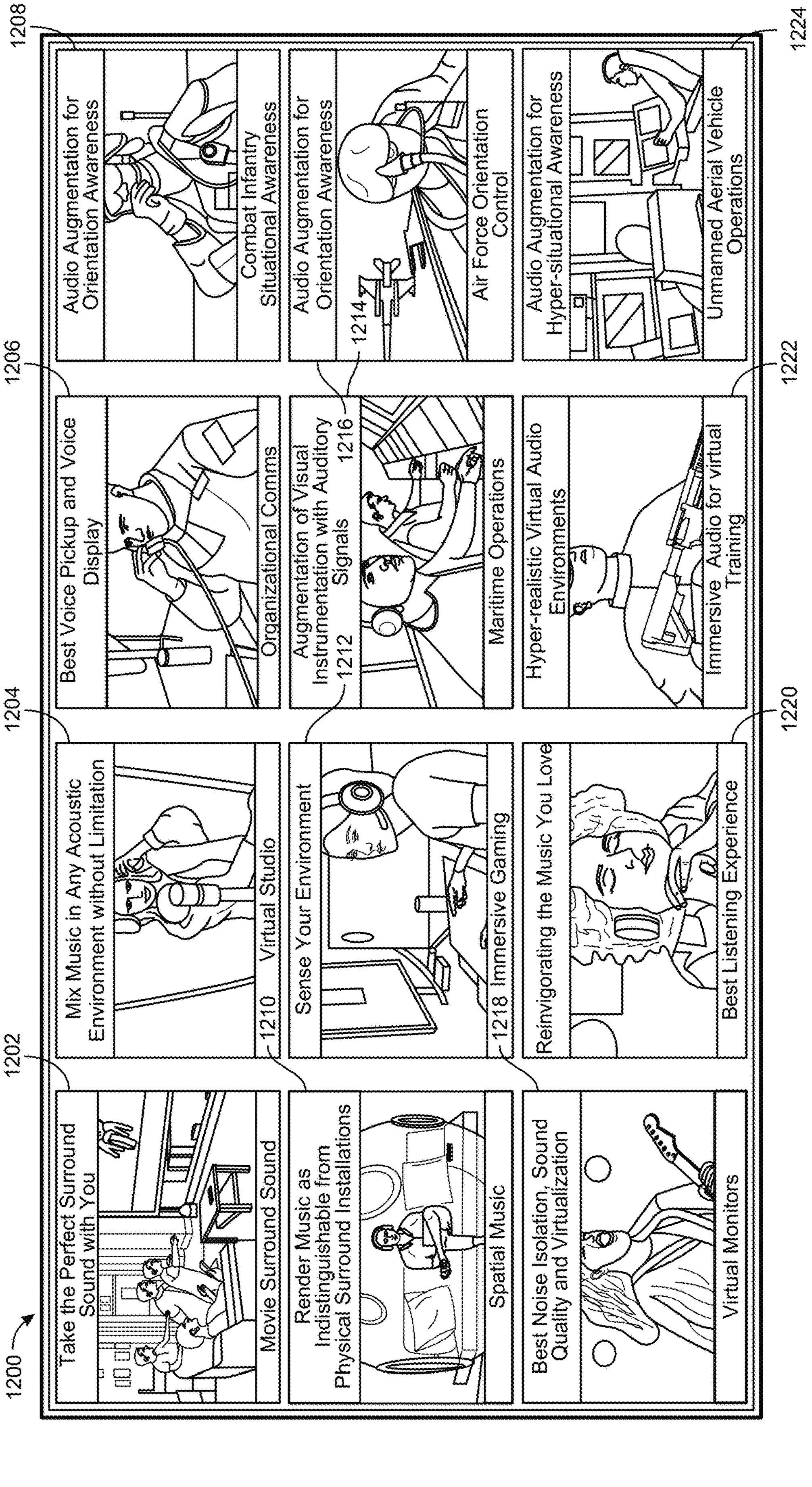
FIG. 12 is multiple images depicting example use cases of display filter technology in some embodiments.

FIG. 12 is multiple images 1200 depicting example use cases of virtual auditory display filter technology described in this application in some embodiments. One example use case is for improved virtual surround sound for television or movies using only a pair of speakers, as depicted in image 1202. A group of example use cases relates to producing or listening to music. Image 1210 depicts an example use case of listening to music on headphones. The virtual auditory display filter technology may render music played on headphones as indistinguishable from music played using physical surround sound installations.

Image 1218 depicts the use of virtual auditory display filter technology in virtual monitors to provide noise isolation, sound quality, and virtualization to musicians. Image 1204 depicts the use of the virtual auditory display filter technology to mix music in any acoustic environment. Image 1220 depicts how the virtual auditory display filter technology may provide a listening experience that reinvigorates the music that listeners love for them. Image 1212 depicts using virtual auditory display filter technology in games to provide an immersive gaming experience. virtual auditory display filter technology may allow users to hear sounds emanating from locations that are not shown on users' displays and thus improve users' awareness.

Another group of example use cases relate to military, non-military (for example, first responders such as police and firefighters) and/or other organizational applications. For example, military personnel may use military radio systems to communicate with fellow soldiers, commanders, and other military personnel. The present technology may be utilized in scenarios including military operations, emergency services, aviation, marine and others.

Image 1206 depicts virtual auditory display filter technology providing improved voice pickup and voice display for organizational communications. Image 1214 depicts virtual auditory display filter technology providing augmentation of visual instrumentation with auditory signals in maritime operations. Image 1222 depicts virtual auditory display filter technology providing hyper-realistic virtual audio environments which facilitates virtual training for military and/or non-military personnel.

Image 1208 depicts virtual auditory display filter technology providing audio augmentation for orientation awareness for combat infantry situational awareness. Image 1216 depicts virtual auditory display filter technology providing audio augmentation for orientation awareness for air force orientation control. For example, pilots may use the localization of virtual beacons to assist in situational awareness. Image 1224 depicts virtual auditory display filter technology providing audio augmentation for hyper-situational awareness for unmanned aerial vehicle operations.

Another example use case of virtual auditory display filter technology involves phone calls or video conferences. For example, multiple people may talk at the same time in a phone call or video conference, making it difficult for listeners to focus on the speaker they want to hear, which may lead to confusion and misunderstandings. The present technology allows users to virtually select which talker they want to listen to through the simple movement of a head or other gesture. This attention selection mechanism may help avoid confusion and make meetings more productive.

As another example, air traffic controllers use radio messages to communicate with pilots. The air traffic controllers monitor the position, speed and altitude of aircraft in their assigned airspace visually and by radar and give directions to the pilots by radio. Often, air traffic controllers will need to communicate with multiple pilots simultaneously. Today, these situations requiring multiple pilot communications are addressed by physical switch boards that do not allow for user directed attention selection. The present technology may allow an air traffic controller to use gestures (for example, movement of a head or a hand) or other actions to localize radio communications so that there is seamless attention selection. In a simple example, multiple radio communication signals are statically arranged in unique virtual locations. The air traffic controller then looks at these predefined locations to hear the radio signal. In other examples, the radio communication signals are dynamically updated with the position, speed and altitude of the aircraft.

Other example use cases include virtual auditory display notifications to localize notifications such as voice, text-to-speech messages, email alerts, phone messages or other audio notifications, spatial navigation to use virtual auditory display cues to communicate direction and distance of virtual or real objects, which may also be used for wayfinding or orientation awareness, and spatial ambience to give a user a virtual sound environment that can be mixed with local or virtual sounds (for example, to experience music as if in a concert hall). Other example use cases of virtual auditory display filter technology are possible.

Figure 13A:
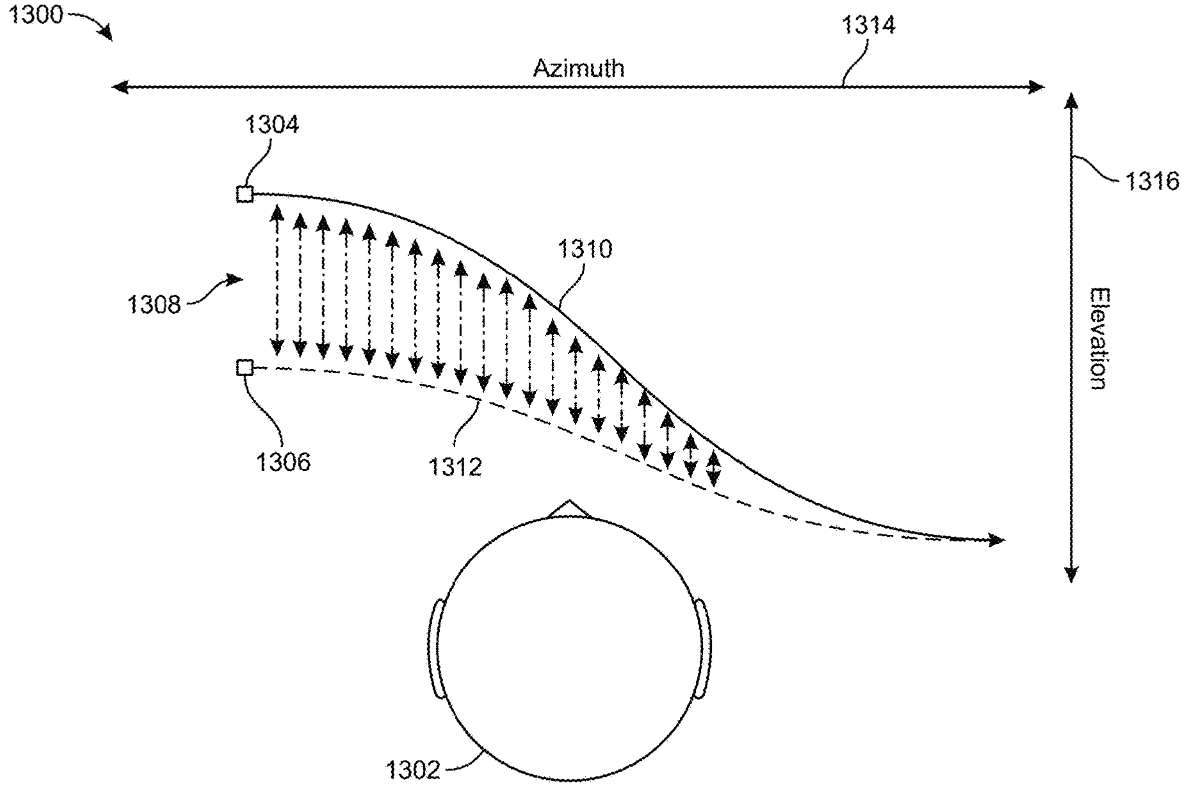
FIGS. 13A and 13B are diagrams of a method of personalizing digital filters in some embodiments.
Figure 13B:
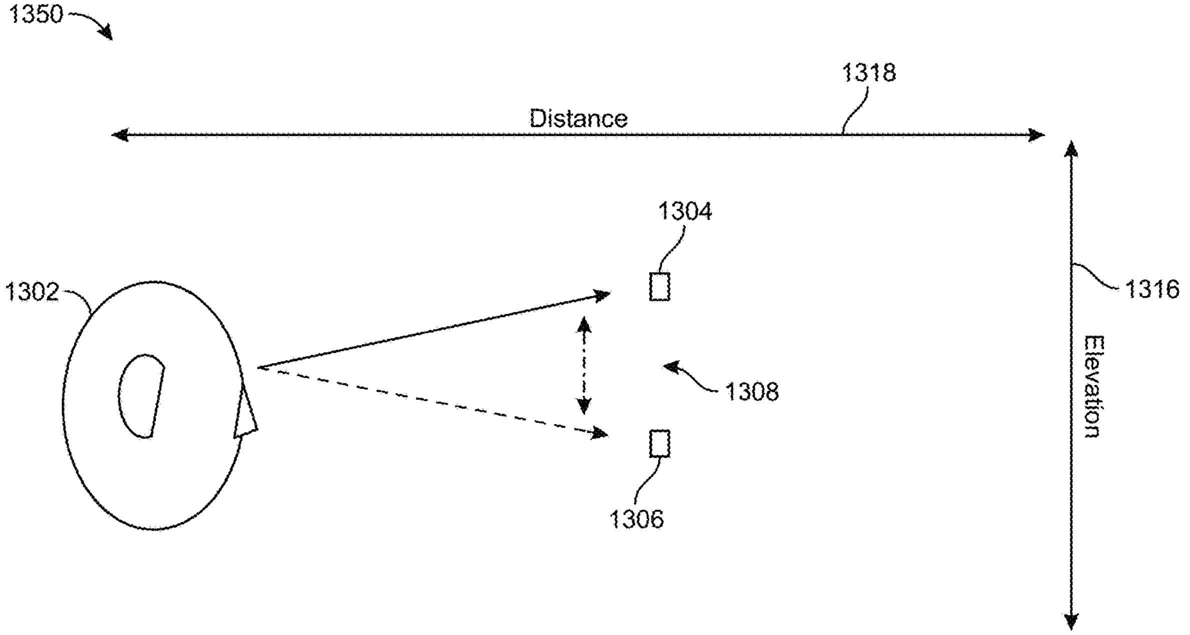

FIGS. 13A and 13B are diagrams of a method of personalizing digital filters in some embodiments that involves providing an action (for example, playing a sound) and detecting a user perception of the action. As described herein, the user may indicate perception of the action in various ways, such as by pointing his or her head, making one or more gestures, indicating where the sound is on a graphical user interface, and the like.

FIG. 13A depicts a view 1300 indicating how the location of a sound in virtual auditory space as indicated by azimuth 1314 and elevation 1316 may be perceived by a user. FIG. 13B depicts a view 1350 indicating how of how the location of a sound in virtual auditory space as indicated by distance 1318 and elevation 1316 may be perceived by a user. In both the view 1300 and the view 1350, the user 1302 is wearing the first ear-worn device **102*a* and the second ear-worn device 102*b* (not illustrated in FIGS. 13A and 13B). The virtual auditory display system 102 may provide instructions to the user 1302 to follow a sound in virtual auditory space with the user's head as the user hears the sound. The virtual auditory display system 102 may then generate audio signals that cause the first ear-worn device 102*a* and the second ear-worn device 102*b* to output one or more sounds that have a location 1304 in virtual auditory space. As the user 1302 hears the one or more sounds, the user 1302 may point his or her head towards a perceived location 1306 the user perceives the sound to be coming from, which may be different from the location 1304. In pointing his or her head towards the perceived location 1306, it may appear as if the user 1302 is looking in the direction of where the user 1302** perceives the sound to be. Other gestures the user may make with his or her head include nodding, shaking, tilting, and turning. Other head gestures will be apparent.

As the user 1302 moves his or her head to point towards the perceived location 1306 of the one or more sounds, one or both of the first ear-worn device 102*a* and the second ear-worn device 102*b* (for example, using the IMU sensor system 252 and/or the magnetometer 254) may detect a head orientation of the user 1302. The virtual auditory display system 102 may utilize the detected head orientation to determine the perceived location 1306. The virtual auditory display system 102 may then determine a delta 1308 between the location 1304 and the perceived location 1306. The virtual auditory display system 102 may calculate the delta 1308 based on differences between the azimuth 1314 and/or elevation 1316 of the location 1304 and the azimuth 1314 and/or elevation 1316 of the perceived location 1306.

The user 1302 may user other gestures to indicate distance, such as extending an arm a specified amount, and the virtual auditory display system 102 may use such gestures to determine the delta 1308 based on differences between the distance 1318 of the location 1304 and the distance 1318 of the perceived location 1306.

The virtual auditory display system 102 may generate audio signals that cause the first ear-worn device 102*a* and the second ear-worn device 102*b* to output one or more subsequent sounds whose locations in virtual auditory space change, as indicated by solid line 1310. The user 1302 may move his or her head to follow the movement of the one or more subsequent sounds, and the perceived locations of the one or more sounds may change, as indicated by dashed line 1312.

One or both of the first ear-worn device 102*a* and the second ear-worn device 102*b* may detect subsequent head orientations of the user 1302 as he or she moves his or her head. The virtual auditory display system 102 may utilize the detected subsequent head orientations to determine perceived locations of the one or more subsequent sounds. The virtual auditory display system 102 may then determine one or more subsequent deltas between the location of the one or more subsequent sounds and the perceived locations of the one or more subsequent sounds.

The virtual auditory display system 102 may store the deltas that the virtual auditory display system 102 determines and utilize the deltas to modify the digital filters so as to cause the user 1302 to perceive the location of sounds in virtual auditory space to be closer to the actual locations in virtual auditory space. In some embodiments, the virtual auditory display system 102 modifies the digital filters by selecting a different set of digital filters that the virtual auditory display system 102 determines will reduce or minimize the deltas for the user 1302. The virtual auditory display system 102 may then use the different set of digital filters for the user 1302.

In some embodiments, the virtual auditory display system 102 modifies the parameters of the digital filters. For example, the virtual auditory display system 102 may modify parameters such as center frequencies, gains, and/or q's. For example, the user 1302 may have an elevation delta of several degrees. The virtual auditory display system 102 may modify the center frequency of a notch, a pair of notches, or a group of notches (see, for example, FIG. 6B) to modify the elevation of a virtual sound object and thereby reduce the elevation delta. The virtual auditory display system 102 may then utilize the modified digital filters during real-time audio playback.

The virtual auditory display system 102 may repeat the personalization procedure one or more times until the virtual auditory display system 102 determines that the deltas are within certain ranges or thresholds.

In some embodiments, the virtual auditory display system 102 and/or other devices may capture other actions that the user may make in response to the user hearing a sound in virtual auditory space to indicate where the user perceives the location of the sound to be. Example actions may include vocal responses by the user, gestures by the user using parts of the user's body other than the user's head (for example, pointing with a finger or an arm of the user, waving, clapping, tapping and hand signals). Such actions may be captured by a device connected to the virtual auditory display system 102, such as a microphone, camera or a motion sensing device.

Other example actions include the user indicating the perceived location of the sound using a graphical user interface and/or user input devices of a digital device such as a phone, tablet or laptop or desktop computer. For example, the virtual auditory display system 102 may provide a graphical user interface that graphically represents virtual auditory space for the user, and the user may utilize an input device (mouse, keyboard, touchscreen, and/or voice command) to indicate the perceived location of the sound on the graphical representation of the virtual auditory space. It will be appreciated that there are various methods to capture user actions in response to the user perception of the location of the sound, and that the virtual auditory display system 102, optionally in cooperation with other devices, may utilize the various methods.

Figure 14A:
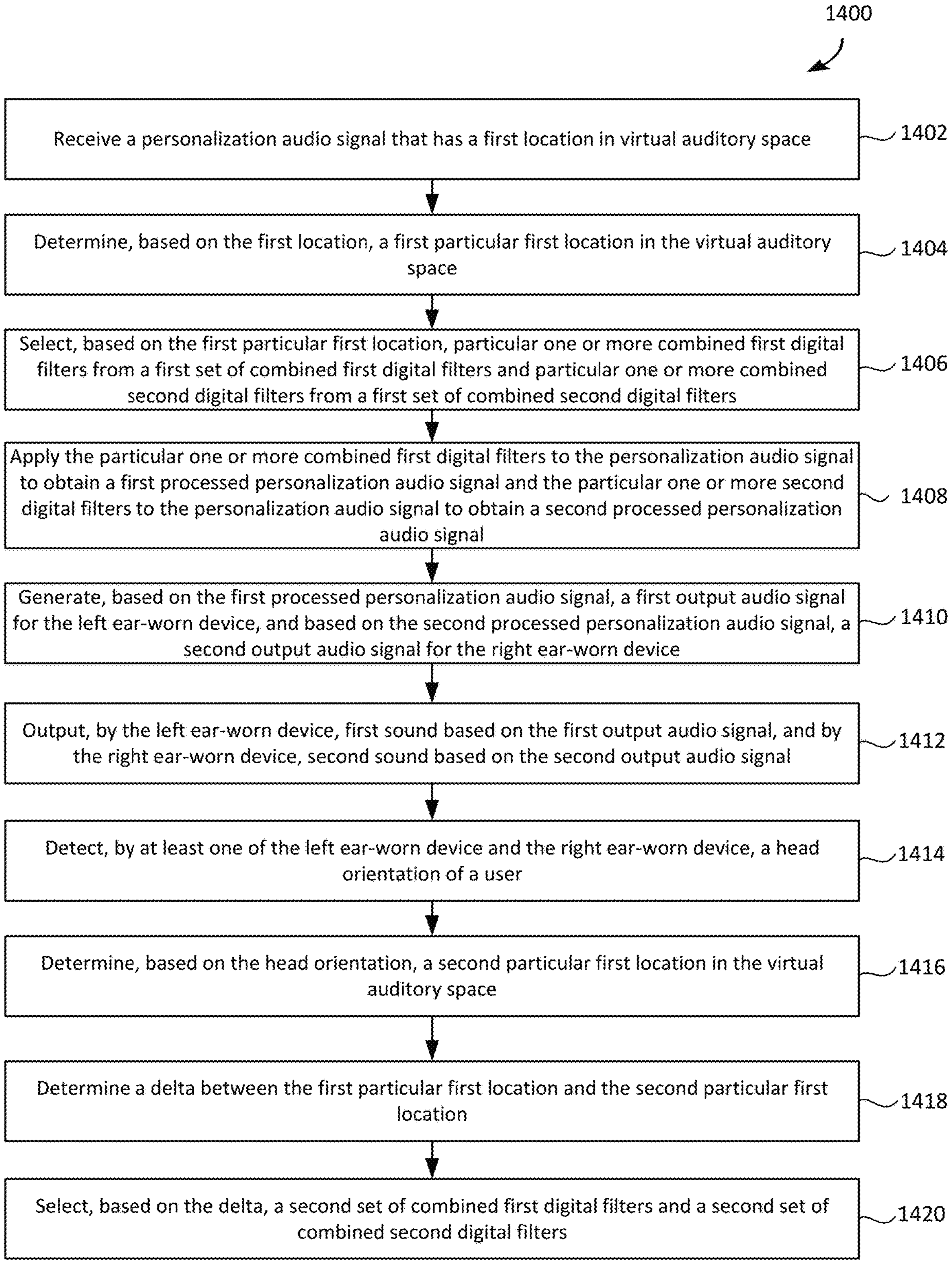
FIGS. 14A and 14B depict methods of personalizing digital filters in some embodiments.

FIG. 14A depicts a method 1400 of personalizing digital filters in some embodiments. The virtual auditory display system 102 may perform the method 1400. The method 1400 begins at a step 1402 where the virtual auditory display system 102 (for example, the binauralizer 138) receives a personalization audio signal that has a first location in virtual auditory space. At a step 1404 the virtual auditory display system 102 (for example, the binauralizer 138) determines, based on the first location, a first particular first location in the virtual auditory space.

At a step 1406 the virtual auditory display system 102 selects, based on the first particular first location, particular one or more combined first digital filters from a first set of combined first digital filters and particular one or more combined second digital filters from a first set of combined second digital filters.

At a step 1408 the virtual auditory display system 102 applies the particular one or more combined first digital filters to the personalization audio signal to obtain a first processed personalization audio signal and the particular one or more combined second digital filters to the personalization audio signal to obtain a second processed personalization audio signal.

At a step 1410 the virtual auditory display system 102 generates, based on the first processed personalization audio signal, a first output audio signal for a left ear-worn device, and based on the second processed personalization audio signal, a second output audio signal for a right ear-worn device. At a step 1412 the left ear-worn device outputs first sound based on the first output audio signal and the right ear-worn device outputs second sound based on the second output audio signal.

At a step 1414 one or both of the left ear-worn device and the right ear-worn device detects a head orientation of a user wearing the left ear-worn device and the right ear-worn device. At a step 1416 the virtual auditory display system 102 determines, based on the head orientation, a second particular first location in the virtual auditory space.

At a step 1418 the virtual auditory display system 102 determines a delta between the first particular first location and the second particular first location. At a step 1420 the virtual auditory display system 102 selects, based on the delta, a second set of combined first digital filters and a second set of combined second digital filters. The virtual auditory display system 102 may use the second set of combined first digital filters and the second set of combined second digital filters while receiving a subsequent input audio signal.

Figure 14B:
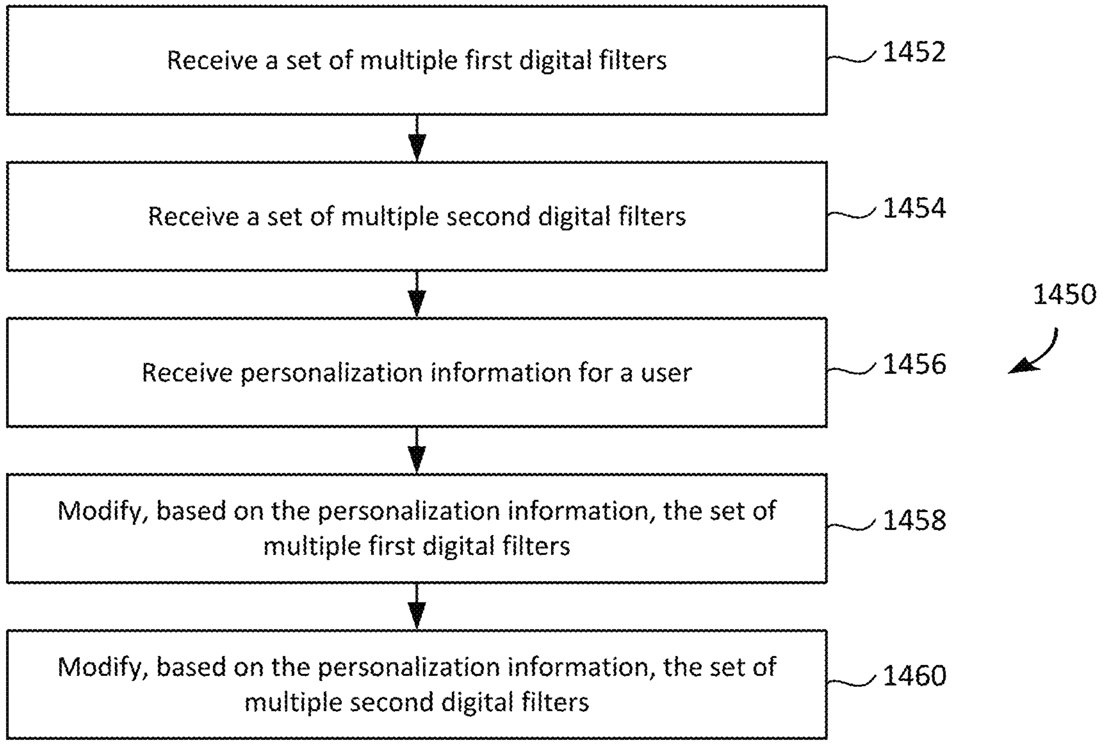

FIG. 14B depicts a method 1450 of personalizing digital filters in some embodiments. The method 1450 includes certain steps that may be generally similar to certain steps of the method 1400. The virtual auditory display system 102 (for example, various components of the virtual auditory display system 102) may perform the method 1450.

At a step 1452 the virtual auditory display system 102 receives a set of multiple first digital filters. At a step 1454 the virtual auditory display system 102 receives a set of multiple second digital filters. There are one or more first digital filters and one or more second digital filters generated for each of multiple virtual auditory space locations.

At a step 1456 the virtual auditory display system 102 receives personalization information for a user. Personalization information may include user-directed action or perception of acoustic cues, acoustic quality information, user anatomical measurements, user demographic information, and/or user audiometric measurements.

At a step 1458 the virtual auditory display system 102 modifies, based on the personalization information for the user, the set of multiple first digital filters. At a step 1460 the virtual auditory display system 102 modifies, based on the personalization information for the user, the set of multiple second digital filters.

In some embodiments, modifying, based on the personalization information, the set of multiple first digital filters includes modifying one or more first center frequencies of the multiple first digital filters. Moreover, modifying, based on the personalization information, the set of multiple second digital filters includes modifying one or more second center frequencies of the multiple second digital filters.

In some embodiments, modifying, based on the personalization information, the set of multiple first digital filters includes selecting a different set of multiple first digital filters. Further, modifying, based on the personalization information, the set of multiple second digital filters includes selecting a different set of multiple second digital filters.

The virtual auditory display system 102 may provide a calibration and/or personalization process that allows a wearer of a virtual auditory display device to calibrate the virtual auditory display device and/or to personalize a virtual auditory display provided by the virtual auditory display device.

The calibration and/or personalization process may include a calibration part and a personalization part. The virtual auditory display device may include an inertial measurement unit (IMU). Calibrating the virtual auditory display device may refer to calibrating the IMU. Personalizing the virtual auditory display may refer to selecting a set of virtual auditory display filters for the wearer and/or modifying an existing set of virtual auditory display filters so that the virtual auditory display provided by the virtual auditory display device is customized to the wearer. The virtual auditory display system 102 may allow the wearer to perform both the calibration part and the personalization part of the calibration and/or personalization process, just the calibration part, or just the personalization part.

Figures 15A, 15B, 15C, 15D, 15E, 15F:
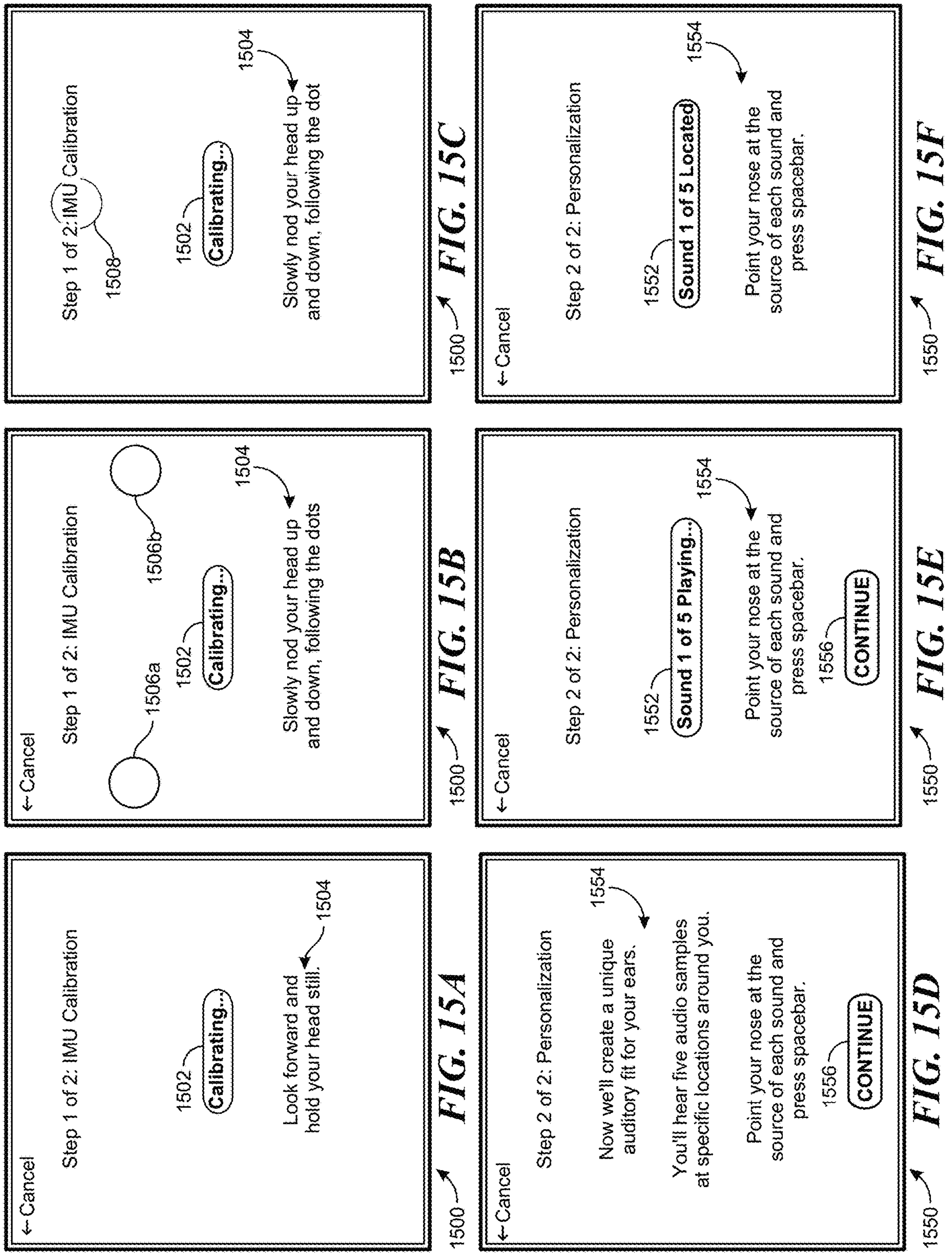
FIGS. 15A through 15C depict an example user interface for calibrating a virtual auditory display device in some embodiments.
FIGS. 15D through 15F depict an example user interface for personalizing a virtual auditory display of a virtual auditory display device in some embodiments.
Figure 15G:
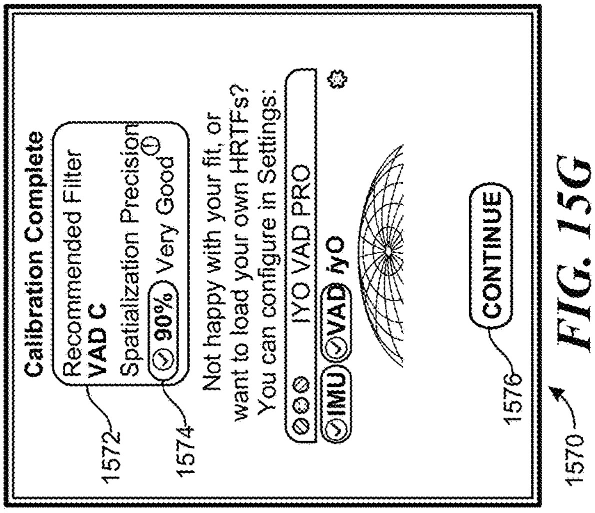
FIGS. 15G through 15J depict an example user interface for providing information on calibration of a virtual auditory display device and personalization of a virtual auditory display of the virtual auditory display device in some embodiments.
Figure 15H:
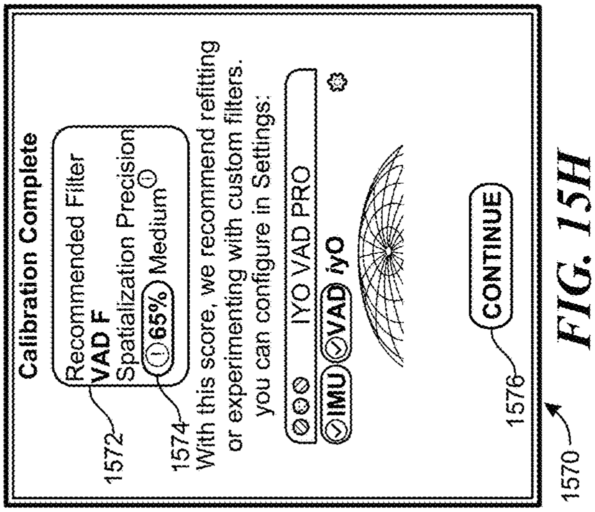

FIGS. 15A through 15C depict an example user interface 1500 for calibrating a virtual auditory display device in some embodiments. The virtual auditory display device may be the virtual auditory display device 100 which includes the first ear-worn device 102*a* and the second ear-worn device 102*b*. FIGS. 15A through 15F are described with reference to the virtual auditory display device 100, but other virtual auditory display devices may be calibrated and/or personalized.

The virtual auditory display system 102 (for example, the user interface module 210) may provide the user interface 1500. The wearer may start a calibration and/or personalization process by selecting a button labeled "Start" (not shown in FIGS. 15A through 15C) displayed by the virtual auditory display system 102. FIG. 15A depicts the user interface 1500 providing a user interface element 1502 indicating the point in the calibration part of the calibration and/or personalization process at which the wearer is, and instructions 1504 for the wearer.

FIG. 15B depicts the user interface 1500 providing a first circle 1506*a* and a second circle 1506*b*. The virtual auditory display system 102 may cause the first circle 1506*a* and/or the second circle 1506*b* to move up and down on the user interface 1500 and instruct the wearer to nod their head up and down to follow the first circle 1506*a* and the second circle 1506*b*.

FIG. 15C depicts the user interface 1500 providing a circle 1508. The virtual auditory display system 102 may cause the circle 1508 to move up and down on the user interface 1500 and instruct the wearer to nod their head up and down to follow the circle 1508. Additionally or alternatively, the virtual auditory display system 102 may cause the circle 1508 to move from side to side on the user interface 1500 and instruct the wearer to move their head from side to side to follow the circle 1508.

While the virtual auditory display system 102 performs the calibration part of the calibration and/or personalization process, the virtual auditory display system 102 may receive detections of head orientations of the head of the wearer from the virtual auditory display device 100 based on data obtained from the IMU-based sensor system and/or other sensors of the first ear-worn device 102*a* and/or the second ear-worn device 102*b*. The virtual auditory display system 102 may use the detections of head orientations and other factors, such as a known or estimated distance from a display providing the user interface 1500, a width and height of the display, positions of the first circle 1506*a*, the second circle 1506*b*, and/or the circle 1508, and/or other data from the IMU-based sensor system to calibrate the IMU-based sensor system.

FIGS. 15D through 15F depict an example user interface 1550 for personalizing a virtual auditory display provided by a virtual auditory display device in some embodiments. The virtual auditory display system 102 (for example, the user interface module 210) may provide the user interface 1550.

The wearer of the virtual auditory display device 100 may start the personalization part of the calibration and/or personalization process after completing the calibration part. The virtual auditory display system 102 may cause the virtual auditory display device 100 to play sounds at several locations (for example, five locations). The sounds may include, for example, sounds produced by objects that appear to the wearer as moving around his or her head, such as airplanes, helicopters, birds, and other flying creatures. FIG. 15D depicts the user interface 1550 providing instructions 1554 instructing the wearer to point their nose at the source of each sound as the virtual auditory display device 100 plays the sound. The wearer may begin the personalization part of the calibration and/or personalization process by selecting the button 1556 labeled "Continue."

FIG. 15E depicts the user interface 1550 providing a user interface element 1552 indicating the point in the personalization part of the calibration and/or personalization process at which the wearer is, and the instructions 1554. FIG. 15F depicts the user interface 1550 with the user interface element 1552 indicating that the wearer has located a sound that the virtual auditory display device 100 played at a first location. The virtual auditory display system 102 may cause the virtual auditory display device 100 to play sounds at subsequent locations and update the user interface 1550 accordingly.

While the virtual auditory display system 102 performs the personalization part of the calibration and/or personalization process, the virtual auditory display system 102 may receive detections of head orientations of the head of the wearer from the virtual auditory display device 100 based on data obtained from the IMU-based sensor system and/or other sensors of the first ear-worn device 102*a* and/or the second ear-worn device 102*b*. The virtual auditory display system 102 may use the detections of head orientations and the locations of the sounds generated by the virtual auditory display system 102 to calculate one or more deltas, as described with reference to, for example, FIGS. 13A and 13B. The virtual auditory display system 102 may use the calculated one or more deltas to select a set of virtual auditory display filters and estimate a spatialization precision of the virtual auditory display for the wearer.

FIGS. 15G through 15J depict an example user interface 1570 for providing information on calibration of a virtual auditory display device and personalization of a virtual auditory display of the virtual auditory display device in some embodiments. The user interface 1570 includes a recommendation 1572 of a set of virtual auditory display filters. In some embodiments, as described herein with reference to, for example, FIGS. 13A and 13B, the virtual auditory display system 102 may select a set of virtual auditory display filters from among multiple sets of virtual auditory display filters based on the results of the calibration and/or personalization process. The user interface 1570 also includes an estimate 1574 of a spatialization precision of the virtual auditory display for the wearer.

Figure 15I:
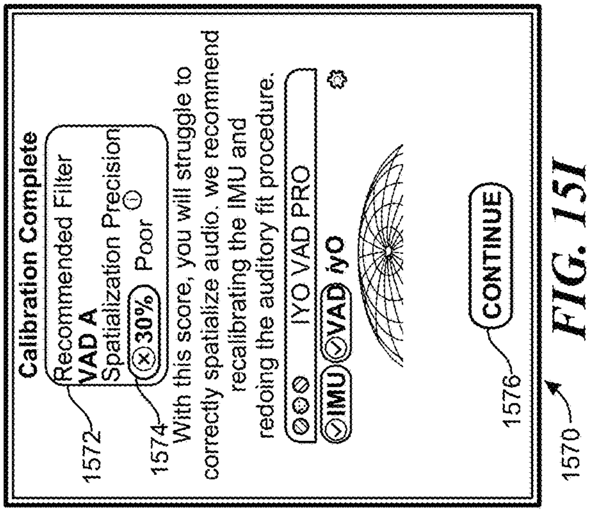
Figure 15J:
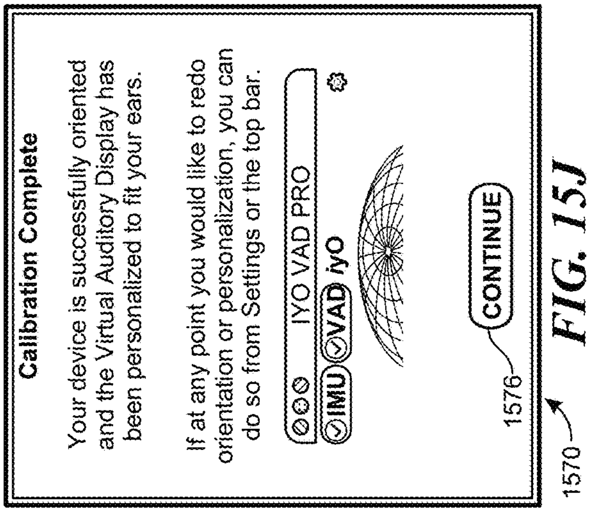

The virtual auditory display system 102 may categorize the spatialization precision of the virtual auditory display for the wearer based on the estimate 1574, such as "Very Good" (FIG. 15G), "Medium" (FIG. 15H), and "Poor" (FIG. 15I). The virtual auditory display system 102 may provide recommendations to redo the calibration part and/or the personalization part of the calibration and/or personalization process and/or to use custom filters. The user interface 1570 also includes a button 1576 labeled "Continue" that the wearer may select to return to the user interface 1100 depicted in FIGS. 11A and 11B.

Although the virtual auditory display system 102 is described as using circles, the virtual auditory display system 102 may utilize other visual user interface elements in the calibration and/or personalization process. Furthermore, although the virtual auditory display system 102 is described as receiving detections of head orientations from the virtual auditory display device 100 in the calibration and/or personalization process, the virtual auditory display system 102 may receive detections of head orientations from other devices connected to the virtual auditory display system 102, such as cameras, motion sensing devices, virtual reality headsets, and the like.

One advantage of the calibration and/or personalization process is that the virtual auditory display system 102 may personalize a set of virtual auditory display filters for a wide range of individuals. The virtual auditory display system 102 may personalize the set of virtual auditory display filters by modifying the set of virtual auditory display filters. The virtual auditory display system 102 may have pre-configured multiple sets of virtual auditory display filters and may modify the set of virtual auditory display filters by selecting a different set of virtual auditory display filters based on the results of the calibration and/or personalization process for a user.

Additionally or alternatively, the virtual auditory display system 102 may modify the set of virtual auditory display filters by modifying the digital filters or functions included in the set of virtual auditory display filters. For example, where the set of virtual auditory display filters includes digital filters, the virtual auditory display system 102 may modify parameters of the digital filters, such as the center frequencies, gains, q's, algorithm type, or other parameters based on the results of the calibration and/or personalization process for a user.

Personalization of virtual auditory display filters allows a wide range of individuals to experience immersive, accurately rendered sound in a virtual auditory space. Moreover, such individuals would not have to have HRTFs generated for them using potentially difficult and/or unreliable physical measurement procedures. Such individuals could obtain a personalized set of virtual auditory display filters simply by having the virtual auditory display system 102 perform the calibration and/or personalization process for them. The modification of virtual auditory display filters may be performed at an initial setup procedure for the person and at any subsequent point during the person's use of the virtual auditory display system 102 and/or virtual auditory display device 100.

One advantage of virtual auditory display filters is that sounds in far more locations in virtual auditory space may be rendered in comparison to existing technologies. For example, a 9.1.6 configuration has 16 virtual speakers and thus may be limited to accurately rendering sounds for only those 16 virtual speaker locations. Such configurations may render sounds from other locations by smearing sounds from virtual speaker locations to represent the other locations, but such artifacts may be noticeable to listeners.

In contrast, virtual auditory display filters may be able to render sound at far more locations. For example, using locations at one degree increments of azimuth and elevation results in 65,160 locations. However, the described technology may generate virtual auditory display filters at smaller increments, resulting in even more locations at which the virtual auditory display filters may render sound. Moreover, typical approaches render sound at a modeled distance of 1 m from a center point representing the listener. The described technology may generate virtual auditory display filters for any number of distances from the center point. Accordingly, the described technology may accurately render sounds at varying distances.

One advantage of the described technology is that the described technology accurately renders virtual auditory display sound in virtual auditory space, meaning that sound is perceived by a listener as coming from the location that the creator of the sound intended for the sound. Another advantage of the described technology is that the described technology may be utilized with any ear-worn device, such as headphones, headset, and earbuds. Another advantage is that the virtual auditory display sound is high-quality and clear. Another advantage is the described technology may emphasize or deemphasize sounds in certain regions or locations of virtual auditory space so as to focus a listener's attention on those certain regions or locations. Such an approach may increase the listener's hearing abilities and allow the listener to hear sounds that the listener would not otherwise hear.

Another advantage of the described technology is that any digital device with suitable storage and processing power may store and apply the virtual auditory display filters. As described herein, a general purpose computing device such as a laptop or desktop computer may store and apply the virtual auditory display filters to audio signals to generate processed audio signals. The laptop or desktop computer may then send the processed audio signals to ear-worn devices to generate sound based on the processed audio signals. Similarly, a digital device such as a phone, tablet, or a virtual reality headset may store and apply the virtual auditory display filters to audio signals to generate processed audio signals and send the processed audio signals to ear-worn devices.

Additionally or alternatively, ear-worn devices, such as the virtual auditory display device 100 described herein, may store and apply the virtual auditory display filters. The ear-worn devices may receive an input audio signal from, for example, a digital device with which the ear-worn devices are paired such as a phone or tablet, or from a cloud-based service. The ear-worn devices may apply the stored virtual auditory display filters to the input audio signal to generate processed audio signals and output virtual auditory display sound based on the processed audio signals. Another example is that a cloud-based service may store and apply the virtual auditory display filters to generate processed audio signals and send the processed audio signals to ear-worn devices. Other advantages will be apparent.

Figure 16:
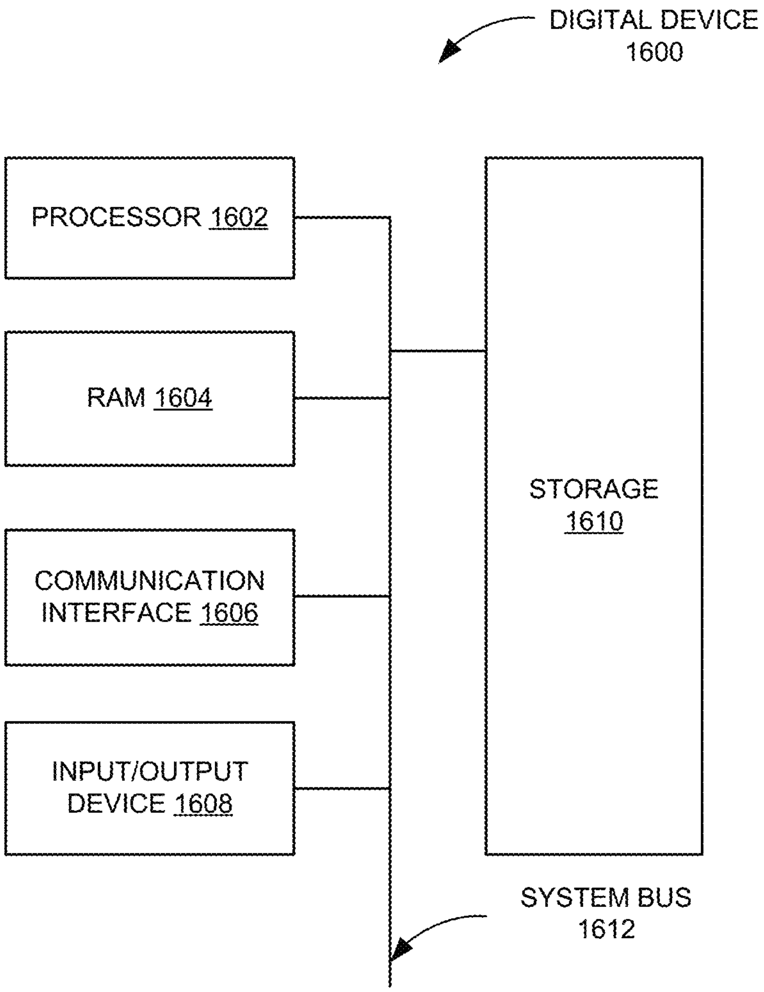
FIG. 16 is a block diagram of an example digital device in some embodiments.

FIG. 16 depicts a block diagram of an example digital device 1600 according to some embodiments. The digital device 1600 is shown in the form of a general-purpose computing device. The digital device 1600 includes at least one processor 1602, RAM 1604, communication interface 1606, input/output device 1608, storage 1610, and a system bus 1612 that couples various system components including storage 1610 to the at least one processor 1602. A system, such as a computing system, may be or include one or more of the digital device 1600.

System bus 1612 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 1600 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 1602 is configured to execute executable instructions (for example, programs). In some embodiments, the at least one processor 1602 comprises circuitry or any processor capable of processing the executable instructions.

In some embodiments, RAM 1604 stores programs and/or data. In various embodiments, working data is stored within RAM 1604. The data within RAM 1604 may be cleared or ultimately transferred to storage 1610, such as prior to reset and/or powering down the digital device 1600.

In some embodiments, the digital device 1600 is coupled to a network via communication interface 1606. The digital device 1600 can communicate with one or more networks such as a local area network (LAN), a general wide area network (WAN), and/or a public network (for example, the Internet).

In some embodiments, input/output device 1608 is any device that inputs data (for example, mouse, keyboard, stylus, sensors, etc.) or outputs data (for example, speaker, display, virtual reality headset).

In some embodiments, storage 1610 can include computer system readable media in the form of non-volatile memory, such as read only memory (ROM), programmable read only memory (PROM), solid-state drives (SSD), flash memory, and/or cache memory. Storage 1610 may further include other removable/non-removable, volatile/non-volatile computer system storage media. By way of example only, storage 1610 can be provided for reading from and writing to a non-removable, non-volatile magnetic media. The storage 1610 may include a non-transitory computer-readable medium, or multiple non-transitory computer-readable media, which stores programs or applications for performing functions such as those described herein with reference to, for example, FIGS. 2A, 2B, and 3B. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 1612 by one or more data media interfaces. As will be further depicted and described below, storage 1610 may include at least one program product having a set (for example, at least one) of program modules that are configured to carry out the functions of embodiments of the invention. In some embodiments, RAM 1604 is found within storage 1610.

Programs/utilities, having a set (at least one) of program modules, such as the virtual auditory display system 102, may be stored in storage 1610 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 1600. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled," "couplable," "operably coupled," "communicably coupled" and the like to other components. Such description or illustration should be understood as indicating that such components may cooperate or interact with each other, and may be in direct or indirect physical, electrical, or communicative contact with each other.

Components may be described or illustrated as "configured to," "adapted to," "operative to," "configurable to," "adaptable to," "operable to" and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services," and "providing products and services."

It may be apparent that various modifications may be made, and other embodiments may be used without departing from the broader scope of the discussion herein. For example, the virtual auditory display system 102 may utilize a group of FIR filters for each of certain locations in virtual auditory space and a group of IIR filters for each of other certain locations in virtual auditory space. As another example, the virtual auditory display system 102 may provide audio signals to any device capable of directing sound towards the ears of a listener. As another example, a virtual auditory display device may be any device or set of devices (such as a pair of speakers) capable of producing sound based on output audio signals generated by the virtual auditory display system 102.

Therefore, these and other variations upon the example embodiments are intended to be covered by the disclosure herein.

We claim:

1. One or more non-transitory computer-readable media comprising executable instructions that when executed by one or more processors of a system cause the system to perform a method, the method comprising:

generating, for each of multiple virtual auditory space locations, one or more first digital filters, the one or more first digital filters including one or more first notch filters, the one or more first notch filters including one or more first center frequencies, the one or more first center frequencies based on a first generally sigmoidal distribution of center frequencies as a first function of virtual auditory space location, the one or more first notch filters configured to produce one or more first notches in a first frequency spectrum of a first audio signal based on the one or more first center frequencies when applied to the first audio signal;

generating, for each of the multiple virtual auditory space locations, one or more second digital filters, the one or more second digital filters including one or more second notch filters, the one or more second notch filters including one or more second center frequencies, the one or more second center frequencies based on a second generally sigmoidal distribution of center frequencies as a second function of virtual auditory space location, the one or more second notch filters configured to produce one or more second notches in a second frequency spectrum of a second audio signal based on the one or more second center frequencies when applied to the second audio signal;

receiving an audio signal, the audio signal having one or more audio sub-signals, an audio sub-signal associated with a virtual auditory space location;

for each audio sub-signal of the one or more audio sub-signals:

selecting, based on the virtual auditory space location associated with the audio sub-signal, particular one or more first digital filters and particular one or more second digital filters;

applying the particular one or more first digital filters to the audio sub-signal to obtain a first processed audio sub-signal; and applying the particular one or more second digital filters to the audio sub-signal to obtain a second processed audio sub-signal;

generating, based on multiple first processed audio sub-signals, a first output audio signal for a first device;

generating, based on multiple second processed audio sub-signals, a second output audio signal for a second device; and providing the first output audio signal to the first device and the second output audio signal to the second device.

2. The one or more non-transitory computer-readable media of claim 1 wherein the virtual auditory space location is a first virtual auditory space location, and the method further comprises:

receiving a head orientation of a user; and for each audio sub-signal of the one or more audio sub-signals, determining, based on the first virtual auditory space location associated with the audio sub-signal and the head orientation, a second virtual auditory space location, wherein selecting, based on the virtual auditory space location associated with the audio sub-signal, the particular one or more first digital filters and the particular one or more second digital filters includes selecting, based on the second virtual auditory space location, the particular one or more first digital filters and the particular one or more second digital filters.

3. The one or more non-transitory computer-readable media of claim 2 wherein the particular one or more first digital filters are first particular one or more first digital filters, the particular one or more second digital filters are first particular one or more second digital filters, the head orientation of the user is a first head orientation of the user, and the method further comprises:

receiving a personalization audio signal associated with a third virtual auditory space location;

selecting, based on the third virtual auditory space location, second particular one or more first digital filters and second particular one or more second digital filters;

applying the second particular one or more first digital filters to the personalization audio signal to obtain a first processed personalization audio signal;

applying the second particular one or more second digital filters to the personalization audio signal to obtain a second processed personalization audio signal;

generating, based on the first processed personalization audio signal, a third output audio signal for the first device;

generating, based on the second processed personalization audio signal, a fourth output audio signal for the second device;

providing the third output audio signal to the first device and the fourth output audio signal to the second device;

receiving a second head orientation of the user;

determining, based on the second head orientation, a fourth virtual auditory space location;

determining a delta between the third virtual auditory space location and the fourth virtual auditory space location; and modifying, based on the delta, the one or more first digital filters and the one or more second digital filters.

4. The one or more non-transitory computer-readable media of claim 3 wherein modifying, based on the delta, the one or more first digital filters and the one or more second digital filters includes modifying the one or more first center frequencies on which the one or more first notch filters are based and the one or more second center frequencies on which the one or more second notch filters are based.

5. The one or more non-transitory computer-readable media of claim 1, the method further comprising generating, using one or more image processing algorithms, a first notch mask and a second notch mask, the first notch mask specifying a first gain modifier as a third function of virtual auditory space location, the second notch mask specifying a second gain modifier as a fourth function of virtual auditory space location, wherein:

the one or more first notch filters include the one or more first center frequencies and a first gain as modified by the first gain modifier, and the one or more first notch filters are configured to produce one or more first notches in the first frequency spectrum of the first audio signal based on the one or more first center frequencies and the first gain when applied to the first audio signal, and the one or more second notch filters include the one or more second center frequencies and a second gain as modified by the second gain modifier, and the one or more second notch filters are configured to produce one or more second notches in the second frequency spectrum of the second audio signal based on the one or more second center frequencies and the second gain when applied to the second audio signal.

6. The one or more non-transitory computer-readable media of claim 5 wherein the one or more image processing algorithms include one or more of a gaussian function, a sharpening function, a contrast adjustment function, a color correction function, a thresholding function, an edge detection function, and a segmentation function.

7. The one or more non-transitory computer-readable media of claim 1, the method further comprising:

receiving a selection of an acoustic environment; and determining, based on the acoustic environment, a first acoustic environment digital filter and a second acoustic environment digital filter, wherein for each audio sub-signal of the one or more audio sub-signals, applying the particular one or more first digital filters to the audio sub-signal to obtain the first processed audio sub-signal includes applying the particular one or more first digital filters and the first acoustic environment digital filter to the audio sub-signal to obtain the first processed audio sub-signal, and applying the particular one or more second digital filters to the audio sub-signal to obtain the second processed audio sub-signal includes applying the particular one or more second digital filters and the second acoustic environment digital filter to the audio sub-signal to obtain the second processed audio sub-signal.

8. The one or more non-transitory computer-readable media of claim 7 wherein the acoustic environment is represented by one or more ambisonic arrays and determining, based on the acoustic environment, the first acoustic environment digital filter and the second acoustic environment digital filter includes, determining, based on the one or more ambisonic arrays, the first acoustic environment digital filter and the second acoustic environment digital filter.

9. The one or more non-transitory computer-readable media of claim 1 wherein the one or more first digital filters and the one or more second digital filters are infinite impulse response filters.

10. The one or more non-transitory computer-readable media of claim 1 wherein the first device includes a first ear-worn device, and the second device includes a second ear-worn device.

11. A system comprising at least one processor and at least one memory including executable instructions that when executed by the at least one processor cause the system to:

generate, for each of multiple virtual auditory space locations, one or more first digital filters, the one or more first digital filters including one or more first notch filters, the one or more first notch filters including one or more first center frequencies, the one or more first center frequencies based on a first generally sigmoidal distribution of center frequencies as a first function of virtual auditory space location, the one or more first notch filters configured to produce one or more first notches in a first frequency spectrum of a first audio signal based on the one or more first center frequencies when applied to the first audio signal;

generate, for each of the multiple virtual auditory space locations, one or more second digital filters, the one or more second digital filters including one or more second notch filters, the one or more second notch filters including one or more second center frequencies, the one or more second center frequencies based on a second generally sigmoidal distribution of center frequencies as a second function of virtual auditory space location, the one or more second notch filters configured to produce one or more second notches in a second frequency spectrum of a second audio signal based on the one or more second center frequencies when applied to the second audio signal;

receive an audio signal, the audio signal having one or more audio sub-signals, an audio sub-signal associated with a virtual auditory space location;

for each audio sub-signal of the one or more audio sub-signals:

select, based on the virtual auditory space location associated with the audio sub-signal, particular one or more first digital filters and particular one or more second digital filters;

apply the particular one or more first digital filters to the audio sub-signal to obtain a first processed audio sub-signal; and apply the particular one or more second digital filters to the audio sub-signal to obtain a second processed audio sub-signal;

generate, based on multiple first processed audio sub-signals, a first output audio signal for a first device;

generate, based on multiple second processed audio sub-signals, a second output audio signal for a second device; and provide the first output audio signal to the first device and the second output audio signal to the second device.

12. The system of claim 11 wherein the virtual auditory space location is a first virtual auditory space location, and the executable instructions that when executed by the at least one processor further cause the system to:

receive a head orientation of a user; and for each audio sub-signal of the one or more audio sub-signals, determine, based on the first virtual auditory space location associated with the audio sub-signal and the head orientation, a second virtual auditory space location, wherein to select, based on the virtual auditory space location associated with the audio sub-signal, the particular one or more first digital filters includes to select, based on the second virtual auditory space location, the particular one or more first digital filters, and to select, based on the virtual auditory space location associated with the audio sub-signal, the particular one or more second digital filters includes to select, based on the second virtual auditory space location, the particular one or more second digital filters.

13. The system of claim 12 wherein the one or more first digital filters are first one or more first digital filters, the one or more second digital filters are first one or more second digital filters, the particular one or more first digital filters are first particular one or more first digital filters, the particular one or more second digital filters are first particular one or more second digital filters, the head orientation is a first head orientation, the audio signal having one or more audio sub-signals is a first audio signal having first one or more audio sub-signals, and the executable instructions that when executed by the at least one processor further cause the system to:

receive a personalization audio signal that has a third virtual auditory space location;

select, based on the third virtual auditory space location, second particular one or more first digital filters and second particular one or more second digital filters;

apply the second particular one or more first digital filters to the personalization audio signal to obtain a first processed personalization audio signal;

apply the second particular one or more second digital filters to the personalization audio signal to obtain a second processed personalization audio signal;

generate, based on the first processed personalization audio signal, a third output audio signal for the first device;

generate, based on the second processed personalization audio signal, a fourth output audio signal for the second device;

provide the third output audio signal to the first device and the fourth output audio signal to the second device;

receive a second head orientation of the user;

determine, based on the second head orientation, a fourth virtual auditory space location;

determine a delta between the third virtual auditory space location and the fourth virtual auditory space location; and selecting, based on the delta, second one or more first digital filters and second one or more second digital filters, the second one or more first digital filters and the second one or more second digital filters for use while receiving a second input audio signal having second one or more audio sub-signals.

14. The system of claim 11 wherein the executable instructions that when executed by the at least one processor further cause the system to generate, using one or more image processing algorithms, a first notch mask and a second notch mask, the first notch mask specifying a first gain modifier based on the virtual auditory space location, the second notch mask specifying a second gain modifier based on the virtual auditory space location, wherein:

the one or more first notch filters are generated using the one or more first center frequencies based on the first generally sigmoidal distribution of center frequencies as a third function of virtual auditory space location and a first gain as modified by the first gain modifier and the one or more first notch filters are configured to produce one or more first notches in the first frequency spectrum of the first audio signal based on the one or more first center frequencies and the first gain when applied to the first audio signal, and the one or more second notch filters are generated using the one or more second center frequencies based on the second generally sigmoidal distribution of center frequencies as a fourth function of virtual auditory space location and a second gain as modified by the second gain modifier and the one or more second notch filters are configured to produce one or more second notches in the second frequency spectrum of the second audio signal based on the one or more second center frequencies and the second gain when applied to the second audio signal.

15. The system of claim 11 wherein the executable instructions that when executed by the at least one processor further cause the system to:

receive a selection of an acoustic environment; and determine based on the acoustic environment, a first acoustic environment digital filter and a second acoustic environment digital filter, wherein for each audio sub-signal of the one or more audio sub-signals, to apply the particular one or more first digital filters to the audio sub-signal to obtain the first processed audio sub-signal includes to apply the particular one or more first digital filters and the first acoustic environment digital filter to the audio sub-signal to obtain the first processed audio sub-signal, and to apply the particular one or more second digital filters to the audio sub-signal to obtain the second processed audio sub-signal includes to apply the particular one or more second digital filters and the second acoustic environment digital filter to the audio sub-signal to obtain the second processed audio sub-signal.

16. The system of claim 11 wherein the one or more first digital filters and the one or more second digital filters are infinite impulse response filters.

17. The system of claim 11 wherein the first device includes a first ear-worn device, and the second device includes a second ear-worn device.

18. A method comprising:

generating a first virtual auditory display filter, the first virtual auditory display filter including a first set of first functions, one or more first functions, when applied to a first audio signal having a first location in virtual auditory space, generating a first processed audio signal having a first frequency response with one or more first notches at one or more first center frequencies that are based on the first location, the one or more first notches having one or more first peak-to-trough depths of at most −10 dB;

generating a second virtual auditory display filter, the second virtual auditory display filter including a second set of second functions, one or more second functions, when applied to the first audio signal, generating a second processed audio signal having a second frequency response with one or more second notches at one or more second center frequencies that are based on the first location, the one or more second notches having one or more second peak-to-trough depths of at most −10 dB;

receiving a second audio signal having a second location in the virtual auditory space;

applying the first virtual auditory display filter, including a first subset of first functions selected based on the second location, to the second audio signal to generate a third processed audio signal having a third frequency response;

applying the second virtual auditory display filter, including a second subset of second functions selected based on the second location, to the second audio signal to generate a fourth processed audio signal having a fourth frequency response;

providing the third processed audio signal to a first sound output device; and providing the fourth processed audio signal to a second sound output device.

19. The method of claim 18 where the one or more first center frequencies are based on a first generally sigmoidal distribution of center frequencies as a first function of location in the virtual auditory space and the one or more second center frequencies are based on a second generally sigmoidal distribution of center frequencies as a second function of location in the virtual auditory space.

20. The method of claim 18, further comprising receiving a head orientation of a user, wherein:

applying the first virtual auditory display filter, including the first subset of first functions selected based on the second location, to the second audio signal to generate a third processed audio signal having a third frequency response includes applying the first virtual auditory display filter, including a third subset of first functions selected based on the second location and the head orientation, to the second audio signal to generate the third processed audio signal having the third frequency response, and applying the second virtual auditory display filter, including the second subset of second functions selected based on the second location, to the second audio signal to generate a fourth processed audio signal having a fourth frequency response includes applying the second virtual auditory display filter, including a fourth subset of second functions selected based on the second location and the head orientation, to the second audio signal to generate the fourth processed audio signal having the fourth frequency response.

21. The method of claim 18, further comprising:

generating, using one or more image processing algorithms, a first notch mask and a second notch mask, the first notch mask specifying a first depth modifier as a first function of a location in the virtual auditory space, the second notch mask specifying a second depth modifier as a second function of the location in the virtual auditory space;

modifying the one or more first peak-to-trough depths based on the first depth modifier; and modifying the one or more second peak-to-trough depths based on the second depth modifier.

22. The method of claim 21 wherein the one or more image processing algorithms include one or more of a gaussian function, a sharpening function, a contrast adjustment function, a color correction function, a thresholding function, an edge detection function, and a segmentation function.

23. The method of claim 21 wherein the first set of first functions include first infinite impulse response digital filters and the second set of second functions include second infinite impulse response digital filters.

24. A method comprising:

receiving a set of multiple first digital filters, one or more first digital filters generated for each of multiple virtual auditory space locations, the one or more first digital filters including one or more first notch filters, the one or more first notch filters including one or more first center frequencies, the one or more first center frequencies based on a first generally sigmoidal distribution of center frequencies as a first function of virtual auditory space location, the one or more first notch filters configured to produce one or more first notches in a first frequency spectrum of a first audio signal based on the one or more first center frequencies when applied to the first audio signal;

receiving a set of multiple second digital filters, one or more second digital filters generated for each of multiple virtual auditory space locations, the one or more second digital filters including one or more second notch filters, the one or more second notch filters including one or more second center frequencies, the one or more second center frequencies based on a second generally sigmoidal distribution of center frequencies as a second function of virtual auditory space location, the one or more second notch filters configured to produce one or more second notches in a second frequency spectrum of a second audio signal based on the one or more second center frequencies when applied to the second audio signal;

receiving a personalization audio signal that has a virtual auditory space location;

selecting, based on the virtual auditory space location, particular one or more first digital filters and particular one or more second digital filters;

applying the particular one or more first digital filters to the personalization audio signal to obtain a first processed personalization audio signal;

applying the particular one or more second digital filters to the personalization audio signal to obtain a second processed personalization audio signal;

providing a first output audio signal based on the first processed personalization audio signal to a first device and a second output audio signal based on the second processed personalization audio signal to a second device;

receiving a user perception of first sound output by the first device and second sound output by the second device; and modifying, based on the user perception, the set of multiple first digital filters and the set of multiple second digital filters.

25. The method of claim 24 wherein the virtual auditory space location is a first virtual auditory space location and wherein modifying, based on the user perception, the set of multiple first digital filters and the set of multiple second digital filters includes:

determining, based on the user perception, a second virtual auditory space location;

determining a delta between the first virtual auditory space location and the second virtual auditory space location; and modifying, based on the delta, the set of multiple first digital filters and the set of multiple second digital filters.

26. The method of claim 25 wherein receiving the user perception includes receiving a head orientation of a user and wherein determining, based on the user perception, the second virtual auditory space location, includes determining, based on the head orientation of the user, the second virtual auditory space location.

27. The method of claim 25 wherein receiving the user perception includes receiving one or more gestures of a user and wherein determining, based on the user perception, the second virtual auditory space location, includes determining, based on the one or more gestures of the user, the second virtual auditory space location.

28. The method of claim 24 wherein the set of multiple first digital filters is a first set of multiple first digital filters, the set of multiple second digital filters is a first set of multiple second digital filters, wherein modifying, based on the user perception, the set of multiple first digital filters includes selecting, based on the user perception, a second set of multiple first digital filters, and wherein modifying, based on the user perception, the set of multiple second digital filters includes selecting, based on the user perception, a second set of multiple second digital filters.

29. The method of claim 24 wherein modifying, based on the user perception, the set of multiple first digital filters includes modifying the one or more first center frequencies and wherein modifying, based on the user perception, the set of multiple second digital filters includes modifying the one or more second center frequencies.

30. The method of claim 24, further comprising:

determining, based on the user perception, a spatialization precision estimate; and providing the spatialization precision estimate.

* * * * *